(12) United States Patent
Pallon et al.

(10) Patent No.: US 11,034,824 B2
(45) Date of Patent: *Jun. 15, 2021

(54) POLYMER COMPOSITION AND ELECTRICAL DEVICES

(71) Applicant: BOREALIS AG, Vienna (AT)

(72) Inventors: Love Pallon, Stockholm (SE); Amir Masoud Pourrahimi, Stockholm (SE); Dongming Liu, Stockholm (SE); Richard Olsson, Lidingö (SE); Mikael Hedenqvist, Saltsjöbaden (SE); Stanislaw Gubanski, Gothenburg (SE); Ulf Gedde, Huddinge (SE)

(73) Assignee: BOREALIS AG, Vienna (AT)

( * ) Notice: Subject to any disclaimer, the term of this patent is extended or adjusted under 35 U.S.C. 154(b) by 176 days.

This patent is subject to a terminal disclaimer.

(21) Appl. No.: 16/082,038

(22) PCT Filed: Mar. 2, 2017

(86) PCT No.: PCT/EP2017/054938
§ 371 (c)(1),
(2) Date: Sep. 4, 2018

(87) PCT Pub. No.: WO2017/149087
PCT Pub. Date: Sep. 8, 2017

(65) Prior Publication Data
US 2020/0291208 A1    Sep. 17, 2020

(30) Foreign Application Priority Data

Mar. 4, 2016 (EP) .................................. 16158745
Mar. 22, 2016 (EP) .................................. 16161789

(51) Int. Cl.
C08L 23/06 (2006.01)
C08K 3/22 (2006.01)

(52) U.S. Cl.
CPC ........ *C08L 23/06* (2013.01); *C08K 2003/222* (2013.01); *C08K 2003/2206* (2013.01); *C08K 2003/2224* (2013.01); *C08K 2003/2237* (2013.01); *C08K 2003/2275* (2013.01); *C08K 2003/2296* (2013.01); *C08K 2201/011* (2013.01); *C08L 2203/202* (2013.01); *C08L 2207/066* (2013.01)

(58) Field of Classification Search
CPC .......... C08L 23/04; C08L 23/05; C08L 23/12; C08L 23/0846; C08L 23/06; C08L 2003/202; C08L 2207/066; C08L 23/083; C08K 2003/2206; C08K 2003/222; C08K 2003/2237; C08K 2003/2224; C08K 2003/2275; C08K 2003/2296; C08K 3/013; C08K 9/06; C08K 3/04; H01B 3/441; H01B 9/027; H01B 13/148
USPC ...................................................... 523/212
See application file for complete search history.

(56) References Cited

U.S. PATENT DOCUMENTS

| | | | |
|---|---|---|---|
| 7,579,397 B2 * | 8/2009 | Nelson ................... | B82Y 30/00 174/110 AR |
| 2004/0099975 A1 | 5/2004 | Wu et al. | |
| 2006/0167139 A1 | 7/2006 | Nelson et al. | |
| 2012/0000694 A1 | 1/2012 | Kim et al. | |
| 2013/0199817 A1 | 8/2013 | Nilsson et al. | |

FOREIGN PATENT DOCUMENTS

| | | |
|---|---|---|
| CN | 1511889 A | 7/2004 |
| EP | 2436014 | 4/2012 |
| WO | 9308222 A1 | 4/1993 |
| WO | 9635732 A1 | 11/1996 |
| WO | 02058928 A1 | 8/2002 |
| WO | 2006081400 A3 | 10/2007 |
| WO | 2011128147 A1 | 10/2011 |

OTHER PUBLICATIONS

Encyclopedia of Polymer Science and Engineering, vol. 6 (1986), pp. 383-410.
Adamec, et al., "On the determination of electrical conductivity in polyethylene", J. Phys. D. Appl. Phys., 1981, 14(8), 1487-94.
Anonymous, "Horiba Scientific, A Guidebook to Particle Size Analysis", 2012, Irvine, CA, USA, pp. 1-32.
Cornu, et al., "Lewis Acido-Basc Interactions between CO2 and MgO Surface: DFT and DRIFT Approaches", J. Phys. Chem. C, 2012, 116, 6645-6654.
Diez, et al., "Aldol condensation of citral with acetone on MgO and alkali-promoted MgO catalysts", J. Catal, 2006, 240, 235-244.
Efron, "Bootstrap Methods: Another Look at the Jackknife", The Annals of Statistics, 1979, 7, 1-26.
Freund, et al., "Critical review of electrical conductivity measurements and charge distribution analysis of magnesium oxide", Journal of Geophysical Research: Solid Earth, 1993, 98(B12), 22209-22229.
Grill, "Porous pSiCOH Ultralow-k Dielectrics for Chip Interconnects Prepared by PECVD", Annual Review of Materials Research, 2009, 39, 49-69.

(Continued)

*Primary Examiner* — Hannah J Pak
(74) *Attorney, Agent, or Firm* — Meunier Carlin & Curfman LLC

(57) ABSTRACT

The invention relates to a polymer composition comprising a polymer (a) and a nanoparticle filler (b), wherein the polymer composition comprises a volume percentage (vol. %) of the nanoparticle filler (b), which is Dvol vol. %, and has a center-to-center average distance, in nanometer (nm), in two dimensions (2D) and with a free radius, from one nanoparticle to its nearest nanoparticle neighbour, which is R1st nm, and wherein the polymer composition shows a dependency between said center-to-center average distance to nearest neighbour, R1st, and said volume percentage, Dvol vol. %, which is R1st=E/(Dvol+0.3)+F, wherein $Dvol_1 \leq Dvol \leq Dvol_2$, $E_1 \leq E \leq E_2$, $F_1 \leq F \leq F_2$, and $Dvol_1$ is 0.010 and $Dvol_2$ is 4.4, $E_1$ is 100 and $E_2$ is 280, and $F_1$ is 50 and $F_2$ is 140; an electrical device, e.g. a power cable; and a process for producing an electrical device.

20 Claims, 39 Drawing Sheets

(56) References Cited

OTHER PUBLICATIONS

Istone, WK, "Surface Analysis of Paper, ed. T. E. Conners, S. Banerjee", pp. 247, 1995, CRC, New York.
Klimesch, R. et al., "Polyethylene: High-pressure", Encyclopedia of Materials: Science and Technology, 2001 Elsevier Science Ltd. pp. 7181-7184.
Knözinger, et al. "Hydroxyl groups as IR active surface probes on MgO crystallites", Surface Science, 1993, 290(3), 388-402.
König, et al., "Measuring the Charge State of Point Defects on MgO/Ag(001)", J. Am. Chem. Soc., 2009, 131(48), 17544-17545.
Larkin, "In Infrared and Raman Spectroscopy", edited by P. Larkin, Elsevier, Oxford, 2011.
Lau, et al., "Absorption current behaviour of polyethylene/silica nanocomposites", Journal of Physics: Conference Series, 2013, 472, 012003.
Leggoe, "Nth-nearest neighbor statistics for analysis of particle distribution data derived from micrographs", Scripta Materialia, 2005, 53(11), 1263-1268.
Lewis, "Charge transport in polyethylene nano dielectrics", IEEE Transactions on Dielectrics and Electrical Insulation, 2014, 21(2), 497-502.
Li, "Fabrication of a new MgO/C sorbent for CO2 capture at elevated temperature", J. Mater. Chem. A, 2013, 1, 12919-12925.
Liu, et al., "Influence of nanoparticle surface treatment on particle dispersion and interfacial adhesion in low-density polyethylene/aluminum oxide nanocomposites", European Polymer Journal, 2015, 66, 67-77.
Liu, et al., "Morphology and properties of silica-based coatings with different functionalities for Fe3O4, ZnO and Al2O3 nanoparticles", RSC Advances, 2015, 5, 48094-48103.
Mccarthy, et al., "Preparation of multifunctional nanoparticles and their assemblies", Nature Protocols, 2012, 7, 1677-1693.
Moulder, JF, "Handbook of X-ray Photoelectron Spectroscopy, ed.", Chastain, Perkin-Elmer, Minnesota, USA, 1992.
Murakami, et al., "DC conduction and electrical breakdown of MgO/LDPE nanocomposite", IEEE Transactions on Dielectrics and Electrical Insulation, 2008, 15(1), 33-39.
Olsson, et al., "Core-shell structured ferrite-silsesquioxane-epoxy nanocomposites: Composite homogeneity and mechanical and magnetic properties", Polymer Engineering & Science, 2011, 51(5), 862-874.
Pallon, et al., "Formation and the structure of freeze-dried MgO nanoparticle foams and their electrical behaviour in polyethylene", J. Mater. Chem. A, 2015, 3, 7523-7534.
Pallon, et al., "The impact of MgO nanoparticle interface in ultra-insulating polyethylene nanocomposites for high voltage DC cables", Journal of Materials Chemistry A, 2016, 4(22), 8590-8601.
International Preliminary Report on Patentability dated Jun. 20, 2018 in PCT/EP2017/054937 (13 pages).
International Search Report and Written Opinion dated May 31, 2017 in PCT/EP2017/054937 (17 pages).
International Preliminary Report on Patentability dated Jun. 20, 2018 in PCT/EP2017/054938 (11 pages).
International Search Report and Written Opinion dated May 22, 2017 in PCT/EP2017/054938 (17 pages).
Peng, et al., "Influence of functionalized MgO nanoparticles on electrical properties of polyethylene nanocomposites", IEEE Transactions on Dielectrics and Electrical Insulation, 2015, 22(3), 1512-1519.
Plueddemann, EP, "Silane Coupling Agents, 2nd ed.", 1991, Springer, New York (ch3, pp. 56).
Pourrahimi, et al., "Heat treatment of ZnO nanoparticles: new methods to achieve high-purity nanoparticles for high-voltage applications", J. Mater. Chem. A, 2015, 3, 17190-17200.
Pourrahimi, et al., "Polyethylene Nanocomposites for the Next Generation of Ultralow-Transmission-Loss HVDC Cables: Insulation Containing Moisture-Resistant MgO Nanoparticles", ACS Applied Materials and Interfaces, 2016, 8(23), 14824-14835.
Pourrahimi, et al., "The Toughness Amplification Map of Poly(vinyl chloride) and Its Cellulose Acetate-Compatibilized Starch Alloys Containing Core/Shell Rubber Particles: Possible Transition to Super-Toughening", J. Polym. Sci., Part B: Polym. Phys., 2011, 49, 327-332.
Pourrahimi, et al., "Water-based synthesis and cleaning methods for high purity ZnO nanoparticles—comparing acetate, chloride, sulphate, and nitrate zinc salt precursors", RSC Advances, 2014, 4, 35568-35577.
Prescott, et al., "New magnesium oxide fluorides with hydroxy groups as catalysts for Michael additions", J. Mater. Chem., 2005, 15, 4616-4628.
Reddy, et al., "On the computation of electric field and temperature distribution in HVDC cable insulation", IEEE Transactions on Dielectrics and Electrical Insulation, 2006, 13(6), 1236-1244.
Smith, et al., "The mechanisms leading to the useful electrical properties of polymer nanodielectrics", IEEE Transactions on Dielectrics and Electrical Insulation, 2008, 15(1), 187-196.
Testa, et al., "Resistive switching and threshold switching behaviors in La0.1Bi0.9Fe1-xCoxO3 ceramics", J. Appl. Phys., 2012, 108, 034110.
Wåhlander, et al., "Polymer-grafted Al2O3-nanoparticles for controlled dispersion in poly(ethylene-co-butyl acrylate) nanocomposites", Polymer, 2014, 55(9), 2125-2138.

\* cited by examiner

Fig. 1a, b, c, d, e and f

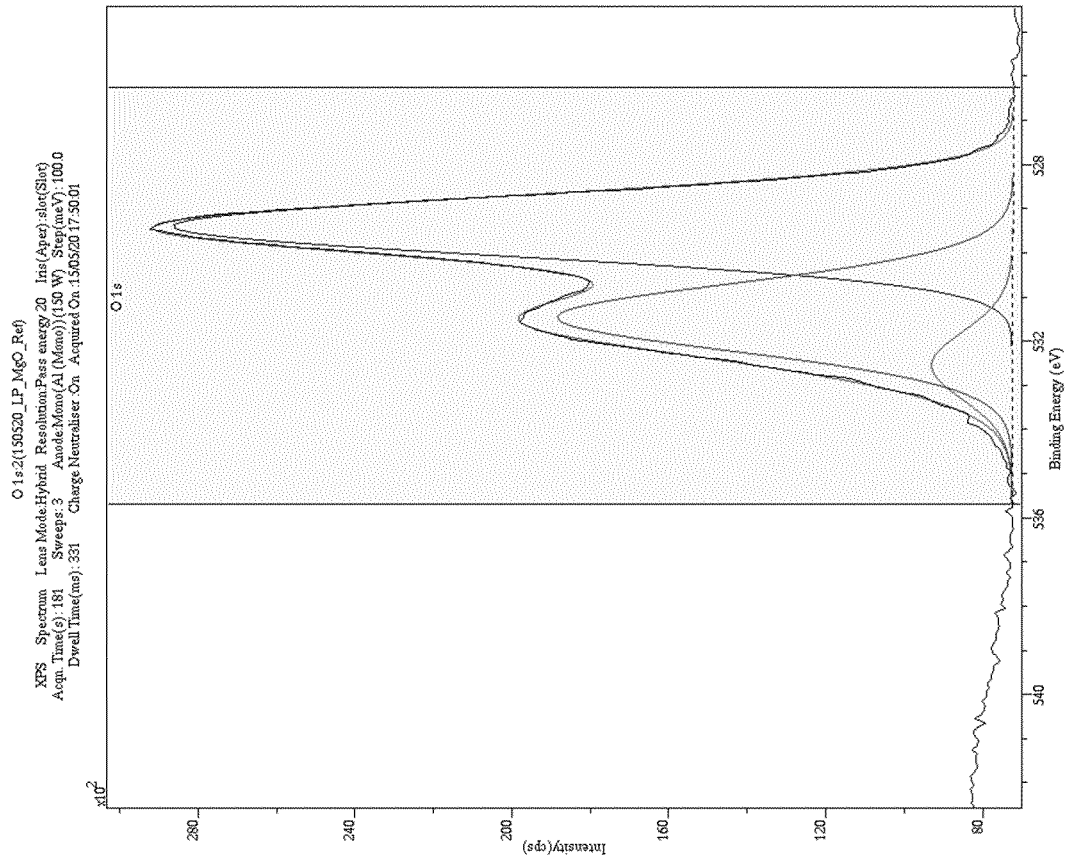
Fig. 5a UN-MgO (unmodified MgO)

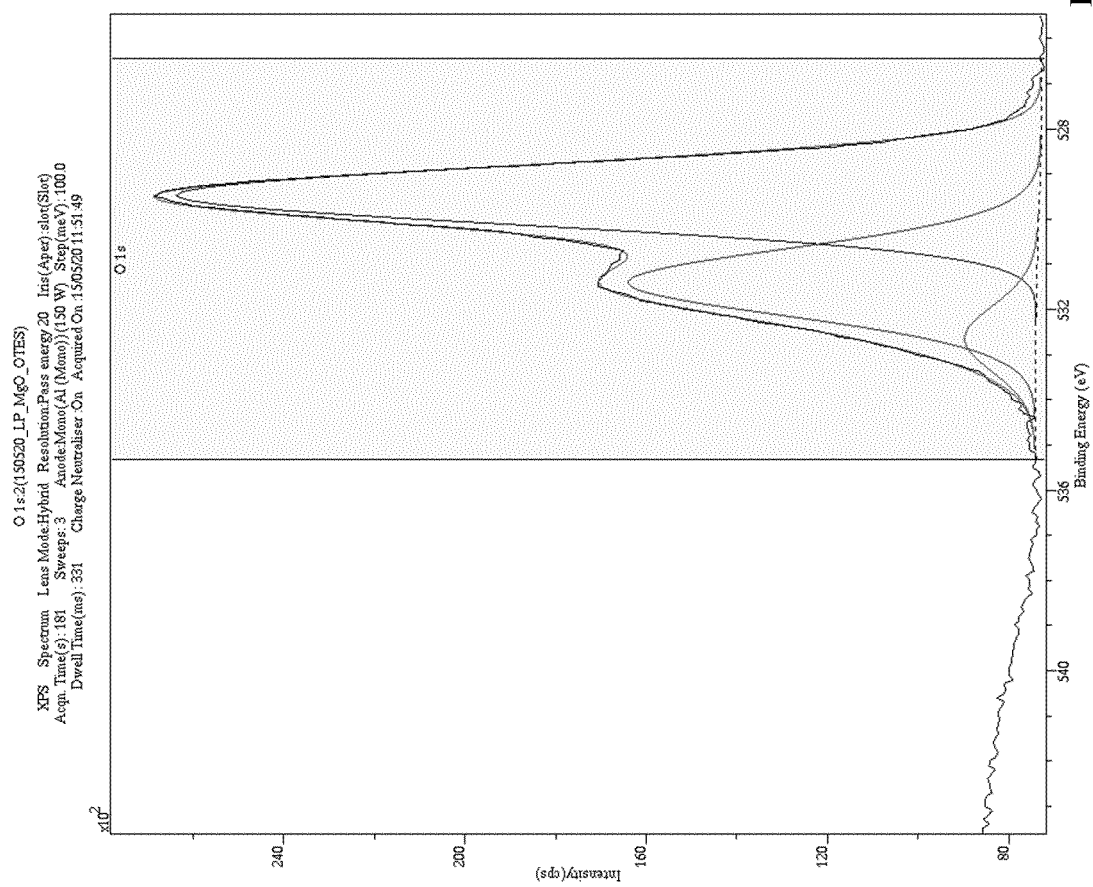
Fig. 5b C8-MgO

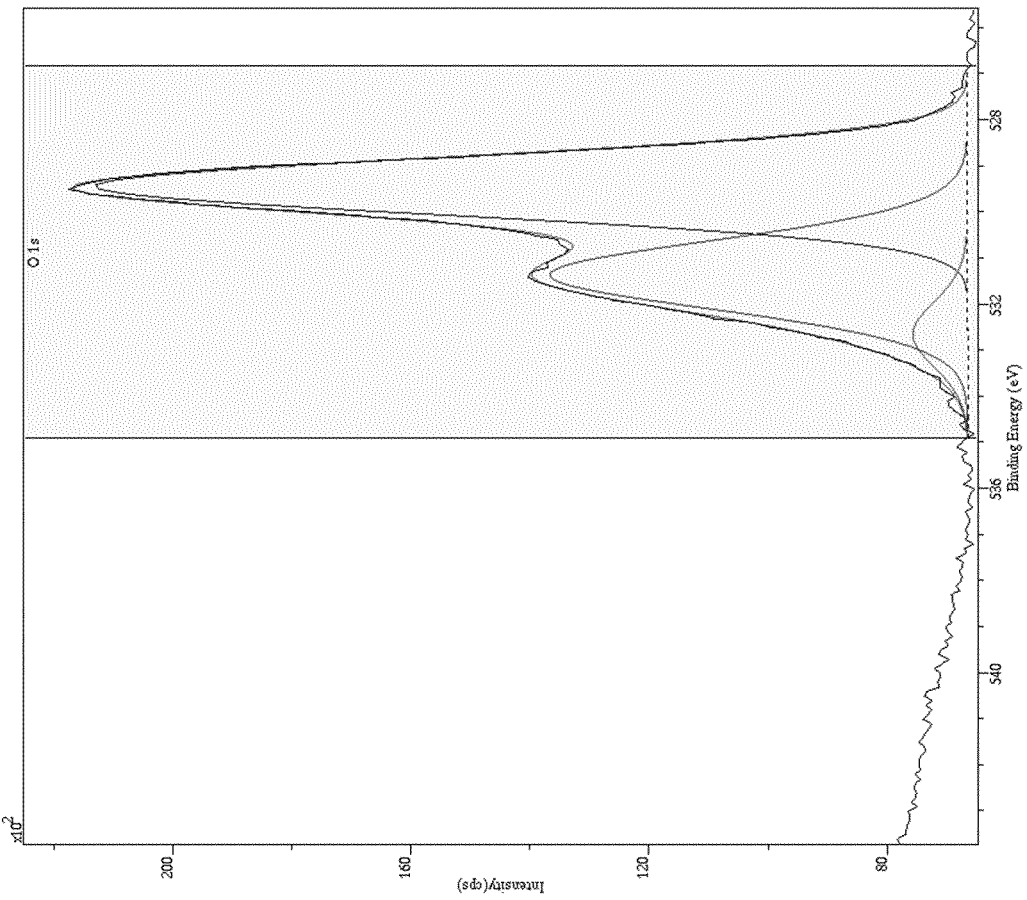
Fig. 5c C18-MgO

POLYMER COMPOSITION AND ELECTRICAL DEVICES

CROSS-REFERENCE TO RELATED APPLICATIONS

This application is a national stage application filed under 35 U.S.C. § 371 of PCT/EP2017/054938 filed Mar. 2, 2017, which claims the benefit of priority to European Application No. 16158745.6 filed Mar. 4, 2016, and European Application No. 16161789.9 filed Mar. 22, 2016, each of which are hereby incorporated herein by reference herein in their entireties.

FIELD OF INVENTION

The invention relates to a polymer composition, an electrical device, e.g. a power cable; and a process for producing an electrical device. Further, the polymer composition, the electrical device, e.g. the power cable, may be especially useful in high voltage (HV) and ultra high voltage (UHV) applications, e.g. cable applications, for example, high voltage direct current (HVDC) or high voltage alternating current (HVAC) applications and ultra high voltage direct current (UHVDC) or ultra high voltage alternating current (UHVAC) applications.

BACKGROUND

Polyolefins produced in a high-pressure (HP) process are widely used in demanding polymer applications wherein the polymers must meet high mechanical and/or electrical requirements. For instance in power cable applications, particularly in medium voltage (MV) and especially in high voltage (HV) and ultra high voltage (UHV) cable applications the electrical properties of the polymer composition has a significant importance. Furthermore, the electrical properties of importance may differ in different cable applications, as is the case between alternating current (AC) and direct current (DC) cable applications.

A typical power cable comprises a conductor surrounded, at least, by an inner semiconductive layer, an insulation layer and an outer semiconductive layer. The cables are commonly produced by extruding the layers on a conductor. The polymer material in one or more of said layers is then normally crosslinked to improve e.g. heat and deformation resistance, creep properties, mechanical strength, chemical resistance and abrasion resistance of the polymer in the layer(s) of the cable. In crosslinking reaction of a polymer interpolymer crosslinks (bridges) are primarily formed. Crosslinking can be achieved using e.g. a free-radical-generating compound, such as an organic peroxide. Free-radical-generating compound is typically incorporated to the layer material prior to, or during, the extrusion of the layer(s) on a conductor. After formation of the layered cable, the cable is then subjected to a crosslinking step in order to initiate the radical formation and thereby the crosslinking reaction.

The DC electrical conductivity is an important material property e.g. for the insulating materials in high voltage direct current (HVDC) cables. Firstly, the strong temperature and electric field dependence of this property will influence the electric field. The second issue concerns the heat generated inside the insulation by the electric leakage current flowing between the inner and outer semiconductive layers. This leakage current depends on the electric field and the electrical conductivity of the insulation. High conductivity of the insulating material may lead to a thermal runaway under high stress/high temperature conditions. The electrical conductivity must therefore be sufficiently low to avoid thermal runaway.

Accordingly, in HVDC cables, the insulation is heated by the leakage current. For a specific cable design the heating is proportional to the insulation conductivity×voltage$^2$. Thus, if the voltage is increased more heat will be generated, unless the electrical conductivity is decreased by a higher factor than the square of the factorial increase of the applied voltage.

Further, it is known that nanoparticle fillers, of materials such as ZnO, $Al_2O_3$, $TiO_2$, MgO, $SiO_2$, fullerens or carbon black, can improve the electrical breakdown strength, reduce conduction current and lower the space charge accumulation for direct current in polyethylene (PE) and epoxy. However, even though some of such materials were described in the literature already in the 1990's, such materials have not been widely used. This is, partly, a consequence of a fear that agglomerates, or aggregates, of nanoparticle may lead to early cable breakdown.

WO2006081400 discloses a nanocomposite composition comprising a nanoparticle filler having a particle size up to 100 nm. The composition can be used in an insulation layer of power cable applications for tailoring thermal or electrical properties for preventing well known and undesired water treeing in the cable layer.

There are high demands to increase the voltage of a direct current (DC) power cable, and thus a continuous need to find alternative polymer compositions with reduced conductivity. Such polymer compositions should also have sufficiently good mechanical properties required for demanding power cable embodiments.

DESCRIPTION OF THE INVENTION

The present invention relates to a polymer composition comprising a polymer (a) and a nanoparticle filler (b), wherein the polymer composition comprises
a volume percentage (vol. %) of the nanoparticle filler (b), which is Dvol vol. %, and has
a center-to-center average distance in nanometer (nm), in two dimensions (2D) and with a free radius, from one nanoparticle to its nearest nanoparticle neighbour, which is R1st nm, and wherein
the polymer composition shows a dependency between said center-to-center average distance to nearest neighbour, R1st, and said volume percentage, Dvol vol. %, which is $R1st = E/(Dvol+0.3)+F$, wherein $Dvol_1 \leq Dvol \leq Dvol_2$, $E_1 \leq E \leq E_2$, $F_1 \leq F \leq F_2$, and
$Dvol_1$ is 0.010 and $Dvol_2$ is 4.4,
$E_1$ is 100 and $E_2$ is 280, and
$F_1$ is 50 and $F_2$ is 140.

It has been found that a polymer composition, in accordance with the present invention, comprising a polymer (a) and a nanoparticle filler (b), wherein the polymer composition shows a dependency between said center-to-center average distance to nearest neighbour, R1st, and said volume percentage, Dvol vol. %, as described herein, exhibits a surprisingly low level of charging currents.

Thus, in a polymer composition, in accordance with the present invention, when a polymer (a) is blended with a nanoparticle filler (b) and wherein the polymer composition shows a dependency between said center-to-center average distance to nearest neighbour, R1st, and said volume percentage, Dvol vol. %, as described herein, the resulting polymer composition unexpectedly exhibits improved electrical properties in comparison to the electrical properties of known polymer nanoparticle fillers compositions.

A low level of charging currents in the polymer composition means that the polymer composition also exhibits a low electrical conductivity. Thus, when a polymer (a) is blended with a modified nanoparticle filler (b) in accordance with the present invention, the resulting polymer composition unexpectedly exhibits improved electrical properties compared to the electrical properties of known polymer nanoparticle fillers compositions, for example, polymer compositions comprising an unmodified nanoparticle filler. Namely, the polymer composition of the present invention has reduced, i.e. low, electrical conductivity. The reduced, i.e. low, electrical conductivity is reflected by a reduced, i.e. low level of charging currents that is reached, and which is measured in the "Conductivity Measurement Method" as described herein.

"Reduced" or "low" level of charging currents (which reflects the electrical conductivity) as used herein interchangeably means that the value obtained from the "Conductivity Measurement Method", i.e. the method for measuring the level of charging currents as described herein in the Experimental section. The low level of charging currents (electrical conductivity, and also referred to as DC conductivity) is beneficial for minimising the undesired heat formation, e.g. in an insulation layer of a DC power cable and thus the risk of thermal runaway.

The polymer composition of the present invention may be in an extruded form or in other forms, for example, forms prior to an extrusion. Further, the other forms, for example, forms prior to an extrusion, of the polymer composition of the present invention, have features, like "nanoparticle aggregate ratios" and "dependency between said center-to-center average distance to defined neighbours and said volume percentage", that essentially correlate with that of the extruded polymer composition of the present invention.

Accordingly, the low level of charging currents (and thereby the low level of electrical conductivity) makes the polymer composition very desirable for DC power cable applications. The voltage applied to the power cable is direct current (DC). A DC power cable is defined to be a DC cable transferring energy operating at any voltage level, typically operating at voltages higher than 1 kV. Moreover, the polymer composition is very advantageously used in material for a layer material in a DC power cable, which can be e.g. a low voltage (LV), a medium voltage (MV), a high voltage (HV) or an ultra high voltage (UHV) DC cable, which terms, as well known, indicate the level of operating voltage. The polymer composition may suitably be used in a layer material for a DC power cable operating at voltages higher than 36 kV, such as a HVDC cable. For HVDC cables the operating voltage is defined herein as the electric voltage between ground and the conductor of the high voltage cable.

The polymer composition may suitably be used in a layer of a HVDC power cable operating at voltages of 40 kV or higher, even at voltages of 50 kV or higher. Further, the polymer composition may, for example, be used in a layer of a HVDC power cable operating at voltages of 60 kV or higher. The invention is also suitable in very demanding cable applications and can be used in a layer of a HVDC power cable operating at voltages higher than 70 kV. The upper limit is not limited. The practical upper limit can be up to 900 kV. The invention is advantageous for use in HVDC power cable applications operating from 75 to 400 kV, for example, 75 to 350 kV. The invention is also found to be advantageous even in demanding ultra HVDC power cable applications operating 400 to 850 kV.

HVDC power cable means herein either HVDC power cable, for example with operating at voltages as defined herein, or ultra high HVDC power cable, e.g. with operating at voltages as defined herein.

In a further embodiment of the present invention a polymer composition, as described herein, is disclosed, wherein $Dvol_1$ is 0.05.

In still a further embodiment of the present invention a polymer composition, as described herein, is disclosed, wherein $Dvol_1$ is 0.10.

In an even further embodiment of the present invention a polymer composition, as described herein, is disclosed, wherein $Dvol_1$ is 0.15.

In a further embodiment of the present invention a polymer composition, as described herein, is disclosed, wherein $Dvol_1$ is 0.20.

In still a further embodiment of the present invention a polymer composition, as described herein, is disclosed, wherein $Dvol_1$ is 0.22.

In an even further embodiment of the present invention a polymer composition, as described herein, is disclosed, wherein $Dvol_1$ is 0.25.

In a further embodiment of the present invention a polymer composition, as described herein, is disclosed, wherein $Dvol_2$ is 4.0.

In still a further embodiment of the present invention a polymer composition, as described herein, is disclosed, wherein $Dvol_2$ is 3.5.

In an even further embodiment of the present invention a polymer composition, as described herein, is disclosed, wherein $Dvol_2$ is 3.0.

In a further embodiment of the present invention a polymer composition, as described herein, is disclosed, wherein $Dvol_2$ is 2.5.

In an even further embodiment of the present invention a polymer composition, as described herein, is disclosed, wherein $Dvol_2$ is 2.2.

In a further embodiment of the present invention a polymer composition, as described herein, is disclosed, wherein $Dvol_2$ is 2.0.

In a further embodiment of the present invention a polymer composition, as described herein, is disclosed, wherein $Dvol_2$ is 1.8.

In an even further embodiment of the present invention a polymer composition, as described herein, is disclosed, wherein $Dvol_2$ is 1.6.

In a further embodiment of the present invention a polymer composition, as described herein, is disclosed, wherein $Dvol_2$ is 1.5.

In a further embodiment of the present invention a polymer composition, as described herein, is disclosed, wherein $Dvol_1$ is 0.10 and $Dvol_2$ is 3.5.

In an even further embodiment of the present invention a polymer composition, as described herein, is disclosed, wherein $Dvol_1$ is 0.10 and $Dvol_2$ is 2.5.

In a further embodiment of the present invention a polymer composition, as described herein, is disclosed, wherein $Dvol_1$ is 0.15 and $Dvol_2$ is 2.5.

In an even further embodiment of the present invention a polymer composition, as described herein, is disclosed, wherein $Dvol_1$ is 0.10 and $Dvol_2$ is 2.0.

In a further embodiment of the present invention a polymer composition, as described herein, is disclosed, wherein $Dvol_1$ is 0.15 and $Dvol_2$ is 2.0.

In still a further embodiment of the present invention a polymer composition, as described herein, is disclosed, wherein $Dvol_1$ is 0.20 and $Dvol_2$ is 2.5.

In an even further embodiment of the present invention a polymer composition, as described herein, is disclosed, wherein $E_2$ is 265.

In a further embodiment of the present invention a polymer composition, as described herein, is disclosed, wherein $E_2$ is 260.

In a further embodiment of the present invention a polymer composition, as described herein, is disclosed, wherein $E_2$ is 275.

In still a further embodiment of the present invention a polymer composition, as described herein, is disclosed, wherein $E_2$ is 270.

In an even further embodiment of the present invention a polymer composition, as described herein, is disclosed, wherein $E_2$ is 265.

In a further embodiment of the present invention a polymer composition, as described herein, is disclosed, wherein $E_2$ is 260.

In still a further embodiment of the present invention a polymer composition, as described herein, is disclosed, wherein $E_2$ is 255.

In an even further embodiment of the present invention a polymer composition, as described herein, is disclosed, wherein $E_2$ is 250.

In a further embodiment of the present invention a polymer composition, as described herein, is disclosed, wherein $F_2$ is 135.

In still a further embodiment of the present invention a polymer composition, as described herein, is disclosed, wherein $F_2$ is 130.

In an even further embodiment of the present invention a polymer composition, as described herein, is disclosed, wherein $F_2$ is 125.

In a further embodiment of the present invention a polymer composition, as described herein, is disclosed, wherein $F_2$ is 120.

In still a further embodiment of the present invention a polymer composition, as described herein, is disclosed, wherein $F_2$ is 115.

In an even further embodiment of the present invention a polymer composition, as described herein, is disclosed, wherein $F_2$ is 110.

In still a further embodiment of the present invention a polymer composition, as described herein, is disclosed, wherein $F_2$ is 105.

In an even further embodiment of the present invention a polymer composition, as described herein, is disclosed, wherein $F_2$ is 100.

In still a further embodiment of the present invention a polymer composition, as described herein, is disclosed, wherein $E_2$ is 275 and $F_2$ is 135.

In an even further embodiment of the present invention a polymer composition, as described herein, is disclosed, wherein $E_2$ is 275 and $F_2$ is 130.

In still a further embodiment of the present invention a polymer composition, as described herein, is disclosed, wherein $E_2$ is 270 and $F_2$ is 135.

In a further embodiment of the present invention, a polymer composition, as described herein, is disclosed, wherein $E_2$ is 270 and $F_2$ is 130.

In still a further embodiment of the present invention a polymer composition, as described herein, is disclosed, wherein $E_2$ is 265 and $F_2$ is 130.

In an even further embodiment of the present invention a polymer composition, as described herein, is disclosed, wherein $E_2$ is 270 and $F_2$ is 125.

In a further embodiment of the present invention, a polymer composition, as described herein, is disclosed, wherein $E_2$ is 265 and $F_2$ is 125.

A further embodiment of the present invention relates to a polymer composition, as described herein, wherein the polymer composition comprises a polymer (a) and a weight percentage (wt. %) of the nanoparticle filler (b) which is A, wherein A is 0.05 wt. %, or more, and wherein the polymer composition has a first nanoparticle aggregate ratio which is B, wherein B is 0.50, or less, and wherein a first aggregate size is defined as a cluster of nanoparticles with a cluster size larger than $d_1$, wherein $d_1$ is 1.0 μm.

It has been found that a polymer composition, in accordance with the present invention, comprising a polymer (a) and a nanoparticle filler (b), which polymer composition comprises a weight percentage (wt. %) of the nanoparticle filler (b) which is A, wherein A is 0.05 wt. %, or more, and wherein the polymer composition has a first nanoparticle aggregate ratio which is B, wherein B is 0.50, or less, and wherein the first aggregate size is larger than $d_1$, wherein $d_1$ is 1.0 μm, exhibits a surprisingly low level of charging currents.

Thus, in a polymer composition, in accordance with the present invention, when a polymer (a) is blended with a nanoparticle filler (b) and wherein the polymer composition has a first nanoparticle aggregate ratio which is B, as described herein, and wherein the first aggregate size is larger than $d_1$, as described herein, the resulting polymer composition unexpectedly exhibits improved electrical properties in comparison to the electrical properties of known polymer nanoparticle fillers compositions.

In further embodiments of the present invention, a polymer composition, as described herein, is disclosed, wherein A is 0.05 wt. %, or more; 0.06 wt. %, or more; or, alternatively, 0.08 wt. %, or more.

In a further embodiment of the present invention a polymer composition, as described herein, is disclosed, wherein A is 0.1 wt. %, or more.

In still a further embodiment of the present invention, a polymer composition, as described herein, is disclosed comprising a polymer (a) and a nanoparticle filler (b), wherein the polymer composition comprises a weight percentage (wt. %) of the nanoparticle filler (b) which is A, wherein A is 0.1 wt. %, or more, and wherein the polymer composition has a first nanoparticle aggregate ratio which is B, as described herein, and wherein the first aggregate size is larger than $d_1$, as described herein.

In even further embodiments of the present invention, a polymer composition, as described herein, is disclosed, wherein A is 0.2 wt. %, or more; 0.4 wt. %, or more; is 0.5 wt. %, or more; 0.6 wt. %, or more; or, alternatively, A is 0.8 wt. %, or more.

In a further embodiment of the present invention a polymer composition, as described herein, is disclosed, wherein A is 1.0 wt. %, or more.

In a further embodiment of the present invention, a polymer composition, as described herein, is disclosed comprising a polymer (a) and a nanoparticle filler (b), wherein the polymer composition comprises a weight percentage (wt. %) of the nanoparticle filler (b) which is A, wherein A is 1.0 wt. %, or more, and wherein the polymer composition has a first nanoparticle aggregate ratio which is B, as described herein, and wherein the first aggregate size is larger than $d_1$, as described herein.

In still further embodiments of the present invention, a polymer composition, as described herein, is disclosed, wherein A is 1.2 wt. %, or more; 1.4 wt. %, or more; 1.5 wt. %, or more; 1.6 wt. %, or more; or, alternatively, A is 1.8 wt. %, or more.

In still a further embodiment of the present invention a polymer composition, as described herein, is disclosed, wherein A is 1.5 wt. %, or more.

In an even further embodiment of the present invention a polymer composition, as described herein, is disclosed, wherein A is 2.0 wt. %, or more.

In further embodiments of the present invention, a polymer composition, as described herein, is disclosed, wherein A is 2.2 wt. %, or more; 2.4 wt. %, or more; 2.5 wt. %, or more; 2.6 wt. %, or more; or, alternatively, 2.8 wt. %, or more.

In a further embodiment of the present invention a polymer composition, as described herein, is disclosed, wherein A is 2.5 wt. %, or more.

In still a further embodiment of the present invention a polymer composition, as described herein, is disclosed, wherein A is 3.0 wt. %, or more.

In a further embodiment of the present invention, a polymer composition, as described herein, is disclosed comprising a polymer (a) and a nanoparticle filler (b), wherein the polymer composition comprises a weight percentage (wt. %) of the nanoparticle filler (b) which is A, wherein A is 3.0 wt. %, or more, and wherein the polymer composition has a first nanoparticle aggregate ratio which is B, as described herein, and wherein the first aggregate size is larger than $d_1$, as described herein.

It has been further found that the polymer composition in said further embodiment, as described herein, comprising a polymer (a) and a nanoparticle filler (b), which polymer composition comprises a weight percentage (wt. %) of the nanoparticle filler (b) which is A, wherein A is 3.0 wt. %, or more, and wherein the polymer composition has a first nanoparticle aggregate ratio which is B, as described herein, and wherein the first aggregate size is larger than $d_1$, as described herein, maintain a surprisingly low level of charging currents at an extended period of time.

It is understood herein that the nanoparticle filler (b) and the amount thereof present in the polymer composition of the invention has an effect of reducing the conductivity of the polymer composition. Accordingly the polymer composition is differentiated from, and excludes, semiconductive polymer compositions, wherein the nanoparticle filler, like carbon black, is used in amounts which increase the conductivity, and thus reduce the resistivity, of the semiconductive composition.

In further embodiments of the present invention, a polymer composition, as described herein, is disclosed, wherein A is 3.2 wt. %; or more; 3.4 wt. %, or more; 3.5 wt. %, or more; 3.6 wt. %, or more; or, alternatively, 3.8 wt. %, or more.

In a further embodiment of the present invention a polymer composition, as described herein, is disclosed, wherein A is 3.5 wt. %, or more.

In still a further embodiment of the present invention a polymer composition, as described herein, is disclosed, wherein A is 4.0 wt. %, or more.

In still further embodiments of the present invention a polymer composition, as described herein, is disclosed, wherein A is 4.2 wt. %, or more; 4.4 wt. %, or more; 4.5 wt. %, or more; 4.6 wt. %, or more; or, alternatively, 4.8 wt. %, or more.

In a further embodiment of the present invention a polymer composition, as described herein, is disclosed, wherein A is 4.5 wt. %, or more.

In still a further embodiment of the present invention a polymer composition, as described herein, is disclosed, wherein A is 5.0 wt. %, or more.

In further embodiments of the present invention a polymer composition, as described herein, is disclosed, wherein A is 5.2 wt. %, or more; 5.4 wt. %, or more; 5.5 wt. %, or more; 5.6 wt. %, or more; or, alternatively, 5.8 wt. %, or more.

In a further embodiment of the present invention a polymer composition, as described herein, is disclosed, wherein A is 5.5 wt. %, or more.

In still a further embodiment of the present invention a polymer composition, as described herein, is disclosed, wherein A is 6.0 wt. %, or more.

In further embodiments of the present invention a polymer composition, as described herein, is disclosed, wherein A is 6.2 wt. %, or more; 6.4 wt. %, or more; 6.5 wt. %, or more; 6.6 wt. %, or more; or, alternatively, 6.8 wt. %, or more.

In an even further embodiment of the present invention a polymer composition, as described herein, is disclosed, wherein A is 6.5 wt. %, or more.

In still a further embodiment of the present invention a polymer composition, as described herein, is disclosed, wherein A is 7.0 wt. %, or more.

In further embodiments of the present invention a polymer composition, as described herein, is disclosed, wherein A is 7.2 wt. %, or more; 7.4 wt. %, or more; 7.5 wt. %, or more; 7.6 wt. %, or more; or, alternatively, 7.8 wt. %, or more.

In an even further embodiment of the present invention a polymer composition, as described herein, is disclosed, wherein A is 7.5 wt. %, or more.

In still a further embodiment of the present invention a polymer composition, as described herein, is disclosed, wherein A is 8.0 wt. %, or more.

In further embodiments of the present invention a polymer composition, as described herein, is disclosed, wherein A is 8.2 wt. %, or more; 8.4 wt. %, or more; 8.5 wt. %, or more; 8.6 wt. %, or more; or, alternatively, 8.8 wt. %, or more.

In an even further embodiment of the present invention a polymer composition, as described herein, is disclosed, wherein A is 8.5 wt. %, or more.

In still a further embodiment of the present invention a polymer composition, as described herein, is disclosed, wherein A is 9.0 wt. %, or more.

In a further embodiment of the present invention a polymer composition, as described herein, is disclosed wherein A is 15.0 wt. %, or less.

In further embodiments of the present invention a polymer composition, as described herein, is disclosed, wherein A is 15.0 wt. %, or less; 14.5 wt. %, or less; 14.0 wt. %, or less; 13.5 wt. %, or less; or, alternatively, 13.0 wt. %, or less.

In still further embodiments of the present invention a polymer composition, as described herein, is disclosed, wherein A is 12.5 wt. %, or less; 12.0 wt. %, or less; 11.5 wt. %, or less; or, alternatively, 11.0 wt. %, or less.

In further embodiments of the present invention a polymer composition, as described herein, is disclosed, wherein A is 11.8 wt. %, or less; 11.6 wt. %, or less; 11.5 wt. %, or less; 11.4 wt. %, or less; or, alternatively, 11.2 wt. %, or less.

In a further embodiment of the present invention a polymer composition, as described herein, is disclosed, wherein A is 11.0 wt. %, or less.

In even further embodiments of the present invention a polymer composition, as described herein, is disclosed, wherein A is 10.8 wt. %, or less; 10.6 wt. %, or less; 10.5 wt. %, or less; 10.4 wt. %, or less; or, alternatively, 10.2 wt. %, or less.

In still a further embodiment of the present invention a polymer composition, as described herein, is disclosed, wherein A is 10.0 wt. %, or less.

In still further embodiments of the present invention a polymer composition, as described herein, is disclosed, wherein A is 9.8 wt. %, or less; 9.6 wt. %, or less; 9.5 wt. %, or less; 9.4 wt. %, or less; or, alternatively, 9.2 wt. %, or less.

In even further embodiments of the present invention a polymer composition, as described herein, is disclosed, wherein A is 8.8 wt. %, or less; 8.6 wt. %, or less; 8.5 wt. %, or less; 8.4 wt. %, or less; or, alternatively, 8.2 wt. %, or less.

In further embodiments of the present invention a polymer composition, as described herein, is disclosed, wherein A is 7.8 wt. %, or less; 7.6 wt. %, or less; 7.5 wt. %, or less; 7.4 wt. %, or less; or, alternatively, 7.2 wt. %, or less.

Further embodiments of the present invention relate to a polymer composition, as described herein, wherein B is 0.48 or less; 0.46 or less; 0.45 or less; 0.44 or less; or, alternatively, 0.42 or less.

In a further embodiment of the present invention a polymer composition, as described herein, is disclosed, wherein B is 0.45 or less.

In an even further embodiment of the present invention a polymer composition, as described herein, is disclosed, wherein B is 0.40 or less.

In further embodiments of the present invention a polymer composition, as described herein, is disclosed, wherein B is 0.38 or less; 0.36 or less; 0.35 or less; 0.34 or less; or, alternatively, 0.32 or less.

In a further embodiment of the present invention a polymer composition, as described herein, is disclosed, wherein B is 0.35 or less.

In still a further embodiment of the present invention a polymer composition, as described herein, is disclosed, wherein B is 0.30 or less.

In still further embodiments of the present invention a polymer composition, as described herein, is disclosed, wherein B is 0.28 or less; 0.26 or less; 0.25 or less; 0.24 or less; or, alternatively, 0.22 or less.

In a further embodiment of the present invention a polymer composition, as described herein, is disclosed, wherein B is 0.25 or less.

In still a further embodiment of the present invention a polymer composition, as described herein, is disclosed, wherein B is 0.20 or less.

In an even further embodiment of the present invention a polymer composition, as described herein, is disclosed, wherein B is 0.18 or less.

An embodiment of the present invention relates to a polymer composition, as described herein, wherein A is 0.05 wt. %, or more, and B is 0.35 or less.

In a further embodiment of the present invention a polymer composition, as described herein, is disclosed, wherein A is 0.05 wt. %, or more, and B is 0.30 or less.

In an even further embodiment of the present invention a polymer composition, as described herein, is disclosed, wherein A is 0.05 wt. %, or more, and B is 0.28 or less.

A further embodiment of the present invention relates to a polymer composition, as described herein, wherein A is 0.1 wt. %, or more, and B is 0.35 or less.

In a further embodiment of the present invention a polymer composition, as described herein, is disclosed, wherein A is 0.1 wt. %, or more, and B is 0.30 or less.

In an even further embodiment of the present invention a polymer composition, as described herein, is disclosed, wherein A is 0.1 wt. %, or more, and B is 0.28 or less.

An embodiment of the present invention relates to a polymer composition, as described herein, wherein A is 0.8 wt. %, or more, and B is 0.35 or less.

In a further embodiment of the present invention a polymer composition, as described herein, is disclosed, wherein A is 0.8 wt. %, or more, and B is 0.30 or less.

In an even further embodiment of the present invention a polymer composition, as described herein, is disclosed, wherein A is 0.8 wt. %, or more, and B is 0.28 or less.

A further embodiment of the present invention relates to a polymer composition, as described herein, wherein A is 1.0 wt. %, or more, and B is 0.35 or less.

In a further embodiment of the present invention a polymer composition, as described herein, is disclosed, wherein A is 1.0 wt. %, or more, and B is 0.30 or less.

In an even further embodiment of the present invention a polymer composition, as described herein, is disclosed, wherein A is 1.0 wt. %, or more, and B is 0.28 or less.

An embodiment of the present invention relates to a polymer composition, as described herein, wherein A is 5.5 wt. %, or more, and B is 0.35 or less.

In a further embodiment of the present invention a polymer composition, as described herein, is disclosed, wherein A is 5.5 wt. %, or more, and B is 0.30 or less.

In an even further embodiment of the present invention a polymer composition, as described herein, is disclosed, wherein A is 5.5 wt. %, or more, and B is 0.28 or less.

A further embodiment of the present invention relates to a polymer composition, as described herein, wherein A is 6.0 wt. %, or more, and B is 0.35 or less.

In a further embodiment of the present invention a polymer composition, as described herein, is disclosed, wherein A is 6.0 wt. %, or more, and B is 0.30 or less.

In an even further embodiment of the present invention a polymer composition, as described herein, is disclosed, wherein A is 6.0 wt. %, or more, and B is 0.28 or less.

The present invention relates to a polymer composition as described herein, wherein the polymer composition has a first nanoparticle aggregate ratio which is B, wherein B is 0.50, or less, and wherein a first aggregate size is defined as a cluster of nanoparticles with a cluster size larger than $d_1$, wherein $d_1$ is 1.0 μm.

The first nanoparticle aggregate ratio is the ratio between "metal oxide"-phase larger than $d_1$, i.e. cluster of nanoparticles with a cluster size larger than $d_1$, and the complete area of "metal oxide"-phase, i.e. area of nanoparticles and cluster of nanoparticles, in the polymer composition. An aggregate ratio which is B, wherein B is 0.50, means that half of all nanoparticles are aggregated, i.e. half of all nanoparticles are in clusters of nanoparticles with a cluster size larger than $d_1$.

The metal oxide may be MgO, ZnO, $Al_2O_3$, $TiO_2$, $Fe_3O_4$, barium oxide, calcium oxide, or strontium oxide, or, alternatively, any mixtures thereof.

In a further embodiment of the present invention, said metal oxide may be MgO or ZnO.

In still a further embodiment of the present invention, the first nanoparticle aggregate ratio is the ratio between MgO-phase larger than $d_1$, i.e. cluster of nanoparticles with a cluster size larger than $d_1$, and the complete area of MgO-phase, i.e. area of nanoparticles and cluster of nanoparticles, in the polymer composition. An aggregate ratio which is B, wherein B is 0.50, means that half of all nanoparticles are aggregated, i.e. half of all nanoparticles are in clusters of nanoparticles with a cluster size larger than $d_1$.

In an even further embodiment of the present invention, the first nanoparticle aggregate ratio is the ratio between ZnO-phase larger than $d_1$, i.e. cluster of nanoparticles with a cluster size larger than $d_1$, and the complete area of ZnO-phase, i.e. area of nanoparticles and cluster of nanoparticles, in the polymer composition. An aggregate ratio which is B, wherein B is 0.50, means that half of all nanoparticles are aggregated, i.e. half of all nanoparticles are in clusters of nanoparticles with a cluster size larger than $d_1$.

In a further embodiment of the present invention, the first aggregate size is defined as a cluster of nanoparticles with a cluster size larger than $d_1$, wherein $d_1$ is 0.95 μm.

In still a further embodiment, $d_1$ is 0.90 μm.

In an even further embodiment, $d_1$ is 0.85 μm.

The present invention also relates to an embodiment, as described herein, wherein $d_1$ is 0.80 μm.

In an even further embodiment of the present invention, the first aggregate size is defined as a cluster of nanoparticles with a cluster size larger than $d_1$, wherein $d_1$ is 0.75 μm.

In still a further embodiment, $d_1$ is 0.70 μm.

In an even further embodiment, $d_1$ is 0.65 μm.

The present invention also relates to an embodiment, as described herein, wherein $d_1$ is 0.60 μm.

In still a further embodiment of the present invention, the first aggregate size is defined as a cluster of nanoparticles with a cluster size larger than $d_1$, wherein $d_1$ is 0.55 μm.

In still a further embodiment, $d_1$ is 0.50 μm.

In an even further embodiment, $d_1$ is 0.45 μm.

In still a further embodiment of the present invention, the first aggregate size is defined as a cluster of nanoparticles with a cluster size larger than $d_1$, wherein $d_1$ is 0.40 μm.

In still a further embodiment, $d_1$ is 0.35 μm.

In an even further embodiment of the present invention, the first aggregate size is defined as a cluster of nanoparticles with a cluster size larger than $d_1$, wherein $d_1$ is 0.30 μm.

The present invention also relates to an embodiment, as described herein, wherein $d_1$ is 0.25 μm.

In still a further embodiment of the present invention, the first aggregate size is defined as a cluster of nanoparticles with a cluster size larger than $d_1$, wherein $d_1$ is 0.20 μm.

In still a further embodiment, $d_1$ is 0.15 μm.

The present invention also relates to an embodiment, as described herein, wherein $d_1$ is 0.132 μm.

The present invention also relates to an embodiment, as described herein, wherein $d_1$ is 0.130 μm.

In still a further embodiment of the present invention, the first aggregate size is defined as a cluster of nanoparticles with a cluster size larger than $d_1$, wherein $d_1$ is 0.120 μm.

In still a further embodiment, $d_1$ is 0.110 μm.

The present invention also relates to an embodiment, as described herein, wherein $d_1$ is 0.100 μm.

An embodiment of the present invention discloses a polymer composition, as described herein, wherein the polymer composition has a second nanoparticle aggregate ratio which is C, wherein C is 0.050, or less, wherein a second aggregate size is defined as a cluster of nanoparticles with a cluster size larger than $d_2$, wherein $d_2$ is 10 μm.

It has been found that a polymer composition, in accordance with the present invention, comprising a polymer (a) and a nanoparticle filler (b), which polymer composition comprises a weight percentage (wt. %) of the nanoparticle filler (b) which is A, wherein A is as described herein, and wherein the polymer composition has a first nanoparticle aggregate ratio which is B, as described herein, and wherein the first aggregate size is larger than $d_1$, as described herein, and a second nanoparticle aggregate ratio which is C, as described herein, and wherein the second aggregate size is larger than $d_2$, as described herein, exhibits a surprisingly low level of charging currents.

A low level of charging currents in the polymer composition means that the polymer composition also exhibits a low electrical conductivity. Thus, when a polymer (a) is blended with a modified nanoparticle filler (b) in accordance with the present invention, the resulting polymer composition unexpectedly exhibits improved electrical properties compared to the electrical properties of a polymer composition comprising polymer (a) blended with an unmodified nanoparticle filler. Namely, the polymer composition of the invention has reduced, i.e. low, electrical conductivity. The reduced, i.e. low, electrical conductivity is reflected by a reduced, i.e. low level of charging currents that is reached, and which is measured in the "Conductivity Measurement Method" as described herein.

Further embodiments of the present invention relate to a polymer composition, as described herein, wherein C is 0.040 or less; 0.030 or less; 0.025 or less; 0.020 or less; or, alternatively, 0.015 or less.

In a further embodiment of the present invention a polymer composition, as described herein, is disclosed, wherein C is 0.025 or less.

In an even further embodiment of the present invention a polymer composition, as described herein, is disclosed, wherein C is 0.020 or less.

In still a further embodiment of the present invention a polymer composition, as described herein, is disclosed, wherein C is 0.015 or less.

In a further embodiment of the present invention, the second aggregate size is defined as a cluster of nanoparticles with a cluster size larger than $d_2$, wherein $d_2$ is 9.0 μm.

In still a further embodiment, $d_2$ is 8.0 μm.

In an even further embodiment, $d_2$ is 7.0 μm.

A further embodiment of the present invention relates to a polymer composition, as described herein, wherein $d_2$ is 6.0 μm.

In a further embodiment of the present invention a polymer composition, as described herein, is disclosed, wherein $d_2$ is 5.0 μm.

In an even further embodiment of the present invention a polymer composition, as described herein, is disclosed, wherein $d_2$ is 4.0 μm.

An embodiment of the present invention relates to a polymer composition, as described herein, wherein $d_2$ is 3.0 μm.

In a further embodiment of the present invention a polymer composition, as described herein, is disclosed, wherein $d_2$ is 2.0 μm.

In an even further embodiment of the present invention a polymer composition, as described herein, is disclosed, wherein $d_2$ is 1.0 μm.

A further embodiment of the present invention relates to a polymer composition, as described herein, wherein $d_2$ is 0.8 μm.

In a further embodiment of the present invention, the second aggregate size is defined as a cluster of nanoparticles with a cluster size larger than $d_2$, wherein $d_2$ is 0.6 μm.

The present invention also relates to an embodiment, as described herein, wherein $d_2$ is 0.4 μm.

In an embodiment of the present invention, a polymer composition, as described herein, is disclosed wherein the polymer composition is transparent. Further, the polymer composition is transparent in the molten state. This is an advantage since it allows cables to be inspected for contaminants; breakdowns, etc. with the so called cable check method.

The polymer composition has a level of charging currents after $10^3$ seconds which is $1 \times 10^{-9}$ ampere (A) or less, where the measurements of level of charging currents were performed following the "Conductivity Measurement Method", i.e. standard procedure according to IEC, in Methods of Test for Volume Resistivity and Surface Resistivity of Solid Electrical Insulating Materials, Standard 60093, 1980, by applying direct current (DC) voltage of 2.6 kV on ca. 80 μm thick polymer composition samples at 32 kV/mm and at 60° C. In further embodiments of the present invention the polymer composition has a level of charging currents after $10^3$ seconds which is $8 \times 10^{-10}$ ampere (A) or less, for example, $6 \times 10^{-10}$ ampere (A) or less, for example, $5 \times 10^{-10}$ ampere (A) or less, for example, $4 \times 10^{-10}$ ampere (A) or less, for example, $2 \times 10^{-10}$ ampere (A) or less, or, alternatively, for example, $1 \times 10^{-10}$ ampere (A) or less, where the measurements of level of charging currents were performed as described herein.

Accordingly, the invention is also directed to a method for reducing, i.e. for providing a low, electrical conductivity of a polymer composition of electrical devices, e.g. power cables, for example, HVAC, UHVAC, DCHV and UHVDC cables, capacitor films and photovoltaic (PV) modules, using the polymer composition of the invention.

Further, the polymer composition comprises the polymer (a) in an amount of 70% by weight (wt. %) or more, for example, of 80 wt. % or more, for example, from 85 to 99.95 wt. %, for example, from 90.0 to 99.9 wt. %, for example, from 95.0 to 99.9 wt. %, for example, from 96.0 to 99.9 wt. %, based on the combined amount of the polymer (a), the nanoparticle filler (b), optional peroxide and any further components.

The polymer (a) can be any suitable polymer, for example, a polyolefin, e.g. polyethylene (PE) or polypropylene (PP).

In a further embodiment of the present invention a polymer composition, as described herein, is disclosed, wherein the polymer (a) is a polyethylene polymerised in a high-pressure polymerisation process, for example, a low-density polyethylene (LDPE) polymer, e.g. being an optionally unsaturated LDPE homopolymer or an optionally unsaturated LDPE copolymer of ethylene with one or more comonomer(s).

Further, the polymer (a) may be, e.g. a polyethylene polymerised in a high-pressure polymerisation process and, for example, in the presence of an initiator(s), for example, a low-density polyethylene (LDPE) polymer polymerised in a high-pressure polymerisation process and in the presence of an initiator(s), e.g., an LDPE being an optionally unsaturated LDPE homopolymer or an optionally unsaturated LDPE copolymer of ethylene with one or more comonomer (s).

"Polyethylene polymerised in the presence of an olefin polymerisation catalyst" is also often called as "low-pressure polyethylene" to distinguish it clearly from LDPE. Both expressions are well known in the polyolefin field. "Low-density polyethylene", LDPE, is a polyethylene produced in a high-pressure polymerisation process. Typically the polymerisation of ethylene and optional further comonomer(s) in the high-pressure process is carried out in the presence of an initiator(s). The meaning of LDPE polymer is well known and documented in the literature.

Furthermore, see herein under section "Polymer (a)" for further description and embodiments of polymer (a).

The nanoparticle filler (b) can be any nanoparticle filler, for example, selected from conventional, e.g. commercially available, nanoparticle fillers suitable for insulation. The nanoparticle filler (b) is further described herein under "Nanoparticle filler (b)".

The amount of nanoparticle filler (b) depends on the nature, e.g. density, of the filler. The principle is that nanoparticle filler (b) is present in an amount which reduces the electrical conductivity of the polymer composition compared to same composition but without the nanoparticle filler (b). The "DC conductivity reducing" amount can be determined by measuring the level of charging currents, which is reached, in accordance with the "Conductivity Measurement Method" as described herein.

The polymer (a) and the nanoparticle filler (b) and the further properties and exemplified embodiments thereof are further described herein.

Further, the polymer composition of the invention is, for example, crosslinkable.

"Crosslinkable" means that the polymer composition, which may, for example, be comprised in a cable layer, can be crosslinked using a crosslinking agent(s) before the use in the end application thereof. Crosslinkable polymer composition further comprises a crosslinking agent. It is exemplified that the polymer (a) of the polymer composition is crosslinked. Moreover, the crosslinked polymer composition or, respectively, the crosslinked polymer (a), is, for example, crosslinked via radical reaction with a free-radical-generating compound. The crosslinked polymer composition has a typical network, i.e. interpolymer crosslinks (bridges), as well known in the field. As evident for a skilled person, the crosslinked polymer composition can be and is defined herein with features that are present in the polymer composition or polymer (a) before or after the crosslinking, as stated or evident from the context. For instance the amount of the crosslinking agent in the polymer composition or a compositional property, such as MFR, density and/or unsaturation degree, of the polymer (a) are defined, unless otherwise stated, before crosslinking. "Crosslinked" means that the crosslinking step provides a further technical feature to the crosslinked polymer composition (product by process) which makes a further difference over prior art.

The polymer composition has the beneficial low electrical conductivity also when it is crosslinked.

In embodiments, wherein the polymer composition comprises no crosslinking agent, the electrical conductivity is determined by measuring the level of charging currents, in accordance with the "Conductivity Measurement Method" as described herein, from a sample of said polymer composition which is non-crosslinked (i.e. does not contain a crosslinking agent and has not been crosslinked with a crosslinking agent). In embodiments, wherein the polymer composition is crosslinkable and comprises a crosslinking agent, then the electrical conductivity is determined by measuring the level of charging currents, in accordance with the "Conductivity Measurement Method" as described herein, from a sample of the crosslinked polymer composition (i.e. a sample of the polymer composition is first crosslinked with the crosslinking agent initially present is the polymer composition and then the level of charging currents, which reflects the electrical conductivity, is measured from the obtained crosslinked sample).

The expression "no crosslinking agent" means herein that the polymer composition does not comprise any crosslinking agent that has been added to the polymer composition for the purpose of crosslinking the polymer composition.

In an embodiment the polymer composition comprises a crosslinking agent, for example, a peroxide. Further, the polymer composition comprises peroxide in an amount of up to 110 mmol —O—O—/kg polymer composition, for example, up to 90 mmol —O—O—/kg polymer composition, for example, 0 to 75 mmol —O—O—/kg polymer composition, for example, less than 50 mmol —O—O—/kg polymer composition or, for example, less than 40 mmol —O—O—/kg polymer composition.

In an exemplified embodiment the polymer composition comprises peroxide in an amount of less than 37 mmol —O—O—/kg polymer composition, for example, less than 35 mmol —O—O—/kg polymer composition, for example, 0.1 to 34 mmol —O—O—/kg polymer composition, for example, 0.5 to 33 mmol —O—O—/kg polymer composition, for example, 5.0 to 30 mmol —O—O—/kg polymer composition, for example, 7.0 to 30 mmol —O—O—/kg polymer composition or, for example, 10.0 to 30 mmol —O—O—/kg polymer composition.

The unit "mmol —O—O—/kg polymer composition" means herein the content (mmol) of peroxide functional groups per kg polymer composition, when measured from the polymer composition prior to crosslinking. For instance the 35 mmol —O—O—/kg polymer composition corresponds to 0.95 wt. % of the, well known, dicumyl peroxide based on the total amount (100 wt. %) of the polymer composition.

In an embodiment in accordance with the present invention, the polymer composition, as described herein, has a level of charging currents after $10^3$ seconds (said level of charging currents also reflects the DC conductivity) which is $1 \times 10^{-9}$ ampere (A) or less.

In exemplified embodiments the polymer composition, in accordance with the present invention, has a level of charging currents after $10^3$ seconds which is $1 \times 10^{-9}$ ampere (A) or less, for example, $8 \times 10^{-10}$ A or less, for example, $6 \times 10^{-10}$ A or less, for example, $5 \times 10^{-10}$ A or less, for example, $4 \times 10^{-10}$ A or less, for example, $2 \times 10^{-10}$ A or less, or, alternatively, for example, $1 \times 10^{-10}$ A or less, when measured according to the charging current method as described under "Determination Methods".

If crosslinkable, then the polymer composition may comprise one type of peroxide or two or more different types of peroxide, in which case the amount (in mmol) of —O—O—/kg polymer composition, as described herein, is the sum of the amount of —O—O—/kg polymer composition of each peroxide type. As non-limiting examples of suitable organic peroxides, di-tert-amylperoxide, 2,5-di(tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy)hexane, 1,1-di(tert-butylperoxy)cyclohexane, 1,1-di(tert amylperoxy)cyclohexane, or any mixtures thereof, can be mentioned, for example, the peroxide is selected from 2,5-di(tert-butylperoxy)-2,5-dimethylhexane, di(tert-butylperoxyisopropyl)benzene, dicumylperoxide, tert-butylcumylperoxide, di(tert-butyl)peroxide, or mixtures thereof, for example, the peroxide is dicumylperoxide.

Additionally, the polymer composition of the invention may contain, in addition to the polymer (a), nanoparticle filler (b) and the optional peroxide, further component(s) such as polymer component(s) and/or additive(s), for example, additive(s), such as any of antioxidant(s), scorch retarder(s) (SR), crosslinking booster(s), stabiliser(s), processing aid(s), flame retardant additive(s), water tree retardant additive(s), acid or ion scavenger(s), nanoparticle filler(s) and voltage stabilizer(s), as known in the polymer field. The polymer composition comprises, for example, conventionally used additive(s) for W & C applications, such as one or more antioxidant(s) and optionally one or more of scorch retarder(s) or crosslinking booster(s), for example, at least one or more antioxidant(s). The used amounts of additives are conventional and well known to a skilled person.

As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned.

The amount of polymer (a) in the polymer composition of the invention is typically of at least 35 wt. %, for example, at least 40 wt. %, for example, at least 50 wt. %, for example, at least 75 wt. %, for example, 80 to 100 wt. % and, for example, 85 to 100 wt. %, of the total weight of the polymer component(s) present in the polymer composition. The exemplified polymer composition consists of polymer (a) as the only polymer components. The expression means that the polymer composition does not contain further polymer components, but the polymer (a) as the sole polymer component.

However, it is to be understood herein that the polymer composition may comprise further component(s) other than the polymer (a) component, such as additive(s) which may optionally be added in a mixture with a carrier polymer, i.e. in so called master batch. Also the nanoparticle filler can be added in form of a master batch. In such cases the carrier medium is not calculated to the amount of the polymer components.

The polymer composition, for example, the polymer (a), may optionally be unsaturated (contain carbon-carbon double bonds) before the optional crosslinking, as further described herein under the polymer (a).

The invention further provides the polymer composition, as described herein, wherein the polymer composition comprises a peroxide in an amount of less than 37 mmol —O—O—/kg polymer composition, for example, of less than 35 mmol —O—O—/kg polymer composition, for example, of 0.1 to 34 mmol —O—O—/kg polymer composition, for example, of 0.5 to 33 mmol —O—O—/kg polymer composition, for example, from 5.0 to 30 mmol —O—O—/kg polymer composition, for example, from 7.0 to 30 mmol —O—O—/kg polymer composition, for example, from 10.0 to 30 mmol —O—O—/kg polymer composition.

Polymer (a)

The polymer (a) can be any suitable polymer, for example, a polyolefin, e.g. polyethylene (PE) or polypropylene (PP).

In an embodiment of the present invention, a polymer composition, as described herein, is disclosed wherein the polymer (a) comprises a polyolefin.

In a further embodiment of the present invention a polymer composition, as described herein, is disclosed, wherein the polymer (a) comprises a polyolefin, e.g. polyethylene (PE) or polypropylene (PP).

A further embodiment of the present invention relates to a polymer composition, as described herein, wherein the polymer (a) comprises a polyethylene (PE).

In a further embodiment of the present invention, a polymer composition, as described herein, is disclosed wherein the polymer (a) is a polyolefin, e.g. a polyethylene polymerised in a high-pressure polymerisation process, for example, a low-density polyethylene (LDPE).

In still a further embodiment of the present invention a polymer composition, as described herein, is disclosed, wherein the polymer (a) comprises a low-density polyethylene (LDPE) being a homopolymer or copolymer.

In an even further embodiment of the present invention a polymer composition, as described herein, is disclosed, wherein the polymer (a) comprises a cross-linked low-density polyethylene (LDPE).

The polymer composition can be thermoplastic, i.e. not crosslinked, or crosslinkable.

In an even further embodiment of the present invention a polymer composition, as described herein, is disclosed which is crosslinkable.

A suitable polyolefin as the polymer (a) can be any polyolefin, such as any conventional polyolefin, which can be used in a cable layer, for example, in an insulating layer, of a cable, for example, of a power cable.

Suitable polyolefins as the polymer (a) are e.g. as such well known and can be e.g. commercially available or can be prepared according to or analogously to known polymerisation processes described in the chemical literature.

Accordingly, the polymer (a) is, for example, a polyethylene produced in a high-pressure process, for example, a low-density polyethylene LDPE produced in a high-pressure process. The meaning of LDPE polymer is well known and documented in the literature. Although the term LDPE is an abbreviation for low-density polyethylene, the term is understood not to limit the density range, but covers the LDPE-like high-pressure (HP) polyethylenes with low, medium and higher densities. The term LDPE describes and distinguishes only the nature of HP polyethylene with typical features, such as different branching architecture, compared to the PE produced in the presence of an olefin polymerisation catalyst.

Where it is referred to polyolefin herein, e.g. polyethylene, this is intended to mean both a homo- and copolymer, e.g. an ethylene homo- and copolymer. The polyolefin copolymer may contain one or more comonomer(s).

As well known "comonomer" refers to copolymerisable comonomer units.

In case a polymer (a) is a copolymer of ethylene with at least one comonomer, then suitable such other comonomer is selected from non-polar comonomer(s) or polar comonomers, or any mixtures thereof. Exemplified other non-polar comonomers and polar comonomers are described herein in relation to polyethylene produced in a high-pressure process.

The polyethylene polymer as the polymer (a) can be a polyethylene polymerised in a high-pressure (HP) polymerisation process, for example, in the presence of an intiator(s).

The polymer (a) may be a low-density polyethylene (LDPE) polymer produced in a high-pressure (HP) polymerisation process. It is to be noted that a polyethylene produced in a high-pressure (HP) process is referred herein generally as LDPE and which term has a well known meaning in the polymer field. Although the term LDPE is an abbreviation for low-density polyethylene, the term is understood not to limit the density range, but covers the LDPE-like high-pressure (HP) polyethylenes with low, medium and higher densities. The term LDPE describes and distinguishes only the nature of HP polyethylene with typical features, such as high branching architecture, compared to the PE produced in the presence of an olefin polymerisation catalyst.

The exemplified polymer (a) may be an LDPE polymer which may be a low density homopolymer of ethylene (referred herein as LDPE homopolymer) or a low density copolymer of ethylene with one or more comonomer(s) (referred herein as LDPE copolymer). The one or more comonomers of LDPE copolymer are, for example, selected from the polar comonomer(s), non-polar comonomer(s) or from a mixture of the polar comonomer(s) and non-polar comonomer(s), as described herein. Moreover, said LDPE homopolymer or LDPE copolymer as said polymer (a) may optionally be unsaturated.

As a polar comonomer for the LDPE copolymer as said polymer (a), comonomer(s) containing hydroxyl group(s), alkoxy group(s), carbonyl group(s), carboxyl group(s), ether group(s) or ester group(s), or a mixture thereof, can be used. Further, comonomer(s) containing carboxyl and/or ester group(s) are used as said polar comonomer. Furthermore, the polar comonomer(s) of LDPE copolymer is selected from the groups of acrylate(s), methacrylate(s) or acetate(s), or any mixtures thereof. If present in said LDPE copolymer, the polar comonomer(s) is, for example, selected from the group of alkyl acrylates, alkyl methacrylates or vinyl acetate, or a mixture thereof. Further, for example, if present, said polar comonomers are selected from $C_1$- to $C_6$-alkyl acrylates, $C_1$- to $C_6$-alkyl methacrylates or vinyl acetate. Further, said polar LDPE copolymer as the polymer (a) is a copolymer of ethylene with $C_1$- to $C_4$-alkyl acrylate, such as methyl, ethyl, propyl or butyl acrylate, or vinyl acetate, or any mixture thereof.

As the non-polar comonomer(s) for the LDPE copolymer as said polymer (a), comonomer(s) other than the herein described polar comonomers can be used, for example, the non-polar comonomers are other than comonomer(s) containing hydroxyl group(s), alkoxy group(s), carbonyl group (s), carboxyl group(s), ether group(s) or ester group(s). One group of exemplified non-polar comonomer(s) comprise, for example, consist of, monounsaturated (=one double bond) comonomer(s), for example, olefins, for example, alpha-olefins, for example, $C_3$ to $C_{10}$ alpha-olefins, such as propylene, 1-butene, 1-hexene, 4-methyl-1-pentene, styrene, 1-octene, 1-nonene; polyunsaturated (=more than one double bond) comonomer(s); a silane group containing comonomer(s); or any mixtures thereof. The polyunsaturated comonomer(s) are further described herein in relation to unsaturated LDPE copolymers.

If the LDPE polymer is a copolymer, it, for example, comprises 0.001 to 50 wt. %, for example, 0.05 to 40 wt. %, for example, less than 35 wt. %, for example, less than 30 wt. %, or, for example, less than 25 wt. % of one or more comonomer(s).

The polymer composition, for example, at least the polymer (a) component thereof, for example, the LDPE polymer, may optionally be unsaturated, i.e. the polymer composition, for example, the polymer (a), for example, the LDPE polymer, may comprise carbon-carbon double bonds (—C=C—). The "unsaturated" means herein that the polymer composition, for example, the polymer (a), contains carbon-carbon double bonds/1000 carbon atoms in a total amount of at least 0.1; at least 0.2; at least 0.3 or alternatively, at least 0.4/1000 carbon atoms.

As well known, the unsaturation can be provided to the polymer composition i.a. by means of the polyolefin component(s), a low molecular weight (Mw) compound(s), such as crosslinking booster(s) or scorch retarder additive(s), or any combinations thereof. The total amount of double bonds means herein double bonds determined from the source(s) that are known and deliberately added to contribute to the unsaturation. If two or more above sources of double bonds are chosen to be used for providing the unsaturation, then the total amount of double bonds in the polymer composition means the sum of the double bonds present in the double-bond sources. It is evident that a characteristic model compound for calibration is used for each chosen source to enable the quantitative infrared (FTIR) spectroscopy determination.

Any double bond assessment is carried out prior to optional crosslinking.

If the polymer composition is unsaturated (prior to optional crosslinking), then it is exemplified that the unsaturation originates at least from an unsaturated polymer (a) component. Further, the unsaturated polymer (a) is an unsaturated polyethylene, for example, an unsaturated LDPE polymer, for example, an unsaturated LDPE homopolymer or an unsaturated LDPE copolymer. When polyunsaturated comonomer(s) are present in the LDPE polymer as said unsaturated polyolefin, then the LDPE polymer is an unsaturated LDPE copolymer.

In an exemplified embodiment the term "total amount of carbon-carbon double bonds" is defined from the unsaturated polymer (a), and refers, if not otherwise specified, to the combined amount of double bonds which originate from vinyl groups, vinylidene groups and trans-vinylene groups, if present. Naturally the polymer (a) does not necessarily contain all the three types of double bonds described herein. However, any of the three types, when present, is calculated to the "total amount of carbon-carbon double bonds". The amount of each type of double bond is measured as indicated under "Determination methods".

If an LDPE homopolymer is unsaturated, then the unsaturation can be provided e.g. by a chain transfer agent (CTA), such as propylene, and/or by polymerisation conditions. If an LDPE copolymer is unsaturated, then the unsaturation can be provided by one or more of the following means: by a chain transfer agent (CTA), by one or more polyunsaturated comonomer(s) or by polymerisation conditions. It is well known that selected polymerisation conditions such as peak temperatures and pressure, can have an influence on the unsaturation level. In case of an unsaturated LDPE copolymer, it is, for example, an unsaturated LDPE copolymer of ethylene with at least one polyunsaturated comonomer, and optionally with other comonomer(s), such as polar comonomer(s) which is, for example, selected from acrylate or acetate comonomer(s). Further, an unsaturated LDPE copolymer is an unsaturated LDPE copolymer of ethylene with at least polyunsaturated comonomer(s).

The polyunsaturated comonomers suitable for the unsaturated polymer (a) consist, for example, of a straight carbon chain with at least 8 carbon atoms and at least 4 carbons between the non-conjugated double bonds, of which at least one is terminal, for example, said polyunsaturated comonomer is a diene, for example, a diene which comprises at least eight carbon atoms, the first carbon-carbon double bond being terminal and the second carbon-carbon double bond being non-conjugated to the first one. Exemplified dienes are selected from $C_8$-to-$C_{14}$ non-conjugated dienes or mixtures thereof, for example, selected from 1,7-octadiene, 1,9-decadiene, 1,11-dodecadiene, 1,13-tetradecadiene, 7-methyl-1,6-octadiene, 9-methyl-1,8-decadiene, or mixtures thereof. Further, the diene is selected from 1,7-octadiene, 1,9-decadiene, 1,11-dodecadiene, 1,13-tetradecadiene, or any mixture thereof, however, without limiting to dienes described herein.

In still a further embodiment of the present invention a polymer composition, as described herein, is disclosed, wherein the polymer (a) is an unsaturated LDPE copolymer of ethylene with at least one polyunsaturated comonomer and optionally with one or more other comonomer(s), the polyunsaturated comonomer consists, for example, of a straight carbon chain with at least 8 carbon atoms and at least 4 carbons between the non-conjugated double bonds, of which at least one is terminal, e.g., said polyunsaturated comonomer is a diene, for example a diene which comprises at least eight carbon atoms, the first carbon-carbon double bond being terminal and the second carbon-carbon double bond being non-conjugated to the first one, for example, a diene which is selected from $C_8$- to $C_{14}$-non-conjugated diene or mixtures thereof, e.g. selected from 1,7-octadiene, 1,9-decadiene, 1,11-dodecadiene, 1,13-tetradecadiene, 7-methyl-1,6-octadiene, 9-methyl-1,8-decadiene, or mixtures thereof, for example, from 1,7-octadiene, 1,9-decadiene, 1,11-dodecadiene, 1,13-tetradecadiene, or any mixture thereof.

It is well known that e.g. propylene can be used as a comonomer or as a chain transfer agent (CTA), or both, whereby it can contribute to the total amount of the carbon-carbon double bonds, for example, to the total amount of the vinyl groups. Herein, when a compound which can also act as comonomer, such as propylene, is used as CTA for providing double bonds, then said copolymerisable comonomer is not calculated to the comonomer content.

If the polymer (a), for example, the LDPE polymer, is unsaturated, then it has, for example, a total amount of carbon-carbon double bonds, which originate from vinyl groups, vinylidene groups and trans-vinylene groups, if present, of more than 0.1; more than 0.2; more than 0.3; more than 0.4 or, alternatively, more than 0.5/1000 carbon atoms. The upper limit of the amount of carbon-carbon double bonds present in the polyolefin is not limited and may, for example, be less than 5.0/1000 carbon atoms, e.g., less than 3.0/1000 carbon atoms.

In some embodiments, e.g. wherein higher crosslinking level with the low peroxide content is desired, the total amount of carbon-carbon double bonds, which originate from vinyl groups, vinylidene groups and trans-vinylene groups, if present, in the unsaturated LDPE, is, for example, higher than 0.40/1000 carbon atoms, for example, higher than 0.50/1000 carbon atoms, for example, higher than 0.60/1000 carbon atoms.

Further, the polymer (a) is an unsaturated LDPE as described herein and contains at least vinyl groups and the total amount of vinyl groups is, for example, higher than 0.05/1000 carbon atoms, for example, higher than 0.08/1000 carbon atoms, and, for example, of higher than 0.11/1000 carbon atoms, for example, the total amount of vinyl groups is of lower than 4.0/1000 carbon atoms. Furthermore, the polymer (a), prior to crosslinking, contains vinyl groups in total amount of more than 0.20/1000 carbon atoms, for example, of more than 0.30/1000 carbon atoms.

Further, the polyolefin is, for example, unsaturated and contains at least vinyl groups and the total amount of vinyl groups is, for example, higher than 0.01/1000 carbon atoms, e.g., higher than 0.05/1000 carbon atoms, for example, higher than 0.08/1000 carbon atoms, and, e.g., higher than 0.11/1000 carbon atoms. Furthermore, the total amount of vinyl groups is, for example, lower than 4.0/1000 carbon atoms. The polyolefin, prior to crosslinking, contains vinyl groups in total amount of, for example, more than 0.20/1000 carbon atoms, e.g., more than 0.30/1000 carbon atoms, and, for example, more than 0.40/1000 carbon atoms. In some demanding embodiments, for example, in power cables, e.g., in DC power cables, at least one layer, for example an insulation layer, comprises LDPE polymer, e.g., LDPE copolymer, which contains vinyl groups in total amount of more than 0.50/1000 carbon atoms.

In further embodiments of the present invention polyolefin may be a saturated LDPE homopolymer or a saturated LDPE copolymer of ethylene with one or more comonomer (s); or an unsaturated LDPE polymer, which is selected from an unsaturated LDPE homopolymer or an unsaturated LDPE copolymer of ethylene with one or more comonomer(s), for example, an unsaturated LDPE homopolymer or an unsaturated LDPE copolymer of ethylene with one or more comonomer(s), which is, for example, at least one polyunsaturated comonomer, for example, a diene as described herein, and optionally with other comonomer(s), and has the total amount of carbon-carbon double bonds, which originate from vinyl groups, vinylidene groups and trans-vinylene groups, if present, as described herein, for example, has the total amount of vinyl groups as described herein. Said unsaturated LDPE polymer is highly usable for an insulation layer of a power cable, for example, of a DC power cable, of the invention.

In an exemplified embodiment the polymer (a) is an unsaturated LDPE polymer as described herein and the polymer composition contains the exemplified "low" peroxide content of the invention as described herein. Higher double bond content combined with the exemplified "low" peroxide content further contributes to the low electrical conductivity. The embodiment is also exemplified e.g. if high cable production speed or longer extrusion time, or both, is desired. The embodiment also contributes to the desirable mechanical and/or heat resistance properties are needed for the layer, for example, insulation layer, material.

The exemplified polymer (a) for use in the polymer composition is an unsaturated LDPE copolymer of ethylene with at least one polyunsaturated comonomer, for example, a diene as described herein, and optionally with other comonomer(s), and has the total amount of carbon-carbon double bonds, which originate from vinyl groups, vinylidene groups and trans-vinylene groups, if present, as described herein, for example, has the total amount of vinyl groups as described herein. Said unsaturated LDPE copolymer is highly usable for the invention for use as the polymer (a) of a polymer composition, exemplified in an insulation layer of a power cable, for example, of a DC power cable.

Typically, and, for example, in wire and cable (W&C) applications, the density of the polymer (a), for example, of the LDPE polymer, is higher than 860 kg/m$^3$, for example, the density of the polymer (a), for example, of the LDPE homopolymer or copolymer, is not higher than 960 kg/m$^3$, and, for example, is from 900 to 945 kg/m$^3$. The MFR$_2$ (2.16 kg, 190° C.) of the polymer (a), for example, of the LDPE polymer, is, for example, from 0.01 to 50 g/10 min, for example, from 0.01 to 40.0 g/10, for example, is from 0.1 to 20 g/10 min, and, for example, is from 0.2 to 10 g/10 min.

Accordingly, the polymer (a) of the invention is a LDPE polymer, which is, for example, produced at high-pressure process by free radical initiated polymerisation (referred to as high-pressure (HP) radical polymerisation). The HP reactor can be e.g. a well known tubular or autoclave reactor or a mixture thereof, for example, a tubular reactor. The high-pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., for example, from 80 to 350° C. and pressure from 70 MPa, for example, 100 to 400 MPa, for example, from 100 to 350 MPa. Pressure can be measured at least after compression stage and/or after the tubular reactor. Temperature can be measured at several points during all steps.

After the separation the obtained polymer is typically in a form of a polymer melt which is normally mixed and pelletized in a pelletizing section, such as pelletizing extruder, arranged in connection to the HP reactor system. Optionally, additive(s), such as sulphur containing antioxidant(s), can be added in this mixer in a known manner to result in the polymer (a).

Further details of the production of ethylene (co)polymers by high-pressure radical polymerisation can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure", R. Klimesch, D. Littmann and F.-O. Mähling pp. 7181-7184.

When an unsaturated LDPE copolymer of ethylene is prepared, then, as well known, the C═C double bond content can be adjusted by polymerising the ethylene e.g. in the presence of one or more polyunsaturated comonomer(s), chain transfer agent(s), process conditions, or any combinations thereof, e.g. using the desired feed ratio between monomer, for example ethylene, and polyunsaturated comonomer and/or chain transfer agent, depending on the nature and amount of C═C double bonds desired for the unsaturated LDPE copolymer. I.a. WO 9308222 describes a high-pressure radical polymerisation of ethylene with polyunsaturated monomers. As a result the unsaturation can be uniformly distributed along the polymer chain in random copolymerisation manner. Also e.g. WO 9635732 describes high-pressure radical polymerisation of ethylene and a certain type of polyunsaturated α,ω-divinylsiloxanes.

Nanoparticle Filler (b)

The nanoparticle filler (b) can be any nanoparticle filler, for example, any conventional, such as a commercially available nanoparticle filler. Further, the nanoparticle filler (b) may be suitable for an insulation layer. The nanoparticle filler (b) is, for example, selected from inorganic oxides, hydroxides, carbonates, fullerenes, nitrides, carbides, kaolin clay, talc, borates, alumina, titania or titanates, silica, silicates, zirconia, zinc oxide, glass fibres, glass particles, or any mixtures thereof.

In an embodiment, the nanoparticle filler (b) is selected from inorganic oxides, hydroxides, carbonates, fullerenes, nitrides, carbides, kaolin clay, talc, borates, alumina, titania or titanates, silica, silicates, zirconia, zinc oxide, glass fibres or glass particles, or any mixtures thereof, for example an inorganic oxide, e.g. an inorganic oxide selected from MgO, SiO$_2$, TiO$_2$, ZnO, Al$_2$O$_3$, Fe$_3$O$_4$, barium oxide, calcium oxide, or strontium oxide, or any mixtures thereof.

In a further embodiment, the nanoparticle filler (b) is an inorganic oxide, for example, a metal oxide, e.g. MgO, ZnO, Al$_2$O$_3$, TiO$_2$, Fe$_3$O$_4$, barium oxide, calcium oxide, or strontium oxide, or, alternatively, any mixtures thereof.

In an even further embodiment, the nanoparticle filler (b) is an inorganic oxide, for example, a metal oxide, e.g. a MgO or a ZnO.

In a further embodiment, the nanoparticle filler (b) is an inorganic oxide, for example, a MgO.

In still a further embodiment, the nanoparticle filler (b) is an inorganic oxide, for example, a ZnO.

A further embodiment of the present invention relates to a polymer composition, as described herein, wherein the nanoparticle filler (b) comprises modified nanoparticles.

In a further embodiment of the present invention a polymer composition, as described herein, is disclosed, wherein the nanoparticle filler (b) comprises surface modified nanoparticles.

The nanoparticle filler (b) comprises nanoparticles that are modified, e.g. functionalised by incorporating a functional moiety e.g. for modifying the surface properties of the nanoparticles, such as for modifying electrical properties or improving dispersion properties of the nanoparticles. Such modifications are well known to a skilled person and discussed e.g. in WO2006081400 referred to herein under background art.

A further embodiment of the present invention relates to a polymer composition, as described herein, wherein the nanoparticle filler (b) is selected from inorganic oxides.

In a further embodiment of the present invention a polymer composition, as described herein, is disclosed, wherein the nanoparticle filler (b) comprises metal oxide. In an even further embodiment of the present invention a polymer composition, as described herein, is disclosed, wherein the nanoparticle filler (b) comprises surface modified metal oxide nanoparticles.

In an embodiment of the present invention a polymer composition, as described herein, is disclosed, wherein the nanoparticle filler (b) comprises surface modified nanoparticles, e.g. silanized nanoparticles, for example, silanized metal oxide nanoparticles.

In a further embodiment of the present invention a polymer composition, as described herein, is disclosed, wherein the nanoparticle filler (b) comprises nanoparticles which are silanized with octadecyl(trimethoxy)silane (OdTMS-C18), octyl(triethoxy)silane (OTES-C8) and/or methyltrimethoxysilane.

A further embodiment of the present invention relates to a polymer composition, as described herein, wherein the nanoparticle filler (b) comprises nanoparticles which are silanized with octadecyl(trimethoxy)silane (OdTMS-C18) and/or octyl(triethoxy)silane (OTES-C8).

The polymer composition, as described herein, wherein the nanoparticle filler (b) comprises a metal oxide C18-coated nanofiller, e.g. nanoparticles which are silanized with octadecyl(trimethoxy)silane (OdTMS-C18).

The polymer composition, as described herein, wherein the nanoparticle filler (b) comprises a metal oxide C8-coated nanofiller, e.g. nanoparticles which are silanized with octyl(triethoxy)silane (OTES-C8).

The polymer composition, as described herein, wherein the nanoparticle filler (b) comprises a metal oxide C1-coated nanofiller, e.g. nanoparticles which are silanized with methyltrimethoxysilane.

In a further embodiment of the present invention a polymer composition, as described herein, is disclosed, wherein the nanoparticle filler (b) comprises MgO.

In an even further embodiment of the present invention a polymer composition, as described herein, is disclosed, wherein the nanoparticle filler (b) comprises surface modified MgO nanoparticles.

In an embodiment of the present invention a polymer composition, as described herein, is disclosed, wherein the nanoparticle filler (b) comprises surface modified nanoparticles, e.g. silanized nanoparticles, for example, silanized MgO nanoparticles.

A further embodiment of the present invention relates to a polymer composition, as described herein, wherein the nanoparticle filler (b) comprises nanoparticles which are silanized with octadecyl(trimethoxy)silane (OdTMS-C18) and/or octyl(triethoxy)silane (OTES-C8).

The polymer composition, as described herein, wherein the nanoparticle filler (b) a MgO C18-coated nanofiller, e.g. nanoparticles which are silanized with octadecyl(trimethoxy)silane (OdTMS-C18). The nanoparticles which are silanized with octadecyl(trimethoxy)silane (OdTMS-C18) will also be called C18-MgO herein.

The polymer composition, as described herein, wherein the nanoparticle filler (b) comprises a MgO C8-coated nanofiller, e.g. nanoparticles which are silanized with octyl(triethoxy)silane (OTES-C8). The nanoparticles which are silanized with octyl(triethoxy)silane (OTES-C8) will also be called C8-MgO herein.

In a further embodiment of the present invention a polymer composition, as described herein, is disclosed, wherein the nanoparticle filler (b) comprises nanoparticles which are silanized with octadecyl(trimethoxy)silane (OdTMS-C18) or octyl(triethoxy)silane (OTES-C8).

In an even further embodiment of the present invention a polymer composition, as described herein, is disclosed, wherein the nanoparticle filler (b) comprises nanoparticles which are silanized with octadecyl(trimethoxy)silane (OdTMS-C18).

In still a further embodiment of the present invention a polymer composition, as described herein, is disclosed, wherein the nanoparticle filler (b) comprises nanoparticles which are silanized with octyl(triethoxy)silane (OTES-C8).

In a further embodiment of the present invention a polymer composition, as described herein, is disclosed, wherein the nanoparticle filler (b) comprises ZnO.

In an even further embodiment of the present invention a polymer composition, as described herein, is disclosed, wherein the nanoparticle filler (b) comprises surface modified ZnO nanoparticles.

In an embodiment of the present invention a polymer composition, as described herein, is disclosed, wherein the nanoparticle filler (b) comprises surface modified nanoparticles, e.g. silanized nanoparticles, for example, silanized ZnO nanoparticles.

In a further embodiment of the present invention a polymer composition, as described herein, is disclosed, wherein the nanoparticle filler (b) comprises nanoparticles which are silanized with octadecyl(trimethoxy)silane (OdTMS-C18), octyl(triethoxy)silane (OTES-C8) and/or methyltrimethoxysilane.

A further embodiment of the present invention relates to a polymer composition, as described herein, wherein the nanoparticle filler (b) comprises nanoparticles which are silanized with octadecyl(trimethoxy)silane (OdTMS-C18) and/or octyl(triethoxy)silane (OTES-C8).

The polymer composition, as described herein, wherein the nanoparticle filler (b) comprises a ZnO C18-coated nanofiller, e.g. nanoparticles which are silanized with octadecyl(trimethoxy)silane (OdTMS-C18). The nanoparticles which are silanized with octadecyl(trimethoxy)silane (OdTMS-C18) will also be called C18-coated ZnO herein.

The polymer composition, as described herein, wherein the nanoparticle filler (b) comprises a ZnO C8-coated nanofiller, e.g. nanoparticles which are silanized with octyl(triethoxy)silane (OTES-C8). The nanoparticles which are silanized with octyl(triethoxy)silane (OTES-C8) will also be called C8-coated ZnO herein.

The polymer composition, as described herein, wherein the nanoparticle filler (b) comprises a ZnO C1-coated nanofiller, e.g. nanoparticles which are silanized with methyltrimethoxysilane.

Moreover, the nanoparticle filler (b) suitable for the present invention can be in the form of the nanoparticle filler (b) as such or in a form of a mixture comprising the nanoparticle filler (b) and a carrier medium, as well known in the art. The nanoparticle filler (b) as such is typically in a solid powder form.

According to one embodiment the polymer composition of the invention comprises a polymer (a) and a master batch (MB) which comprises a nanoparticle filler (b) and a carrier medium.

It is to be understood, that in case of a master batch (MB) embodiment, the amount of the nanoparticle filler (b) as described herein, does not mean the amount of MB, but the amount of nanoparticle filler (b) as such, present in the polymer composition, i.e. based on the combined amount of the pure nanoparticle filler (b) as such and the polymer (a).

If the nanoparticle filler (b) is incorporated into a carrier medium, then the carrier medium can be e.g. a liquid or solid powder product, for example, solid product. In case of a liquid carrier, the filler is typically suspended to a liquid. In case of a solid carrier, the mixture is a solid product, which can comprise solid nanoparticle filler (b) particles and solid carrier particles. Alternatively, the filler can be mixed with a carrier polymer and the obtained mixture is pelletized to MB pellets. The MB's are well known in the field of nanoparticle fillers.

In a further embodiment of the present invention a polymer composition, as described herein, is disclosed, wherein the polymer composition is compounded.

In still a further embodiment of the present invention a polymer composition, as described herein, is disclosed, wherein the polymer composition is extruded.

End Uses and End Applications of the Polymer Composition of Invention

The polymer composition of the invention can be used in any application area, for example, in the electrical area, which includes the alternating current (AC) and direct current (DC) areas comprising high voltage (HV) or an ultra high voltage (UHV) e.g. for electrical devices which includes power cables, for example, HVAC, UHVAC, DCHV and UHVDC cables; capacitor films and photovoltaic (PV) modules.

Accordingly, the invention also relates to an electrical device comprising the polymer composition, as described herein, wherein the electrical device is a power cable, for example, a high voltage (HV) power cable or an ultra high voltage (UHV) power cable, e.g. a HVDC power cable or an UHVDC power cable; a capacitor film or a photovoltaic (PV) module.

In a further embodiment of the present invention, the electrical device is a power cable, for example, a high voltage (HV) power cable or an ultra high voltage (UHV) power cable, e.g. a HVDC power cable or an UHVDC power cable. The invention further provides a direct current (DC) power cable comprising a conductor which is surrounded at least by an inner semiconductive layer, an insulation layer and an outer semiconductive layer, in that order, wherein the insulation layer comprises, for example, consists of, a polymer composition of the present invention, as described herein.

Accordingly, the inner semiconductive layer of the power cable comprises, for example, consists of, a first semiconductive composition, the insulation layer comprises, for example, consists of, an insulation composition comprising the polymer composition of the present invention, as described herein, and the outer semiconductive layer comprises, for example, consists of, a second semiconductive composition. Thus the insulation composition comprises, for example, consists of, the polymer composition of the invention as described herein including the exemplified subgroups thereof.

The term "conductor" means herein that the conductor comprises one or more wires. Moreover, the cable may comprise one or more such conductors, for example, the conductor is an electrical conductor and comprises one or more metal wires.

The first and the second semiconductive compositions can be different or identical and comprise a polymer(s) which is, for example, a polyolefin or a mixture of polyolefins and a conductive filler, for example, carbon black. Suitable polyolefin(s) are e.g. polyethylene produced in a low pressure process or a polyethylene produced in a HP process (LDPE). The general polymer description as described herein in relation to the polymer (a) applies also for the suitable polymers for semiconductive layers. The carbon black can be any conventional carbon black used in the semiconductive layers of a power cable, for example, in the semiconductive layer of a DC power cable, for example, the carbon black has one or, for example, all, of the following properties: a) a primary particle size of at least 5 nm which is defined as the number average particle diameter according ASTM D3849-95a, dispersion procedure D, b) iodine number of at least 30 mg/g according to ASTM D1510, and/or c) oil absorption number of at least 30 ml/100 g which is measured according to ASTM D2414. Non-limiting examples of carbon blacks are e.g. acetylene carbon black, furnace carbon black and Ketjen carbon black, for example, furnace carbon black and acetylene carbon black, for example, the polymer composition comprises 10 to 50 wt. % carbon black, based on the weight of the Semiconductive composition.

The DC power cable of the invention is, for example, crosslinkable, wherein, at least, the insulation layer comprises, for example, consists of, the polymer composition, as described herein, comprising a polymer (a) and a nanoparticle filler (b), as described herein, and a crosslinking agent, for example, a peroxide in an amount of up to 110 mmol —O—O—/kg polymer composition, for example, of up to 90 mmol —O—O—/kg polymer composition, for example, of 1.0 to 75 mmol —O—O—/kg polymer composition, for example, of less than 50 mmol —O—O—/kg polymer composition, for example, of less than 40 mmol —O—O—/kg polymer composition, for example, of less than 37 mmol —O—O—/kg polymer composition, for example, of less than 35 mmol —O—O—/kg polymer composition, for example, of 0.1 to 34 mmol —O—O—/kg polymer composition, for example, of 0.5 to 33 mmol —O—O—/kg polymer composition, for example, from 5.0 to 30 mmol —O—O—/kg polymer composition, for example, from 7.0 to 30 mmol —O—O—/kg polymer composition, or, for example, from 10.0 to 30 mmol —O—O—/kg polymer composition.

Naturally, the further exemplified subgroups of the properties described herein, further properties, variants and embodiments as described herein for the polymer composition, of the present invention, or for the polymer (a) and the nanoparticle filler (b) thereof apply similarly to an electrical device, e.g. a DC power cable, of the present invention.

As well known the cable can optionally comprise further layers, e.g. layers surrounding the insulation layer or, if present, the outer semiconductive layers, such as screen(s), a jacketing layer(s), other protective layer(s) or any combinations thereof.

The invention provides a process for producing an electrical device, as described herein, comprising the polymer composition, also as described herein.

The invention also provides a process for producing an electrical device, as described herein, wherein the process comprises a dry processing step of the polymer composition, also as described herein.

The invention provides a process, as described herein, for producing an electrical device, e.g. a power cable, for example, a DC power cable, as described herein, which is, for example, crosslinkable, whereby the process comprises the steps of
applying on a conductor, for example, by (co)extrusion, an inner semiconductive layer comprising a first semiconductive composition, an insulation layer comprising an insulation which comprises the composition polymer composition of the present invention, and an outer semiconductive layer comprising a second semiconductive composition, in that order, wherein at least the insulation composition of the insulation layer comprises, for example, consists of, the polymer composition comprising a polymer (a) and a nanoparticle filler (b), as described herein, and optionally, and, for example, a crosslinking agent, which is, for example, a peroxide in an amount of up to 110 mmol —O—O—/kg polymer composition, for example, of up to 90 mmol —O—O—/kg polymer composition, for example, of 0 to 75 mmol —O—O—/kg polymer composition, for example, of less than 50 mmol —O—O—/kg polymer composition, for example, of less than 40 mmol —O—O—/kg polymer composition, for example, of less than 37 mmol —O—O—/kg polymer composition, for example, of less than 35 mmol —O—O—/kg polymer composition, for example, of 0.1 to 34 mmol —O—O—/kg polymer composition, for example, of 0.5 to 33 mmol —O—O—/kg polymer composition, for example, from 5.0 to 30 mmol —O—O—/kg polymer composition, for example, from 7.0 to 30 mmol —O—O—/kg polymer composition, for example, from 10.0 to 30 mmol —O—O—/kg polymer composition, for example, the polymer composition comprises the crosslinking agent and the process comprises a further step of crosslinking at least the polymer composition of said insulation layer, in the presence of the crosslinking agent, for example, in an amount as described herein, at crosslinking conditions, and optionally, and, for example, crosslinking at least one, for example, both, of the first semiconductive composition of the inner semiconductive layer and the second semiconductive composition of the outer semiconductive layer, in the presence of a crosslinking agent at crosslinking conditions.

Further, a crosslinkable DC power cable, for example, a crosslinkable HVDC power cable, is produced, wherein the process comprises the steps of
(a')
providing and mixing, for example, melt mixing in an extruder, an optionally, and, for example, crosslinkable first semiconductive composition comprising a polymer, a carbon black and optionally further component(s) for the inner semiconductive layer,
providing and mixing, for example, melt mixing in an extruder, a crosslinkable polymer composition of the invention for the insulation layer,
providing and mixing, for example, melt mixing in an extruder, an optionally, and, for example, crosslinkable second semiconductive composition comprising a polymer, a carbon black and optionally further component(s) for the outer semiconductive layer,
(b') applying on a conductor, for example, by coextrusion,
a melt mix of the first semiconductive composition obtained from step (a') to form the inner semiconductive layer,
a melt mix of polymer composition of the invention obtained from step (a') to form the insulation layer, and
a melt mix of the second semiconductive composition obtained from step (a') to form the outer semiconductive layer, and
(c) optionally crosslinking in the presence of a crosslinking agent and at crosslinking conditions one or more of the polymer composition of the insulation layer, the first semiconductive composition of the inner semiconductive layer and the second semiconductive composition of the outer semiconductive layer, of the obtained cable, for example, at least the polymer composition of the insulation layer, for example, the polymer composition of the insulation layer, the first semiconductive composition of the inner semiconductive layer and optionally, and, for example, the second semiconductive composition of the outer semiconductive layer.

Melt mixing means mixing above the melting point of at least the major polymer component(s) of the obtained mixture and is carried out for example, without limiting to, in a temperature of at least 15° C. above the melting or softening point of polymer component(s).

The term "(co)extrusion" means herein that in case of two or more layers, said layers can be extruded in separate steps, or at least two or all of said layers can be coextruded in a same extrusion step, as well known in the art. The term "(co)extrusion" means herein also that all or part of the layer(s) are formed simultaneously using one or more extrusion heads. For instance a triple extrusion can be used for forming three layers. In case a layer is formed using more than one extrusion heads, then for instance, the layers can be extruded using two extrusion heads, the first one for forming the inner semiconductive layer and the inner part of the insulation layer, and the second head for forming the outer insulation layer and the outer semiconductive layer.

As well known, the polymer composition of the invention and the optional and exemplified first and second semiconductive compositions can be produced before or during the cable production process. Moreover the polymer composition of the invention and the optional and exemplified first and second semiconductive composition can each independently comprise part or all of the component(s) of the final composition, before introducing to the (melt)mixing step a) of the cable production process.

The (melt)mixing step (a') of the provided polymer composition of the invention and of the exemplified first and second semiconductive compositions is, for example, carried out in a cable extruder. The step a) of the cable production process may optionally comprise a separate mixing step, e.g. in a mixer arranged in connection and preceding the cable extruder of the cable production line. Mixing in the preceding separate mixer can be carried out by mixing with or without external heating (heating with an external source) of the component(s). In case one of the polymer (a) or the nanoparticle filler (b), or the optional and exemplified peroxide(s) and part or all of the optional further component(s), such as further additive(s), of the polymer composition of the invention and, respectively, part or all of the component(s) of the first or second semiconductive compositions, are added to the polyolefin during the cable production process, then the addition(s) can take place at any stage during the mixing step (a'), e.g. at the optional separate mixer preceding the cable extruder or at any point(s) of the cable extruder.

If the nanoparticle filler (b) is added during the (melt) mixing step (a'), then it can added to the polymer (a) as such or in form of a master batch (MB) as described herein, as well known in the art.

The dispersion of the nanoparticle filler (b) to the other components, such as the polymer (a), of the polymer composition can be adjusted as desired e.g. by modifying the surface properties of the nanoparticle filler, by using a MB of the nanoparticle filler (b) or by optimising the shear rate during the mixing step of the polymer composition. The conditions of the mixing step (a') can be adapted by a skilled person depending on the used nanoparticle filler (b), which are typically commercial products, to achieve a homogeneous dispersion of the components.

Accordingly, for example, at least the polymer component(s) of the polymer composition of the invention and, optionally, the optional first and second semiconductive composition are provided to the cable production process in form of powder, grain or pellets. Pellets mean herein generally any polymer product which is formed from reactor-made polymer (obtained directly from the reactor) by post-reactor modification to a solid particulate polymer product. A well-known post-reactor modification is pelletizing a melt mix of a polymer product and optional additive(s) in a pelletizing equipment to solid pellets. Pellets can be of any suitable size and shape.

Moreover, the polymer (a) and the nanoparticle filler (b) may be mixed together before introducing to the cable production process. Thus the polymer composition may be a premade mixture in a form of a solid powder, grain or pellet product, for example, a pellet product. This premade mixture, for example, the pellets where each pellet comprises both the polymer (a) and the nanoparticle filler (b) is then provided to the (melt)mixing step (a') of cable production process. Alternatively, each of the polymer (a) and the nanoparticle filler (b) can be provided separately to the (melt)mixing step (a') of the cable production process, where the components are blended together during the step (a').

It is exemplified that the polymer (a) and the nanoparticle filler (b) are both in a same powder, grain or pellet product, for example, in a pellet product as described herein, which premade mixture is used in the cable production process.

All or part of the optional additives can be present in any such powder, grain or pellets or added separately.

As mentioned herein, the polymer composition, for example, comprises a crosslinking agent, which is, for example, peroxide. The crosslinking agent can be added before the cable production process or during the (melt) mixing step (a'). For instance, and, for example, the crosslinking agent and also the optional further component(s), such as additive(s), can already be present in the polymer (a) or the nanoparticle filler (b), or if a master batch of the nanoparticle filler (b) is used, in said MB, before the use in the production line of the cable production process. The crosslinking agent can be e.g. melt mixed together with the polymer (a) or the nanoparticle filler (b), or both, or a mixture thereof, and optional further component(s), and then the melt mix is pelletized.

Alternatively and, for example, the crosslinking agent is added, for example, impregnated, to solid polymer particles, for example, to pellets of the polymer (a) component, for example, to pellets of the polymer composition. If crosslinking agent is used to crosslink the polymer composition, then it is, for example, added to the pellets of the polymer composition comprising the polymer (a) and the nanoparticle filler (b) prior to introduction to the (melt)mixing step (a') of the cable production process. Then the premade pellets can later be used for cable production.

It is exemplified that the melt mix of the polymer composition obtained from melt mixing step (a') consists of the polymer (a) of the invention as the sole polymer component. However it is to be understood that the nanoparticle filler (b) and/or the optional, and exemplified, additive(s) can be added to polymer composition as such or as a mixture with a carrier polymer, i.e. in a form of so-called master batch.

In an exemplified embodiment of the cable production process, a crosslinkable DC power cable, for example, a crosslinkable HVDC power cable, is produced, wherein the insulation layer comprises, for example, consists of, a crosslinkable polymer composition of the invention which further comprises a peroxide in an amount as described herein, and wherein at least the crosslinkable insulation layer of the obtained cable is crosslinked in step c) at crosslinking conditions.

Further, for example, in this crosslinkable embodiment, a crosslinked DC power cable, for example a crosslinked HVDC power cable, is provided.

Crosslinking of the polymer composition of the insulation layer is, for example, carried out in the presence of a peroxide in an amount as described herein, and the optional and exemplified crosslinking of the first semiconductive composition of the inner semiconductive, is carried out in the presence of crosslinking agent(s), for example, in the presence of free-radical-generating compound(s), which is, for example, a peroxide(s).

The crosslinking agent(s) can already be present in the optional first and second semiconductive composition before introducing to the crosslinking step c) or introduced during the crosslinking step. Peroxide is the exemplified crosslinking agent for said optional first and second semiconductive compositions and is, for example, included to the pellets of semiconductive composition before the composition is used in the cable production process as described herein.

Crosslinking can be carried out at increased temperature which is chosen, as well known, depending on the type of crosslinking agent. For instance temperatures above 150° C., such as from 160 to 350° C., are typical, however without limiting thereto.

A further embodiment of the present invention discloses a crosslinked polymer composition, wherein a polymer composition is exposed to a curing procedure during which the maximum temperature of said polymer composition is, for example, above 150° C., e.g. 160 to 350° C., e.g. less than 280° C., e.g. 250° C. or less, or, for example, 180° C. or less.

An even further embodiment of the present invention discloses a crosslinked polymer composition, wherein a polymer composition is exposed to a curing procedure during which the maximum temperature of said polymer composition is 270° C. or less, 260° C. or less, 250° C. or less, 240° C. or less, 230° C. or less, 220° C. or less, 210° C. or less, 200° C. or less, 190° C. or less, or, alternatively, 180° C. or less.

Still a further embodiment of the present invention discloses a crosslinked polymer composition, wherein a polymer composition is exposed to a curing procedure during which the maximum temperature of said polymer composition is 270° C. or less, 265° C. or less, 260° C. or less, 255° C. or less, 250° C. or less, 245° C. or less, 240° C. or less, 235° C. or less, 230° C. or less, 225° C. or less, 220° C. or less, 215° C. or less, 210° C. or less, 205° C. or less, 200° C. or less, 195° C. or less, 190° C. or less, 185° C. or less, or, alternatively, 180° C. or less.

An even further embodiment of the present invention discloses a crosslinked polymer composition, wherein a polymer composition is exposed to a curing procedure during which the maximum temperature of said polymer composition is 250° C. or less, 245° C. or less, 240° C. or less, 235° C. or less, 230° C. or less, 225° C. or less, 220° C. or less, 215° C. or less, 210° C. or less, 205° C. or less, 200° C. or less, 195° C. or less, 190° C. or less, 185° C. or less, or, alternatively, 180° C. or less.

A further embodiment of the present invention discloses a crosslinked polymer composition, wherein a polymer composition is exposed to a curing procedure during which the maximum temperature of said polymer composition is 180° C. or less.

Still a further embodiment of the present invention discloses a crosslinked polymer composition, wherein a polymer composition is exposed to a curing procedure during which the maximum temperature of said polymer composition is at least 150° C. or, alternatively, at least 160° C.

The processing temperatures and devices are well known in the art, e.g. conventional mixers and extruders, such as single or twin screw extruders, are suitable for the process of the invention.

The invention further provides a crosslinked direct current (DC) power cable, for example, a crosslinked HVDC power cable, where the inner semiconductive layer comprises, for example, consists of, an optionally crosslinked first semiconductive composition, the polymer composition of the insulation layer comprises, for example, consists of, a crosslinked polymer composition of the invention as described herein, and the outer semiconductive layer comprises, for example, consists of, an optionally crosslinked second semiconductive composition, for example, where the inner semiconductive layer comprises, for example, consists of, a crosslinked first semiconductive composition, the polymer composition of the insulation layer comprises, for example, consists of, a crosslinked polymer composition of the invention as described herein crosslinked, and the outer semiconductive layer comprises, for example, consists of, a crosslinked second semiconductive composition.

The non-crosslinked, or, and, for example, crosslinked power cable comprising the non-crosslinked, or, for example, crosslinked, polymer composition of the invention in an insulation layer, has, i.a.

The advantageous electrical properties of the low level of charging currents (electrical conductivity, and also referred to as DC conductivity) is beneficial for minimising the undesired heat formation.

The exemplified DC power cable of the invention is a HVDC power cable, for example, the HVDC power cable operates at voltages, as described herein, for HVDC cable or ultra HVDC cable, depending on the desired end cable application.

Moreover, the power cable, for example, the DC power cable, for example, the HVDC power cable, of the invention is crosslinked as described herein.

The thickness of the insulation layer of the DC power cable, for example, of the HVDC power cable, is typically 2 mm or, for example, at least 3 mm, for example, at least 5 to 100 mm, for example, from 5 to 50 mm, or conventionally 5 to 40 mm, or e.g. 5 to 35 mm, when measured from a cross section of the insulation layer of the cable. The thickness of the inner and outer semiconductive layers is typically less than that of the insulation layer, and in HVDC power cables can be e.g. more than 0.1 mm, such as from 0.3 up to 20 mm or, for example, from 0.3 to 10 mm. The thickness of the inner semiconductive layer is, for example, 0.3 to 5.0 mm, for example, 0.5 to 3.0 mm or, for example, 0.8 to 2.0 mm. The thickness of the outer semiconductive layer is, for example, from 0.3 to 10 mm, such as 0.3 to 5 mm, for example, 0.5 to 3.0 mm or, for example, 0.8 to 3.0 mm. It is evident for and within the skills of a skilled person that the thickness of the layers of the DC cable depends on the intended voltage level of the end application cable and can be chosen accordingly.

LEGENDS OF FIGURES

FIG. 1. Reconstruction in three dimensions of the quantification of the distance for particle interaction on the charge current at different weight percentages in the LDPE/MgO-systems, where the systems in the upper row comprise unmodified MgO nanoparticles and the systems in the lower row comprise C8-modified MgO nanoparticles, i.e. octyl (triethoxy)silane (OTES-C8) silanized MgO nanoparticles. Starting from the left in the top row in FIG. 1: FIG. 1*a*, FIG. 1*b* and FIG. 1*c*, and from the left in the bottom row in FIG. 1: FIG. 1*d*, FIG. 1*e* and FIG. 1*f*.

FIG. 5*a* shows X-ray photospectroscopy data of the O 1s signal of unmodified MgO.

FIG. 5*b* shows X-ray photospectroscopy data of the O 1s signal of C8-MgO.

FIG. 5*c* shows X-ray photospectroscopy data of the O 1s signal of C18-MgO.

Figure 6:
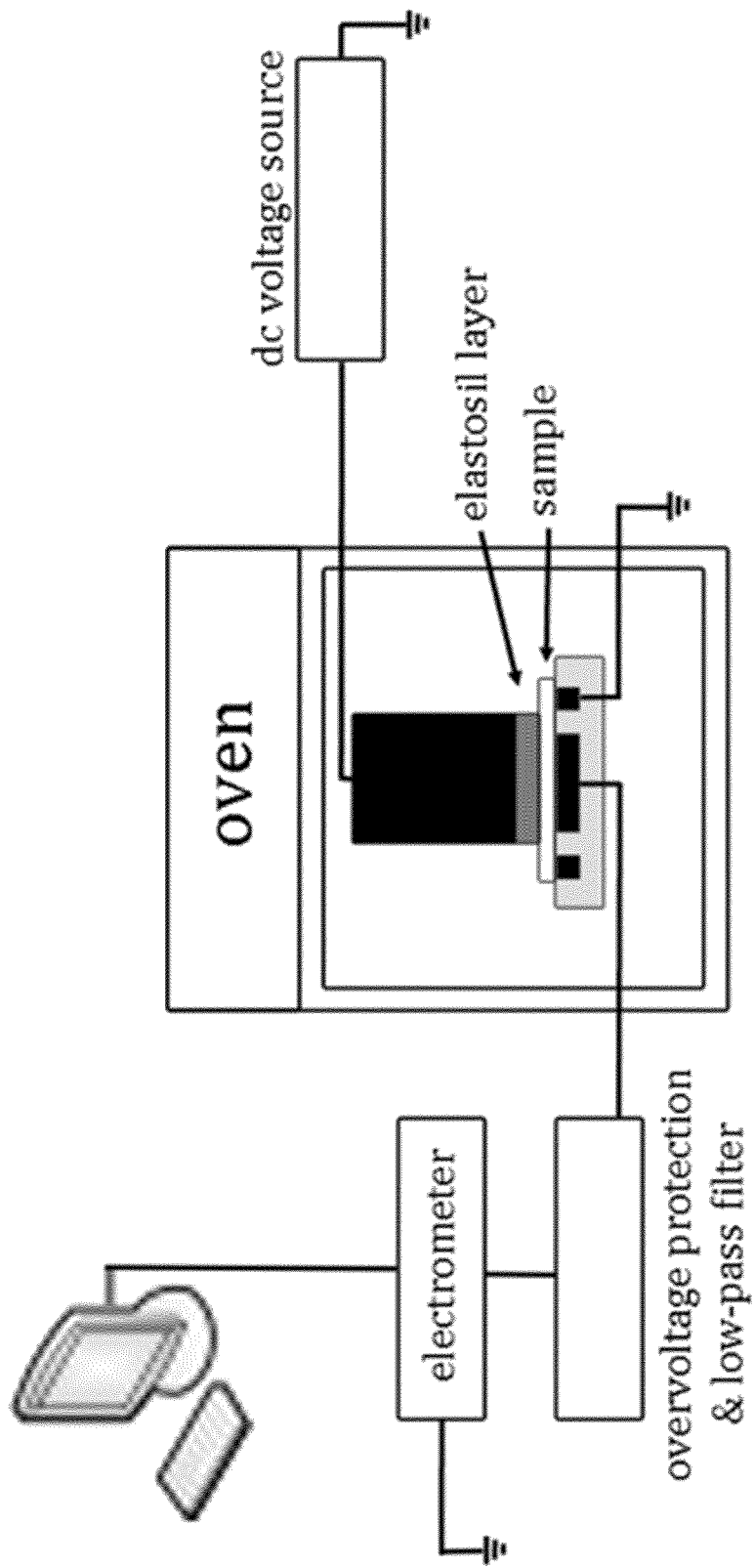

FIG. 6. A sketch of an electrometer (Keithley 6517A) measuring the charging current.

Figure 7A:
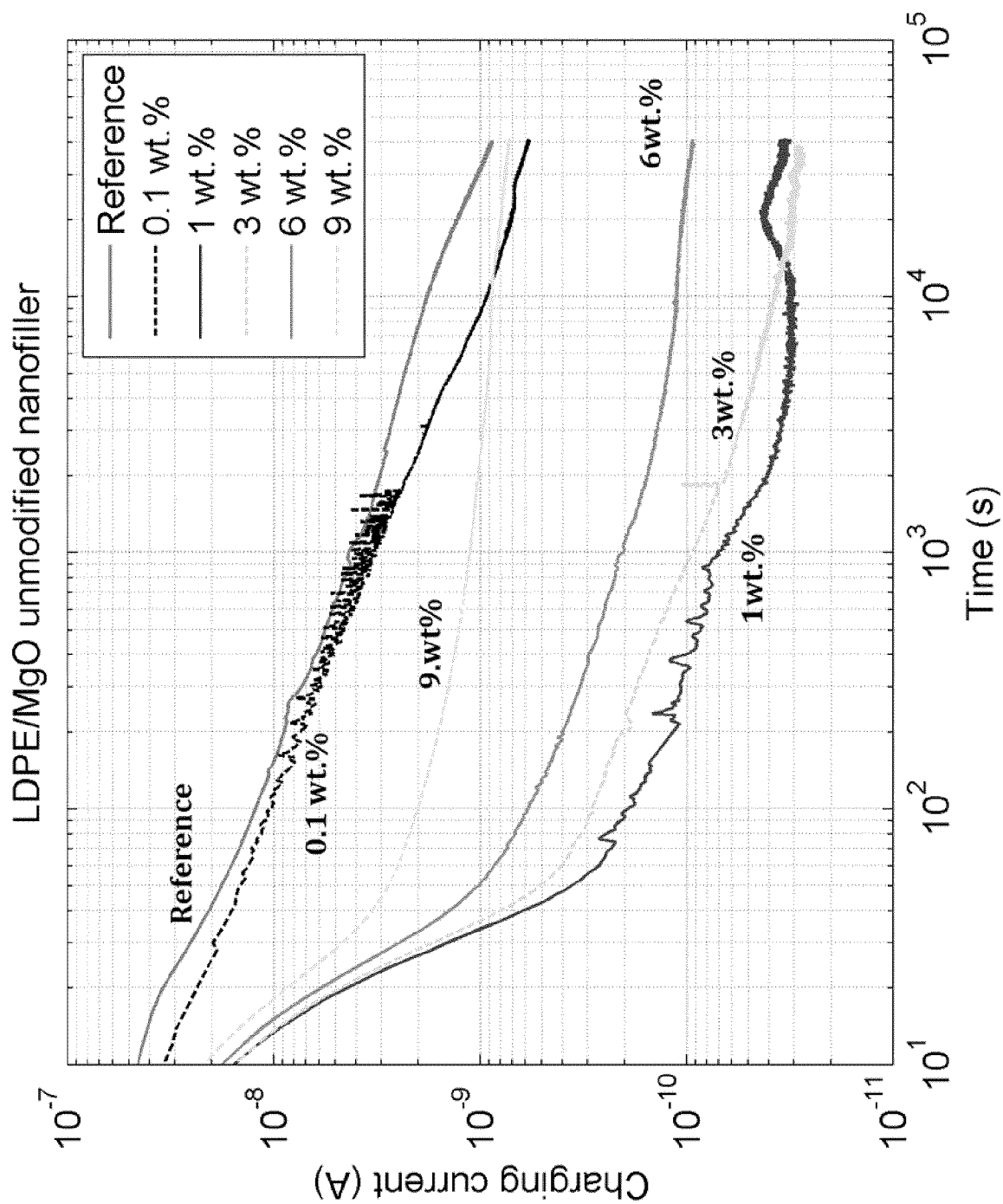
Figure 7B:
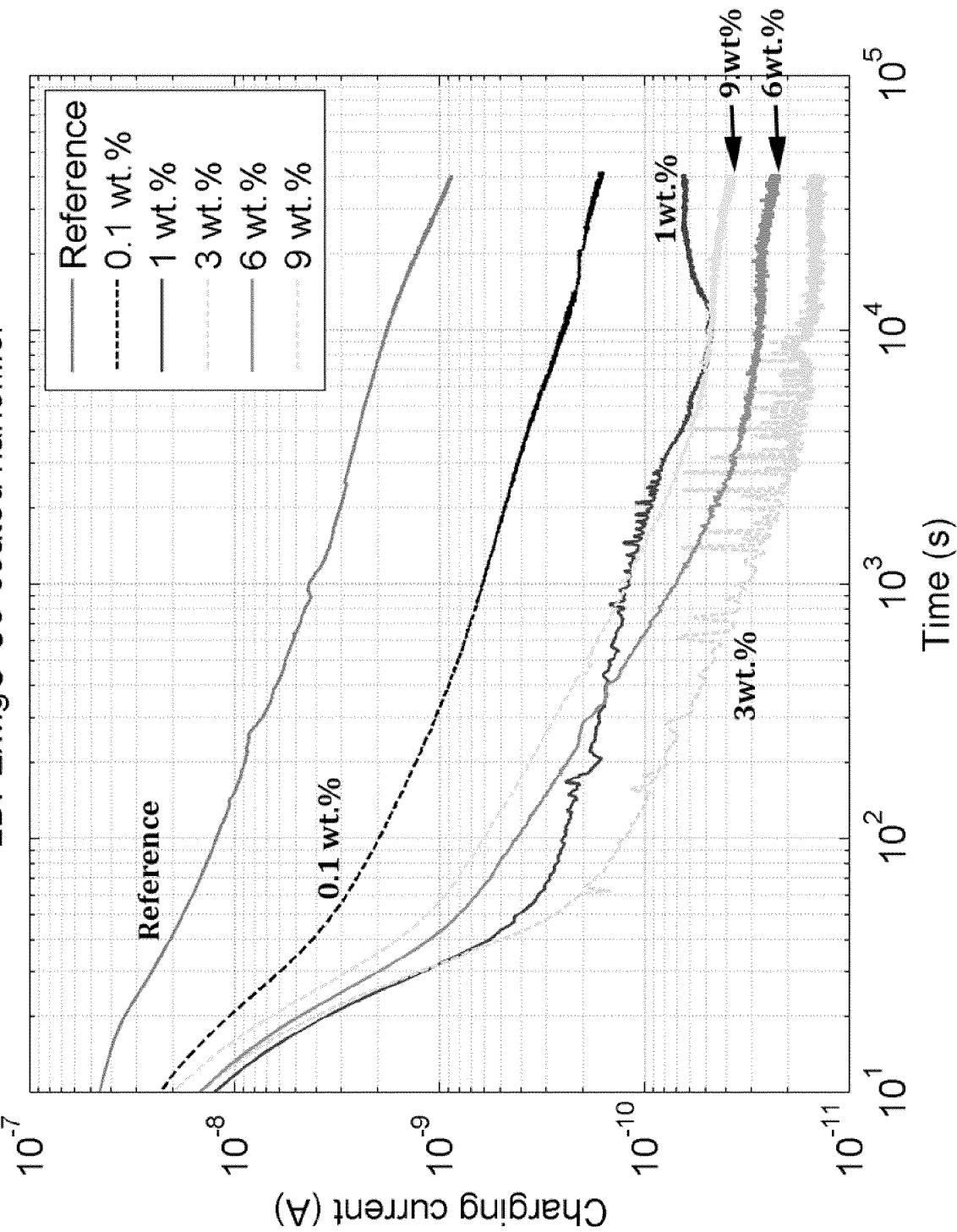
Figure 7C:
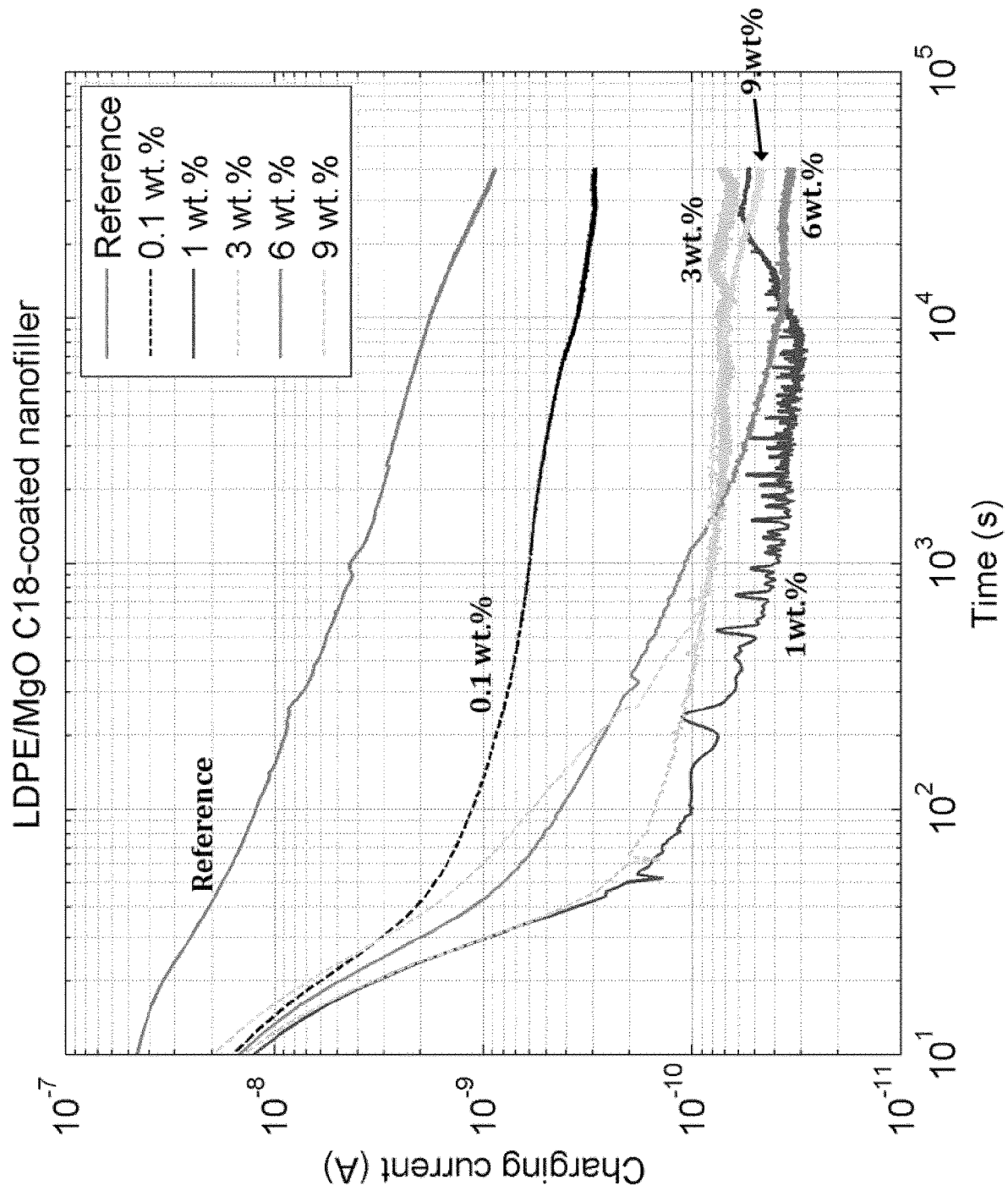

FIGS. 7*a*, 7*b* and 7*c* show the charging current against time at 32 kV/mm at 60° C.:

FIG. 7*a*. LDPE/MgO unmodified filler comparative examples.

FIG. 7*b*. LDPE/MgO C8-coated nanofiller (the MgO C8-coated nanofiller is herein also called C8-modified MgO nanoparticles), i.e. example of the polymer composition of the present invention.

FIG. 7*c*. LDPE/MgO C18-coated nanofiller (the MgO C18-coated nanofiller is herein also called C18-modified MgO nanoparticles), i.e. example of the polymer composition of the present invention.

Figure 8A:
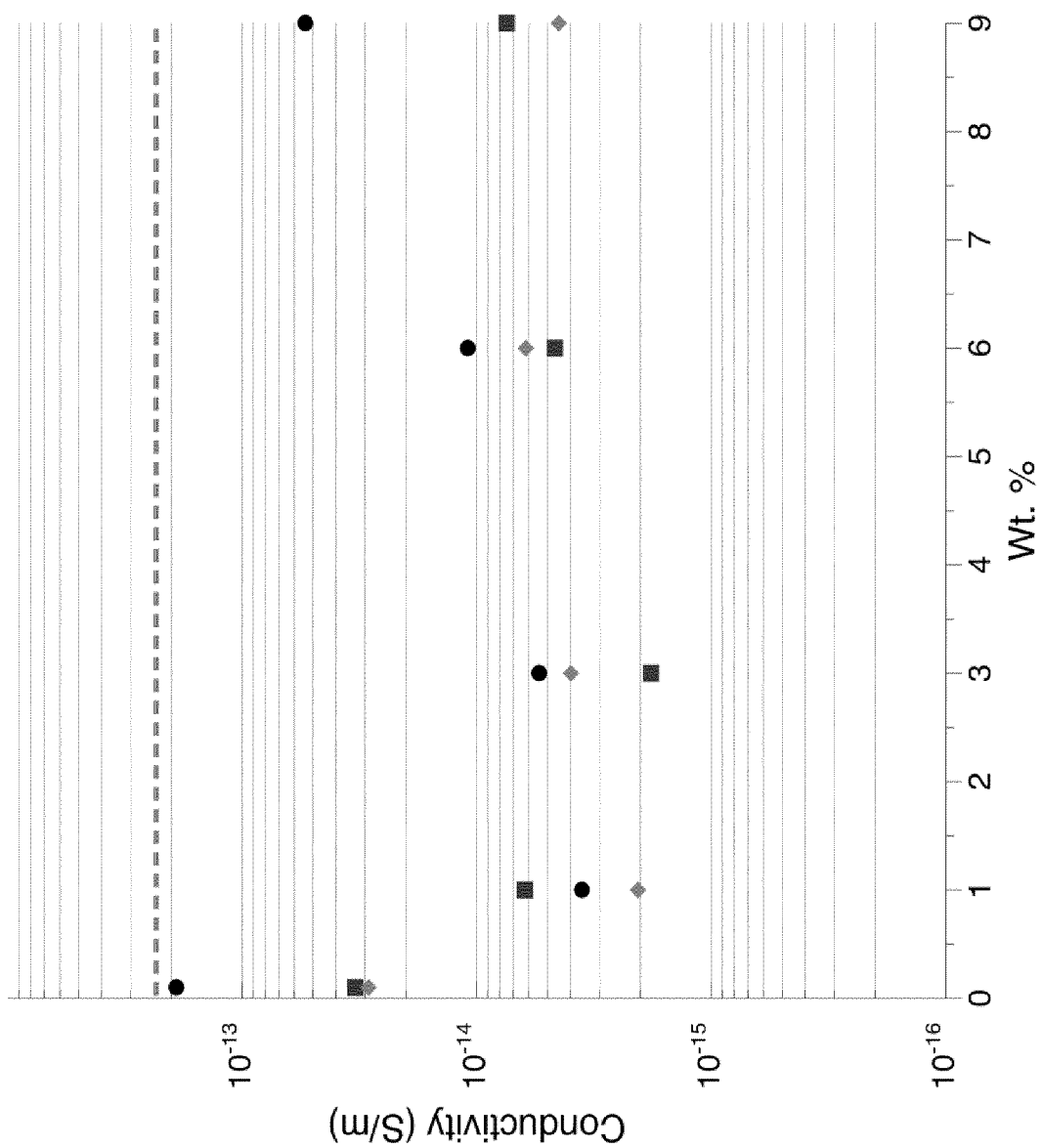
Figure 8B:
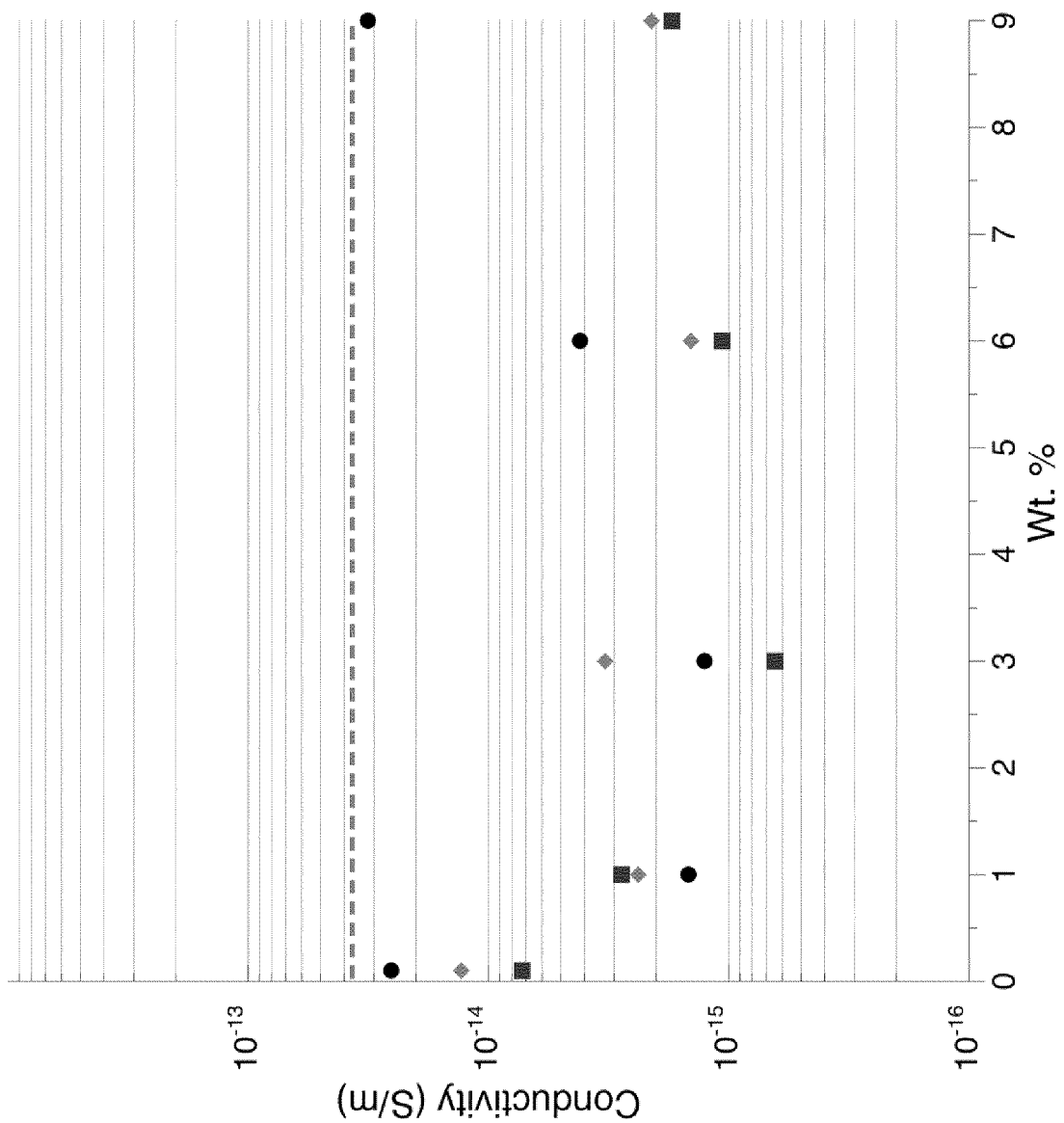

FIGS. 8*a* and 8*b* show the conductivity with an applied electrical field of 32 kV/mm after 10 min (FIG. 8*a*) and 11 hours (FIG. 8*b*) for LDPE/MgO nanocomposites, where circles represent nanocomposites comprising unmodified MgO (i.e. comparative examples), squares represent nanocomposites comprising C8-modified MgO, herein also called LDPE/MgO C8-coated nanofiller, (i.e. inventive examples) and diamonds represent nanocomposites comprising C18-modified MgO, herein also called LDPE/MgO C18-coated nanofiller, (i.e. inventive examples) and the dashed line is the corresponding value for reference polyethylene.

Figure 9A:
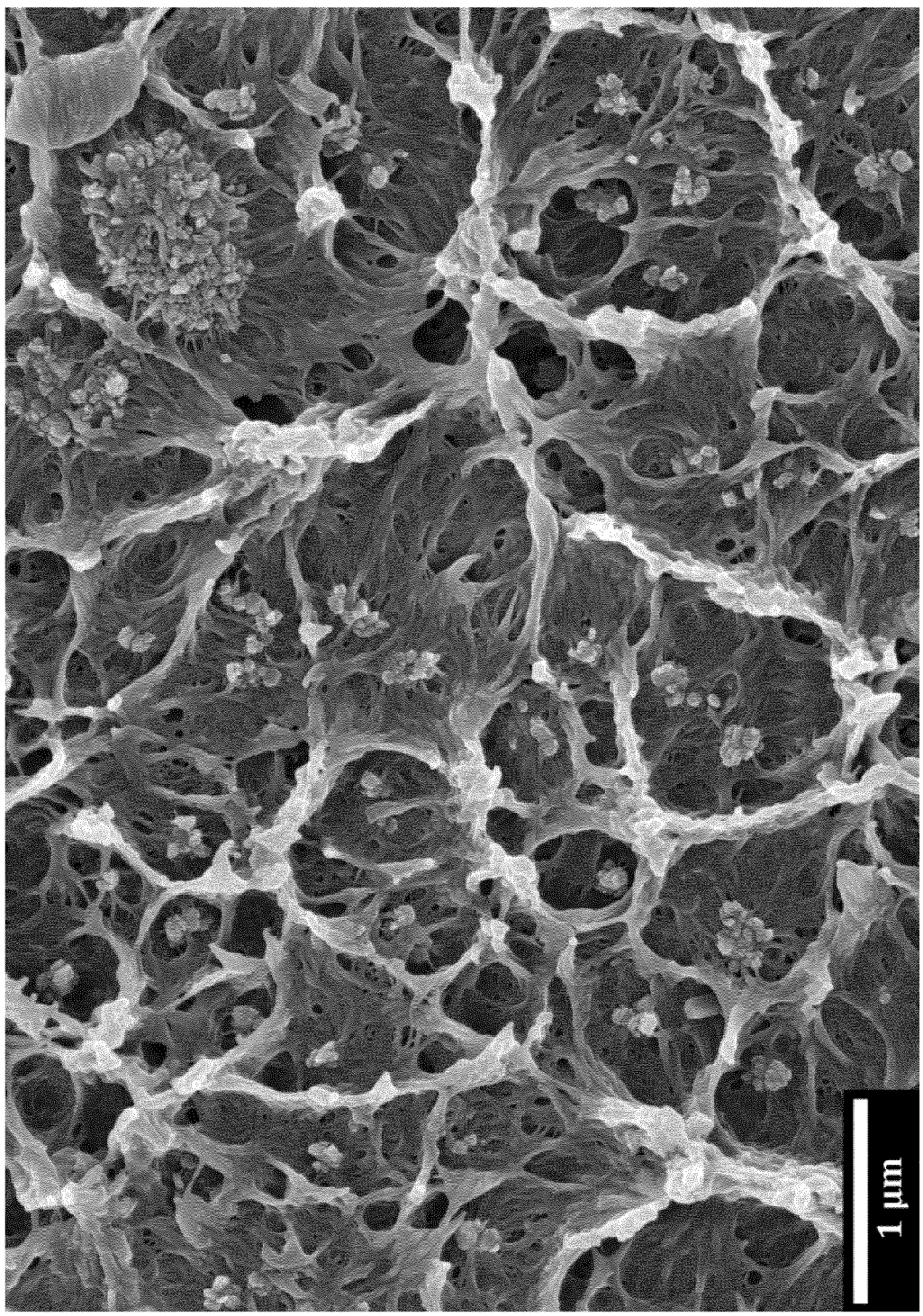
Figure 9B:
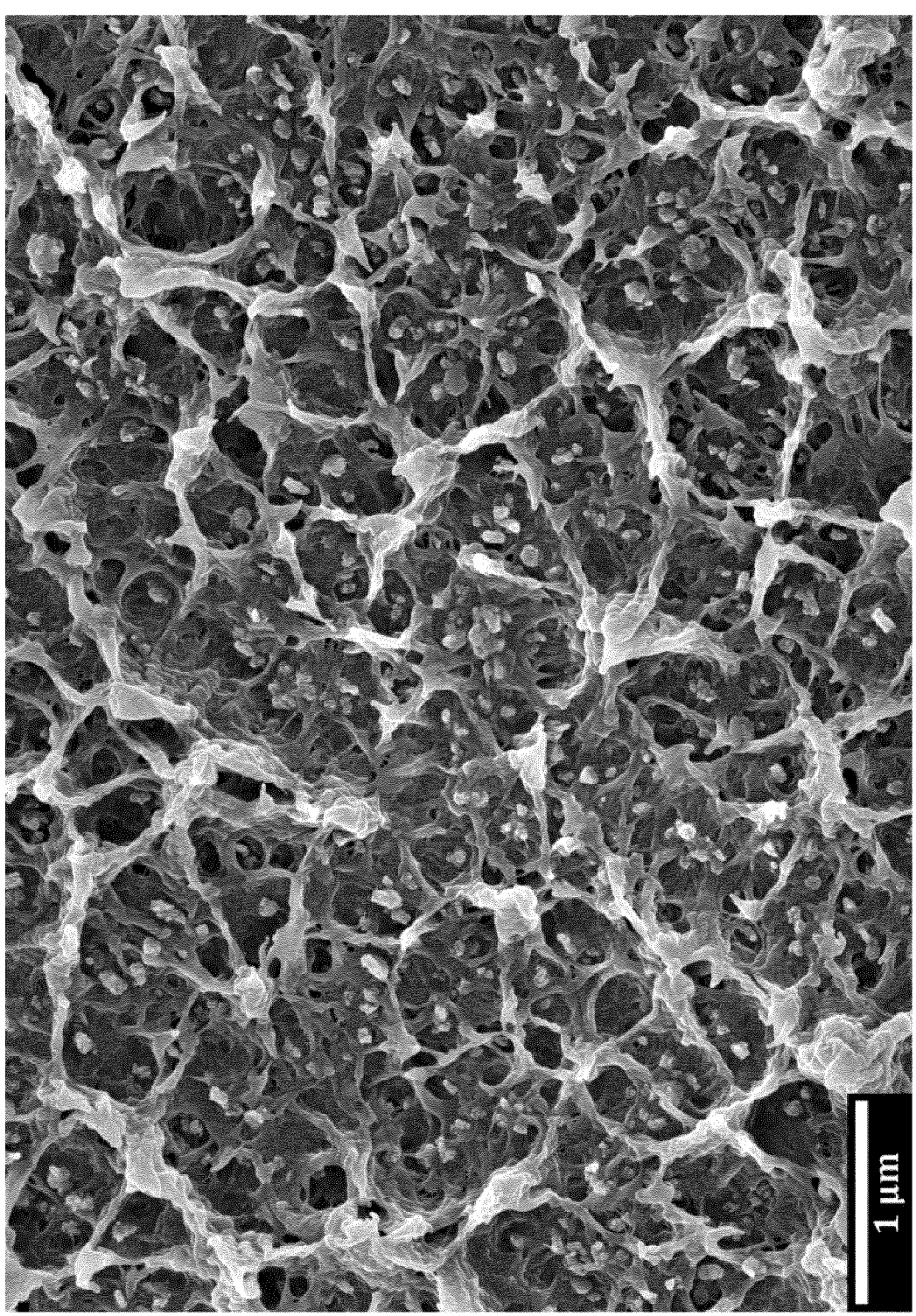

FIGS. 9a and 9b present the scanning electron microscopy images (i.e. micrographs) of the cryo-fractured LDPE/MgO nanocomposites, which images show the overall dispersion of the MgO phase in the PE matrix for the different nanocomposites. The unmodified MgO nanoparticles displayed poor particle dispersion, see FIG. 9a, as compared to the surface modified MgO nanoparticles, see FIG. 9b.

Figure 10:
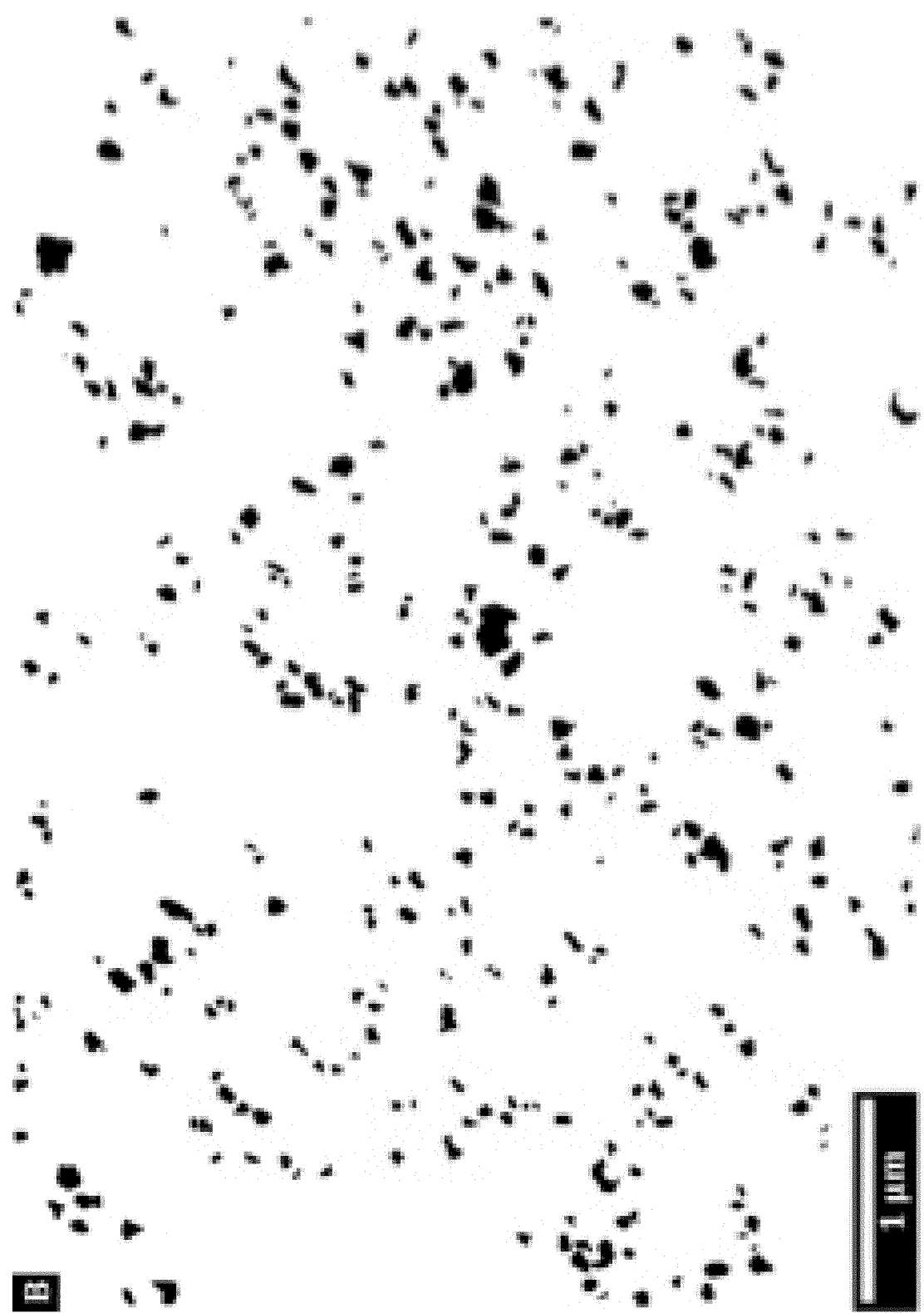

FIG. 10 shows an SEM-image of LDPE/MgO nanocomposite converted into a black and white image to facilitate particle distribution analysis.

Figure 11A:
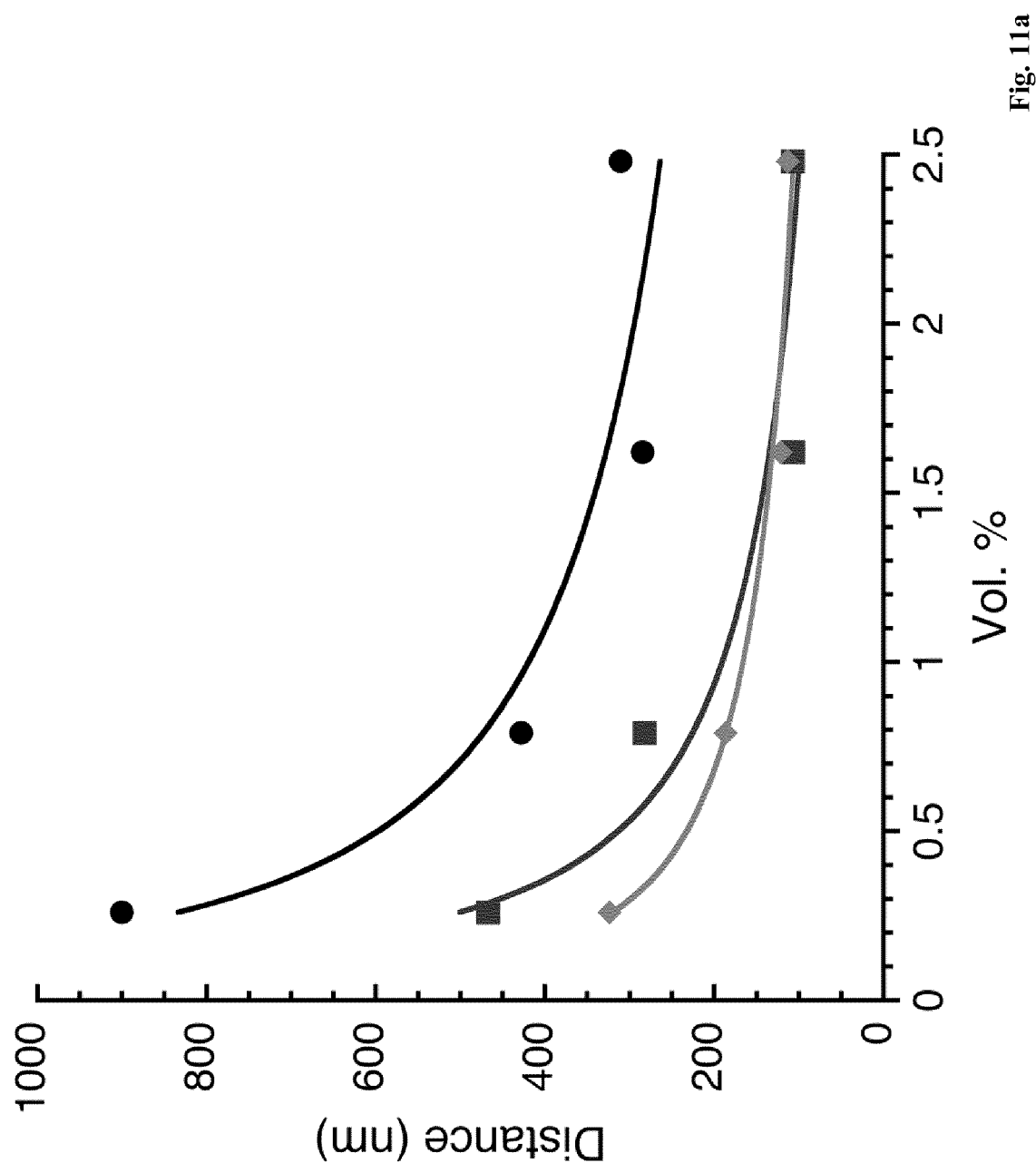

FIG. 11a shows the average center-to-center distance, in nm in 2D for the nanoparticles in the LDPE/MgO nanocomposites, to nearest (i.e. the $1^{st}$) neighbour with free radius as a function of volume percentage (vol. %), where circles represent unmodified MgO, squares represent C8-modified MgO and diamonds represent C18-modified MgO. The volume percentages correspond to 1, 3, 6, and 9 wt. % MgO in the LDPE.

Figure 11B:
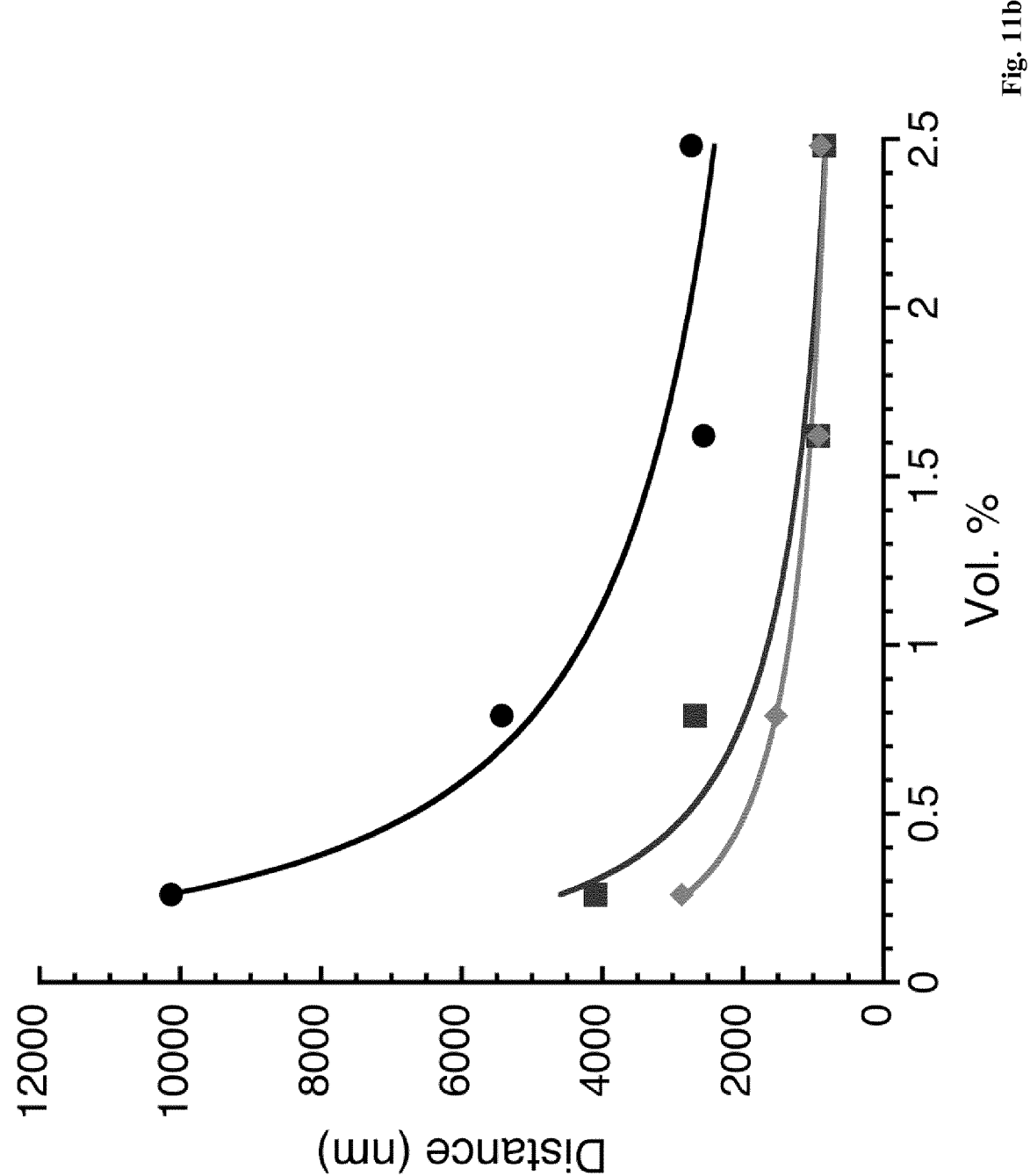

FIG. 11b shows the average center-to-center distance, in nm in 2D for the nanoparticles in the LDPE/MgO nanocomposites, to $51^{st}$ neighbour with a free radius as a function of volume percentage (vol. %), where circles represent unmodified MgO, squares represent C8-modified MgO and diamonds represent C18-modified MgO. The volume percentages correspond to 1, 3, 6, and 9 wt. % MgO in the LDPE.

Figure 11C:
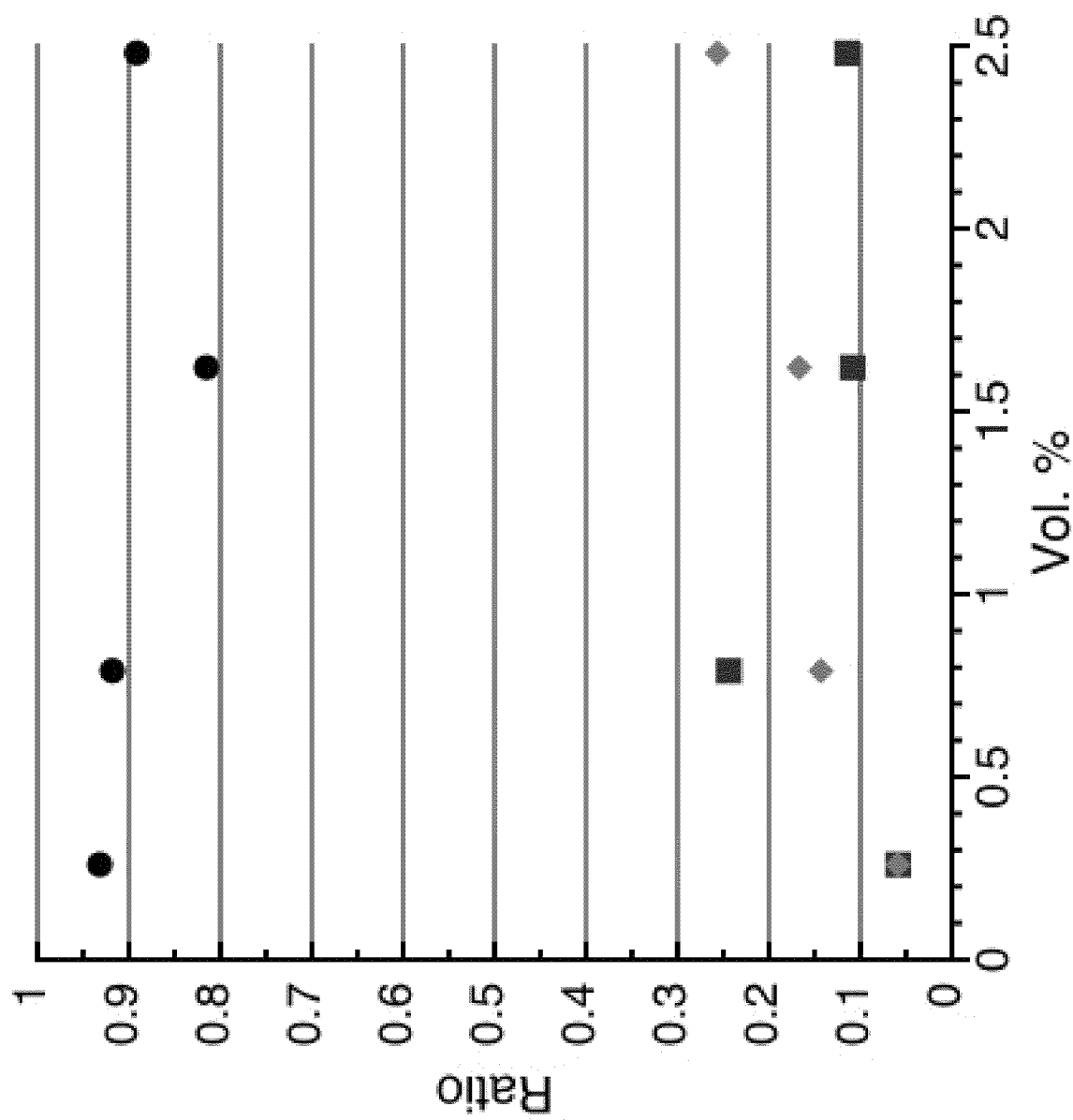

FIG. 11c shows the fraction of particles tied up in aggregates, i.e. the ratio between MgO-phase larger than 2 particles (>132 nm) and the complete area of MgO-phase is shown, with unmodified MgO consistently displaying a high ratio of aggregated particles, where a ratio equal to 1 means that all particles are aggregated.

Figure 1:
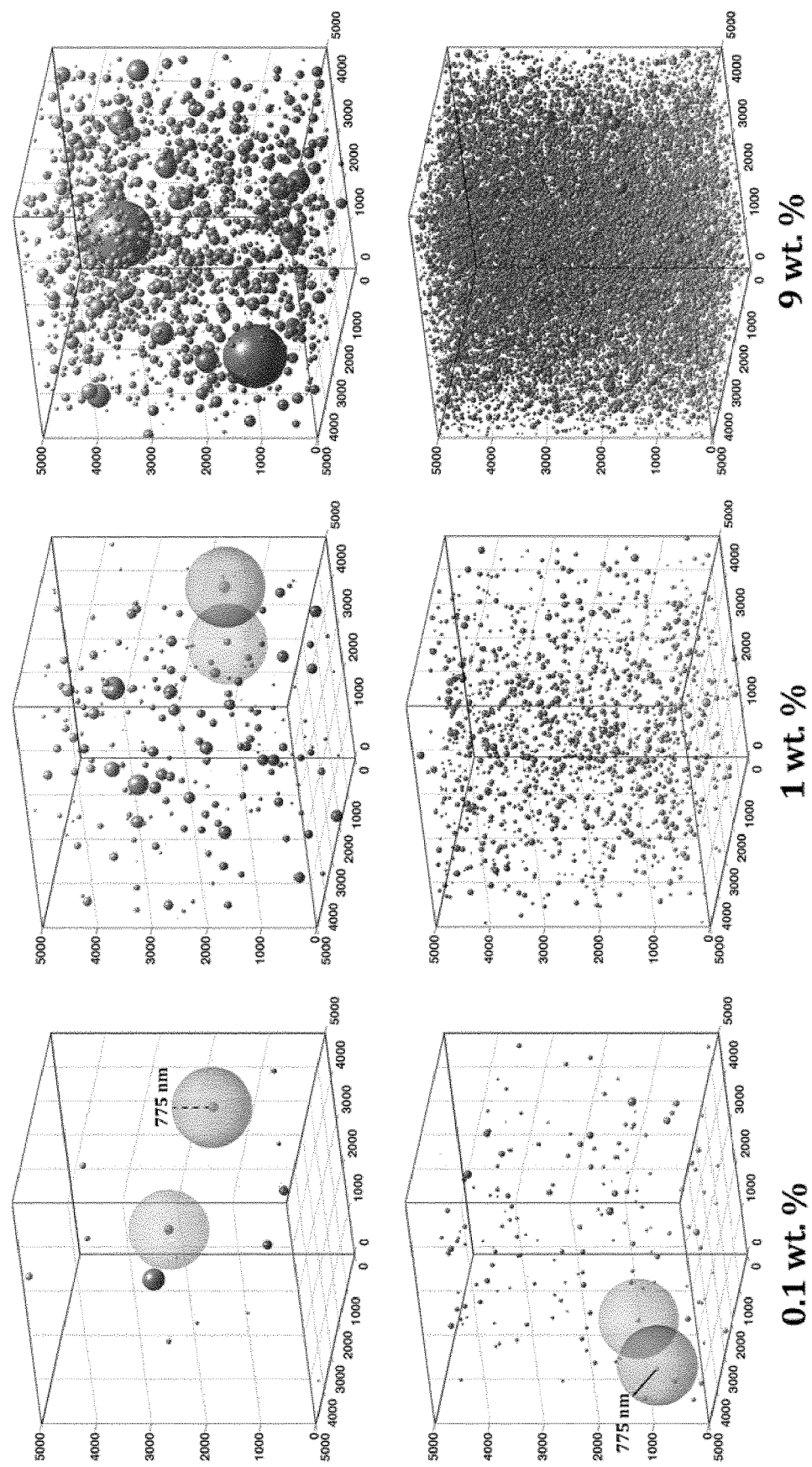
Figure 12:
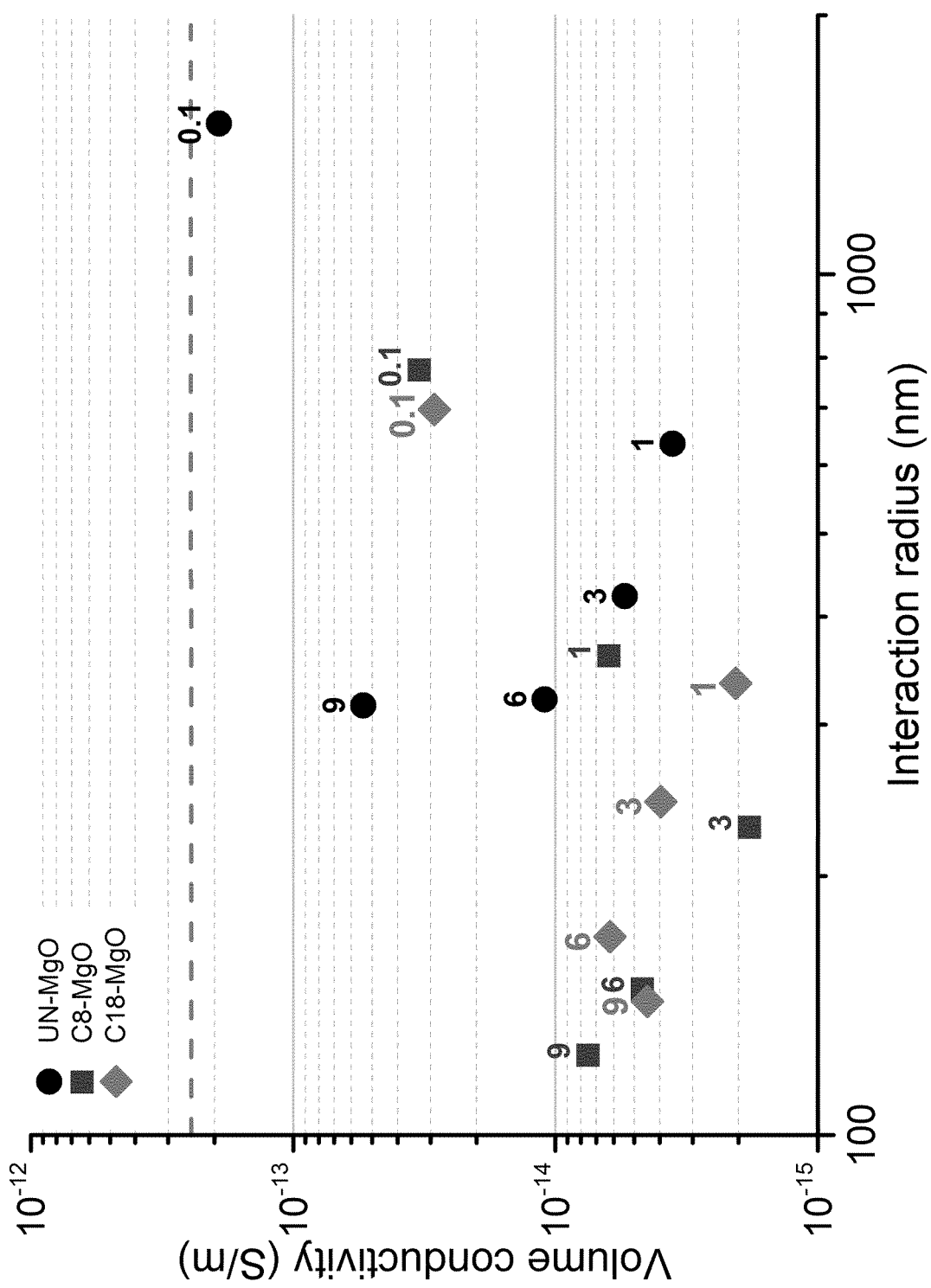

FIG. 12 shows the conductivity after 10 min plotted as a function of the interaction radius of the MgO nanoparticles, provided that the total volume was filled to 95% by interaction spheres (see large light gray spheres in FIG. 1). The horizontal line in the top gives the value of the unfilled LDPE.

Figure 13:
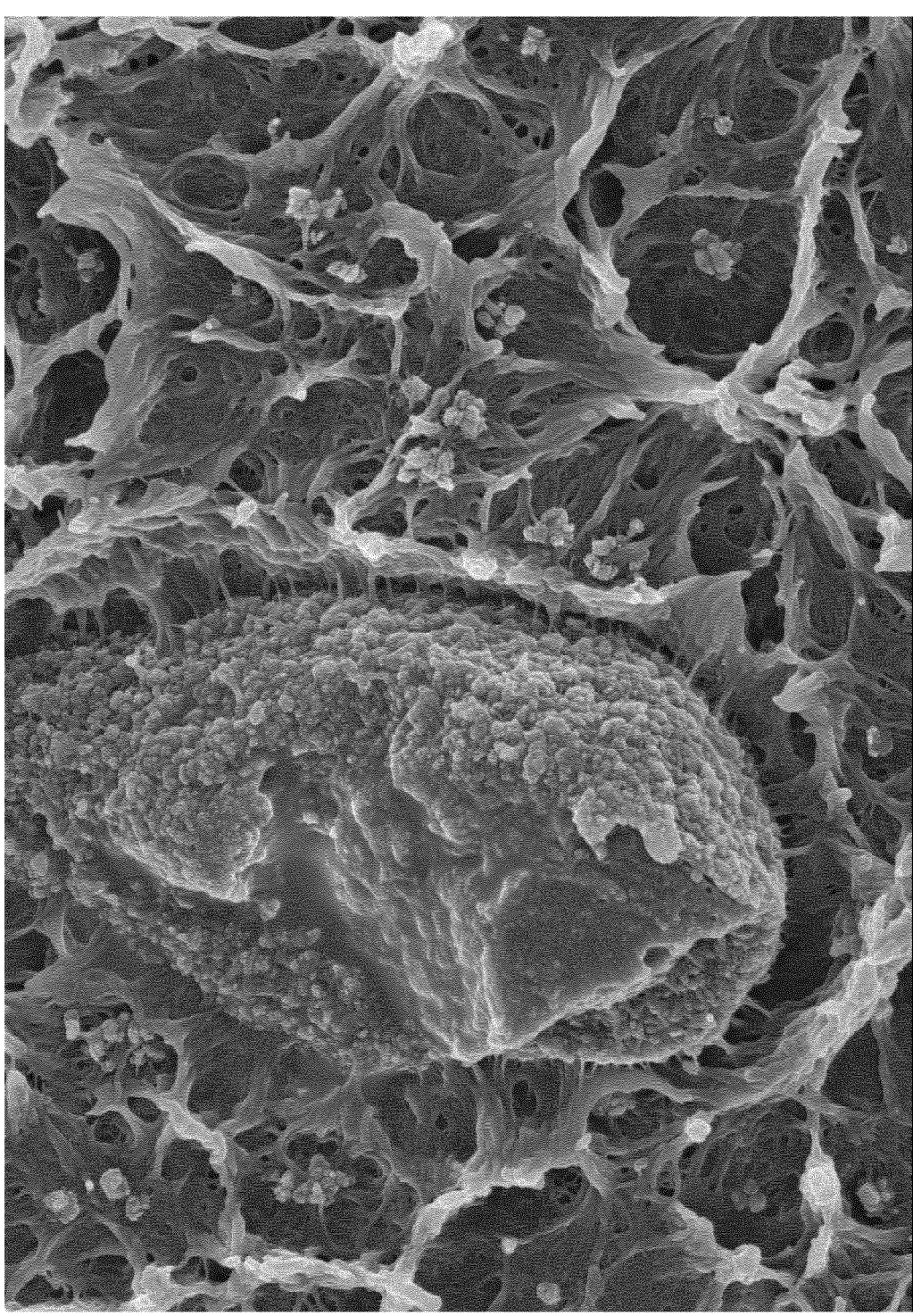

FIG. 13 shows scanning electron micrograph of the unmodified MgO nanoparticles dispersed in the polyethylene and the poor adhesion between the unmodified MgO aggregate and the polyethylene matrix is here visible.

Figure 14:
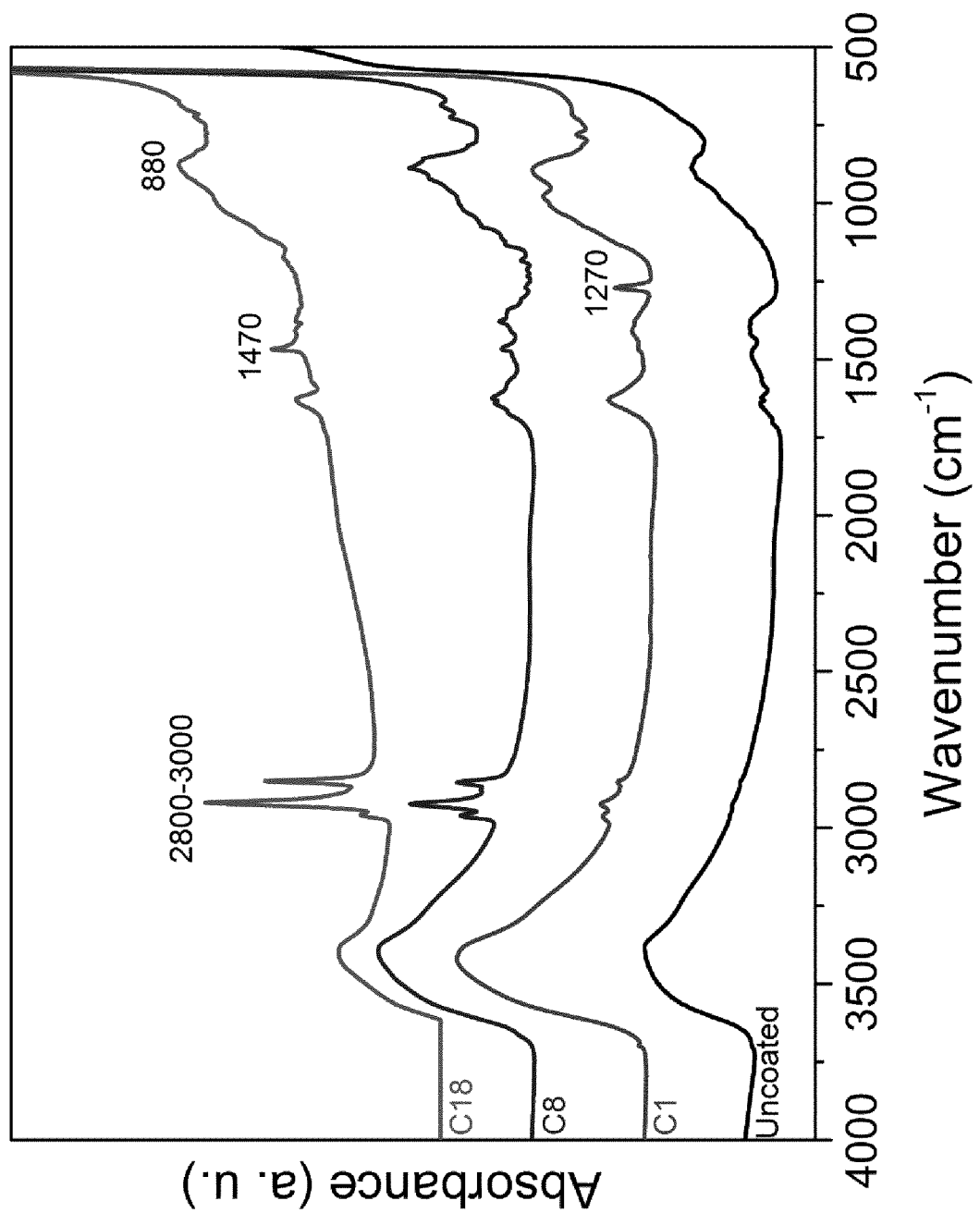

FIG. 14 shows the infrared spectra of the pristine, i.e. uncoated or unmodified 25 nm ZnO nanoparticles (ZnO-25-U), (bottom curve) and silane-coated nanoparticles, i.e. silane-modified ZnO nanoparticles: C1 is methyltrimethoxysilane (ZnO-25-C1) (second from bottom curve), C8 is octyltriethoxysilane (ZnO-25-C8) (second from top curve) and C18 is octadecyltrimethoxysilane (ZnO-25-C18) (top curve) by using FT-IR technique. The curves have been shifted along the y-axis for visibility.

Figure 15:
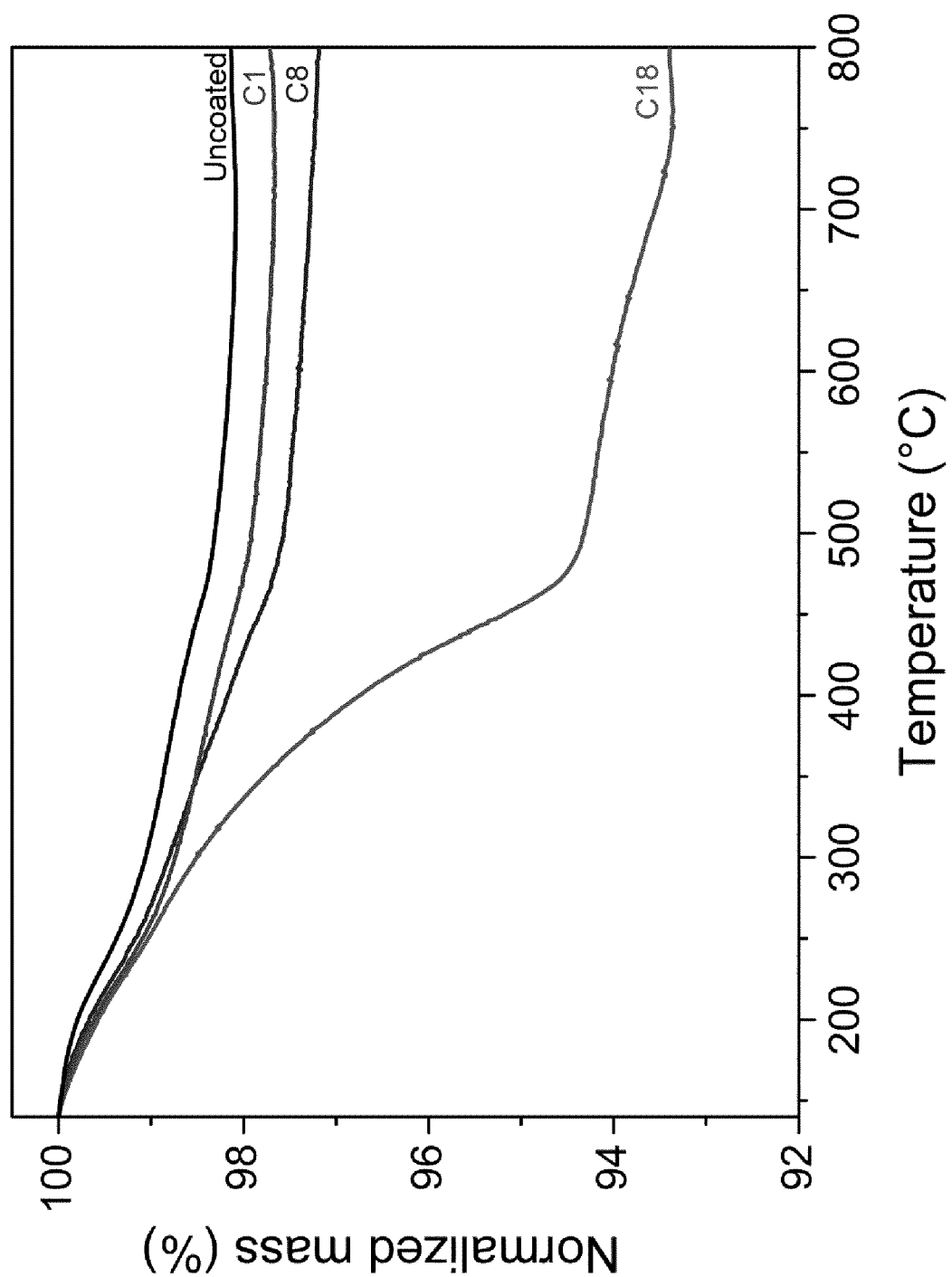

FIG. 15 shows the normalized mass plotted as a function of temperature for pristine and silane-coated ZnO nanoparticles (ZnO-25-U) after normalization to the mass loss value at 140° C.

FIGS. 16a-16d show scanning electron micrographs of ZnO particles with different size and their LDPE nanocomposites based on the 3 wt. % nanoparticles.

Figure 16A:
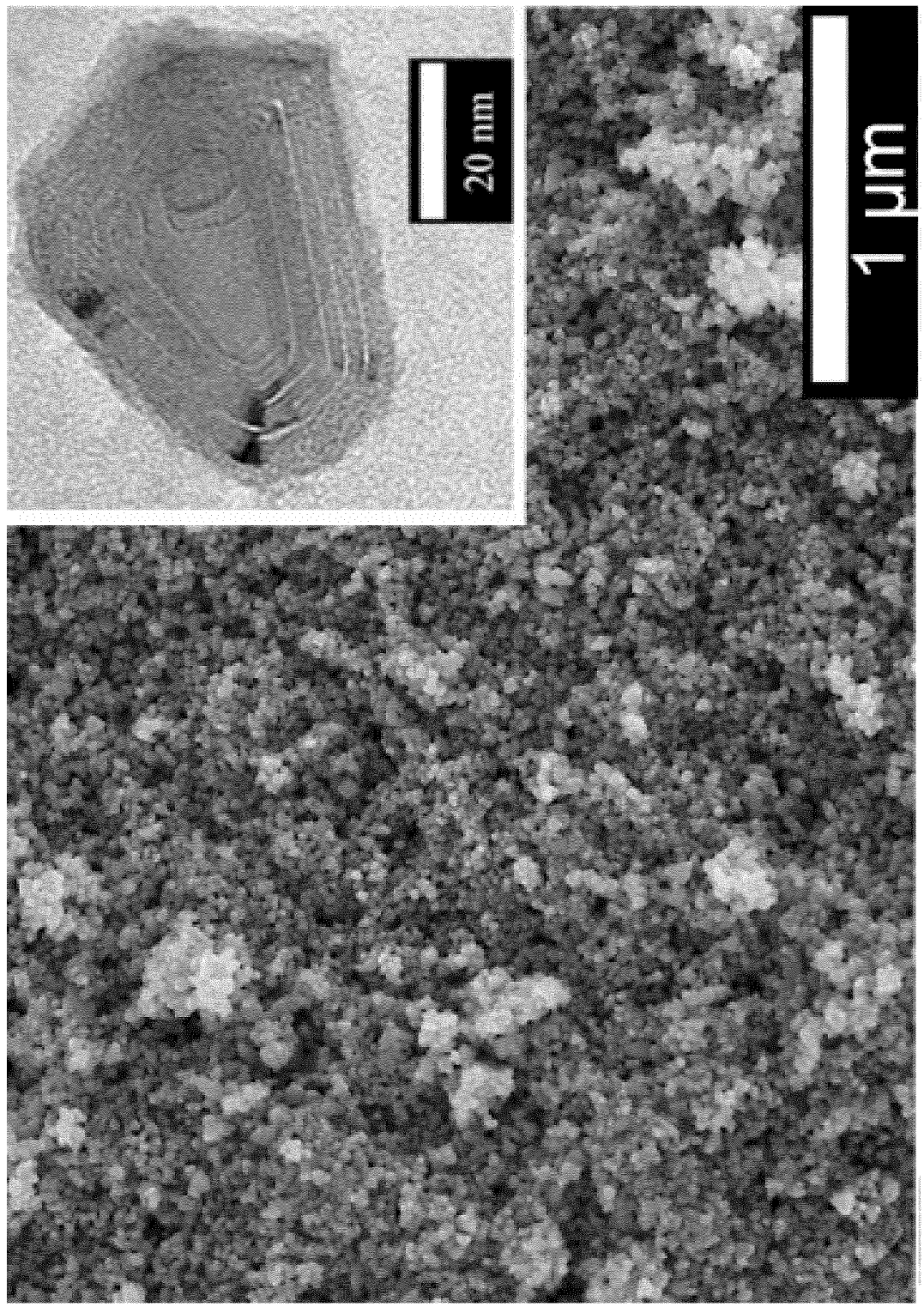

FIG. 16a shows that zinc acetate precursor yielded separate and mono-domain nanoparticles (ZnO-25-U) (the number in the middle of the names indicates the average size of the particles in nm).

Figure 16B:
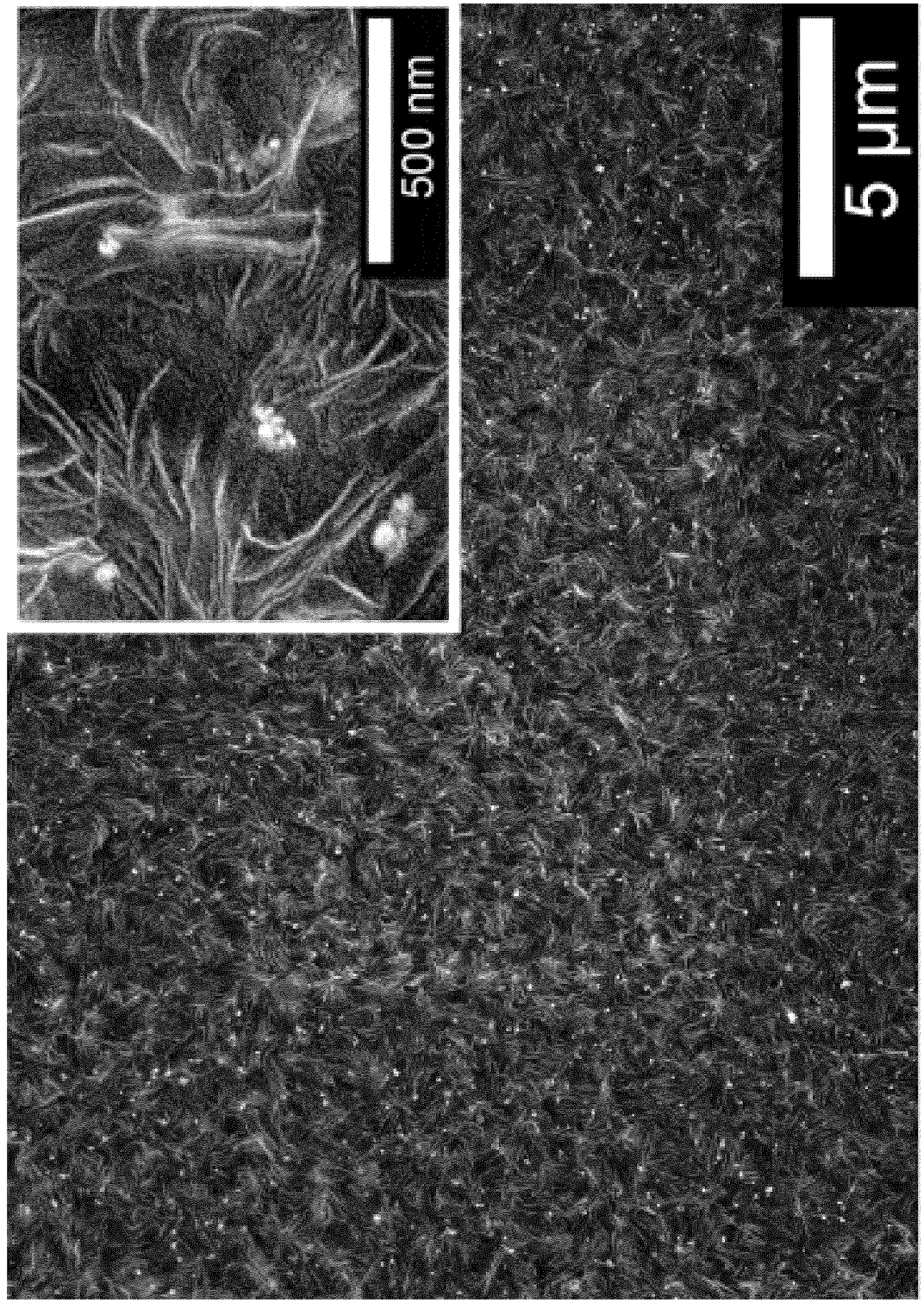

FIG. 16b shows nanocomposite based on the C8-coated (or C8-modified) ZnO nanoparticles, i.e. ZnO-25-C8 (the number in the middle of the names indicates the average size of the particles in nm).

Figure 16C:
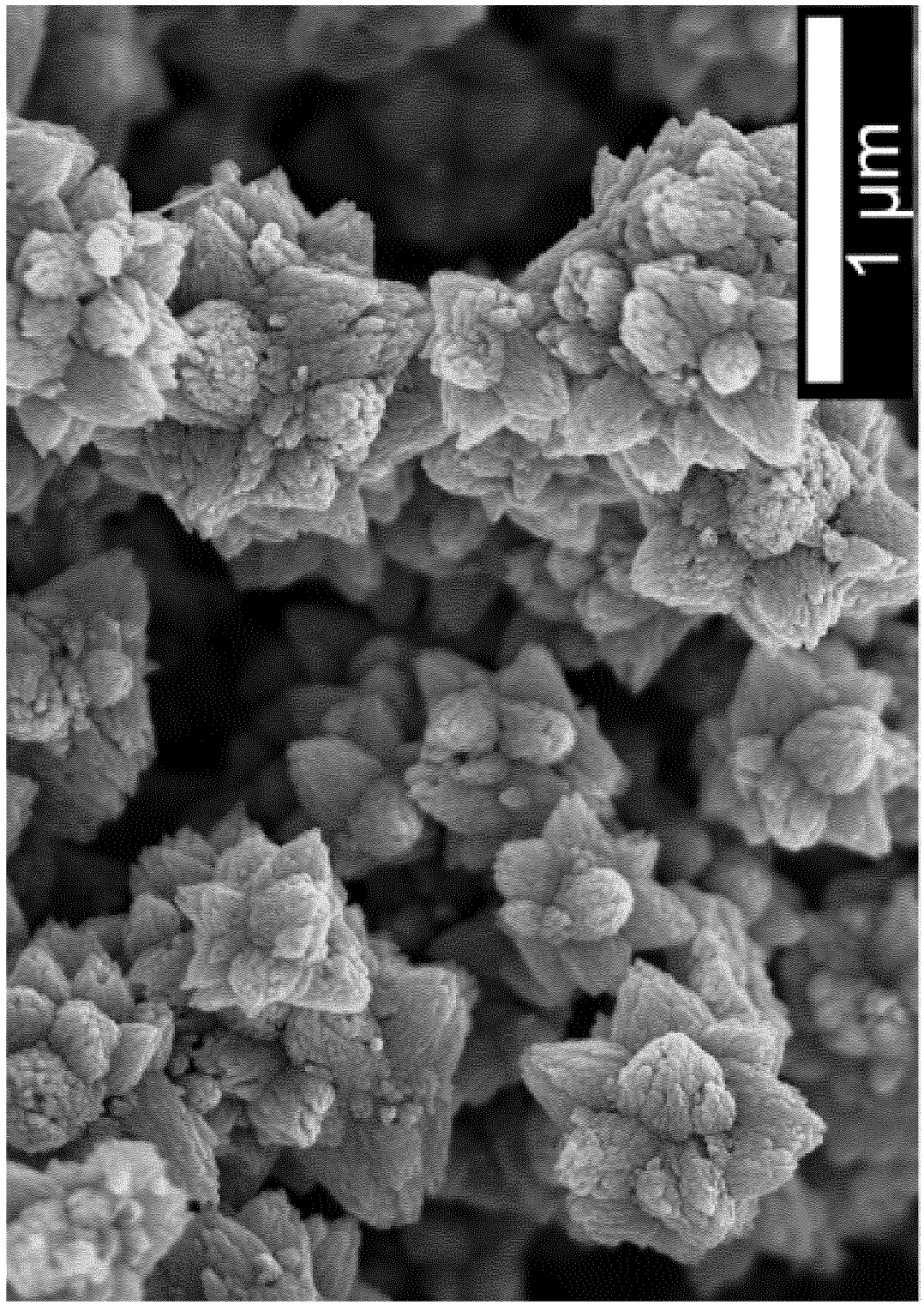

FIG. 16c shows that zinc nitrate precursor yielded submicron (ZnO-550-U) star-shaped particles with a symmetrical habit.

Figure 16D:
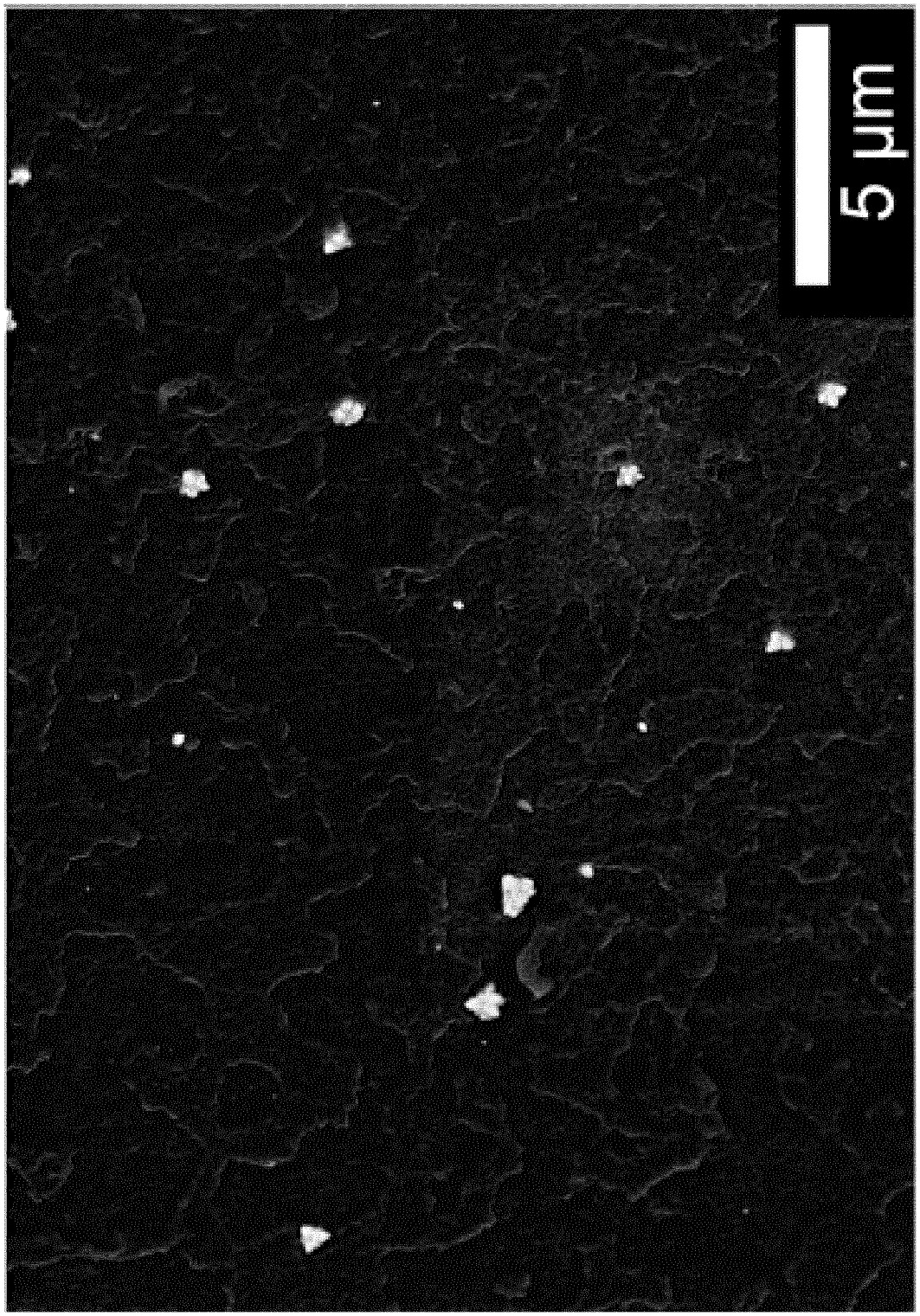

FIG. 16d shows LDPE/3 wt. % ZnO-550-U.

Figure 17:
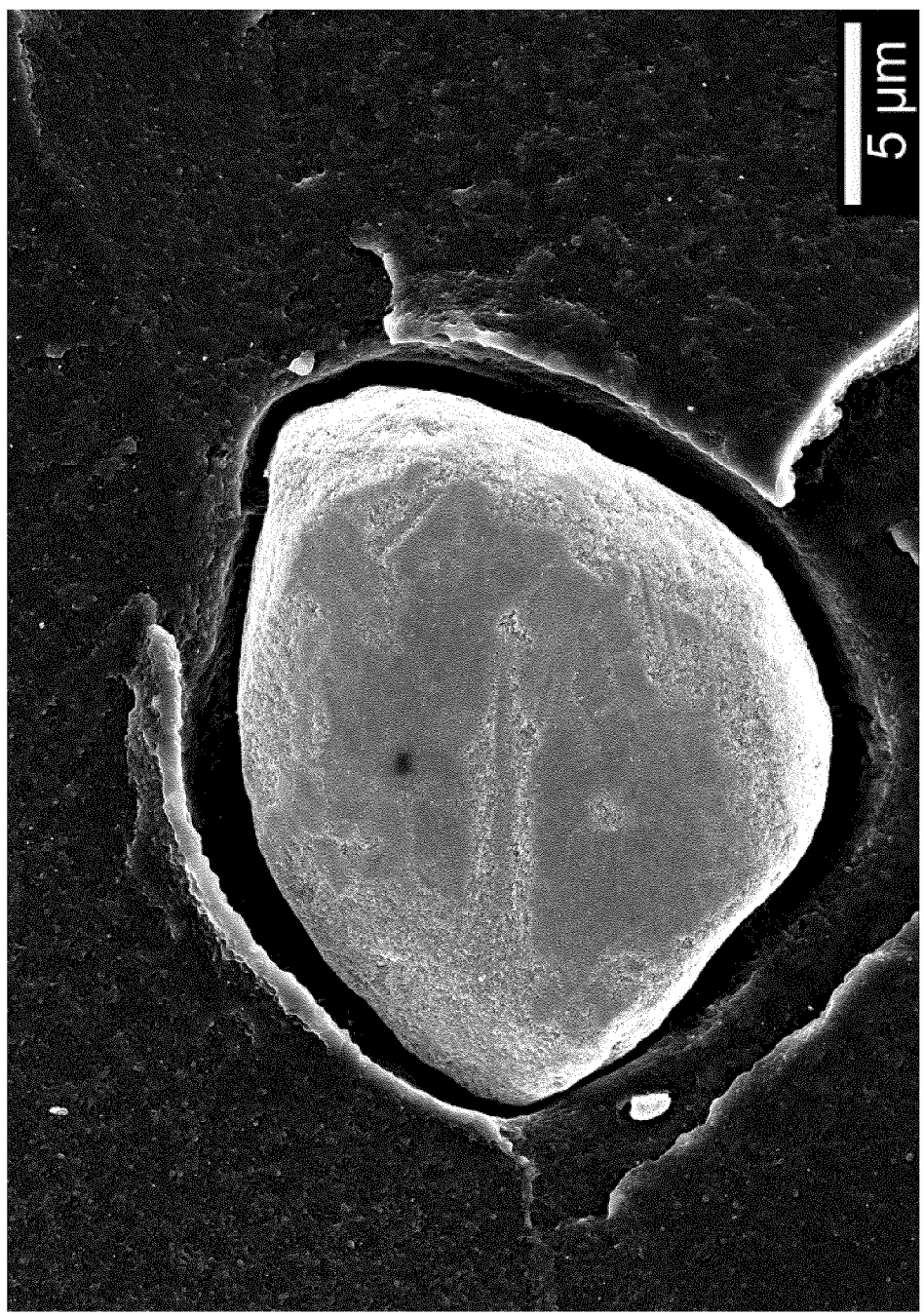

FIG. 17 shows scanning electron micrograph of LDPE nanocomposites based on 3 wt. % unmodified ZnO nanoparticles (ZnO-25-U).

Figure 18:
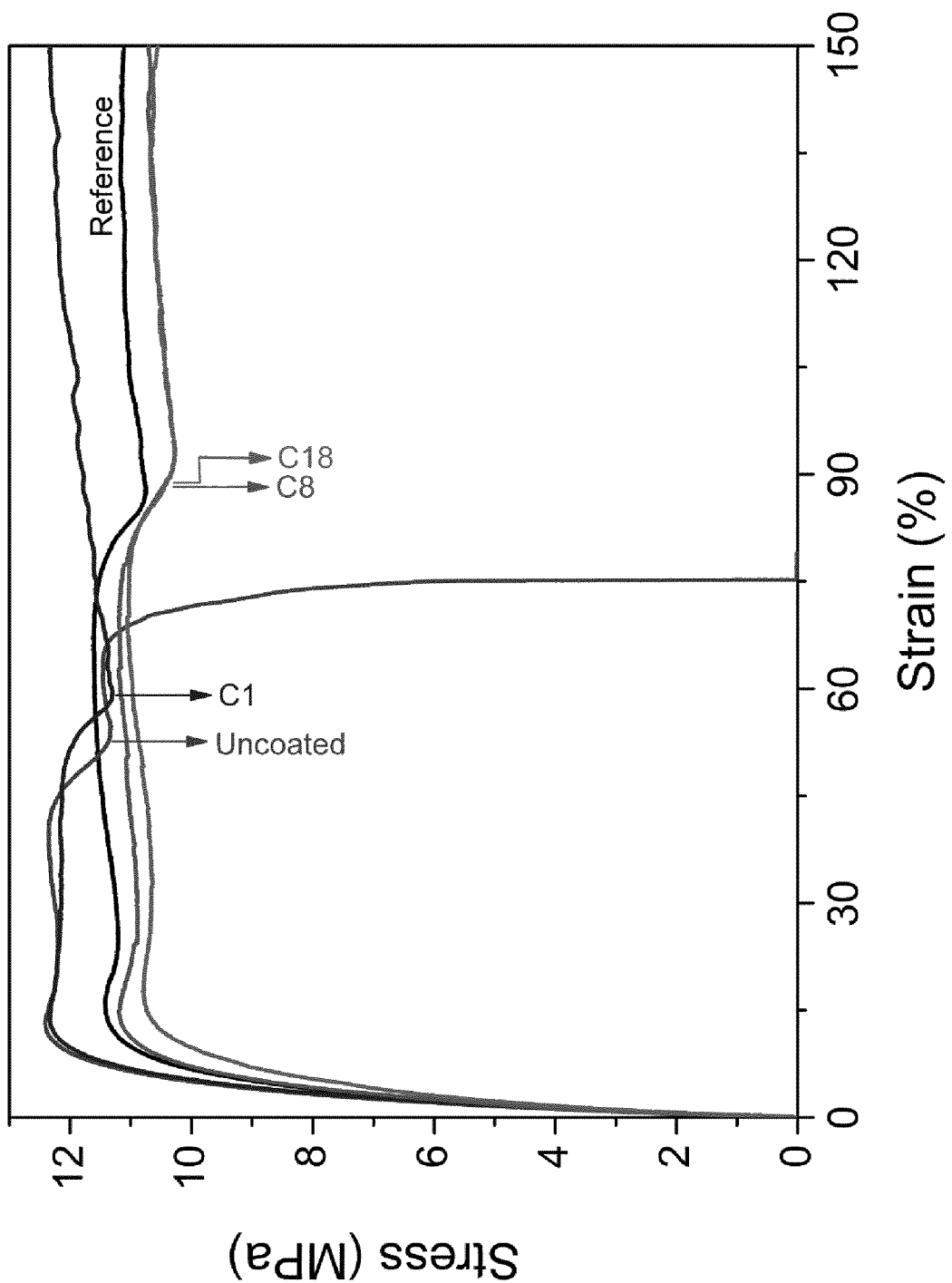

FIG. 18 shows stress-strain curves of unfiled LDPE and LDPE nanocomposites filled with 3 wt. % of ZnO nanoparticles (ZnO-25-U) with different surface coating. The second yield point positions are indicated by arrows in the graph.

Figure 19A:
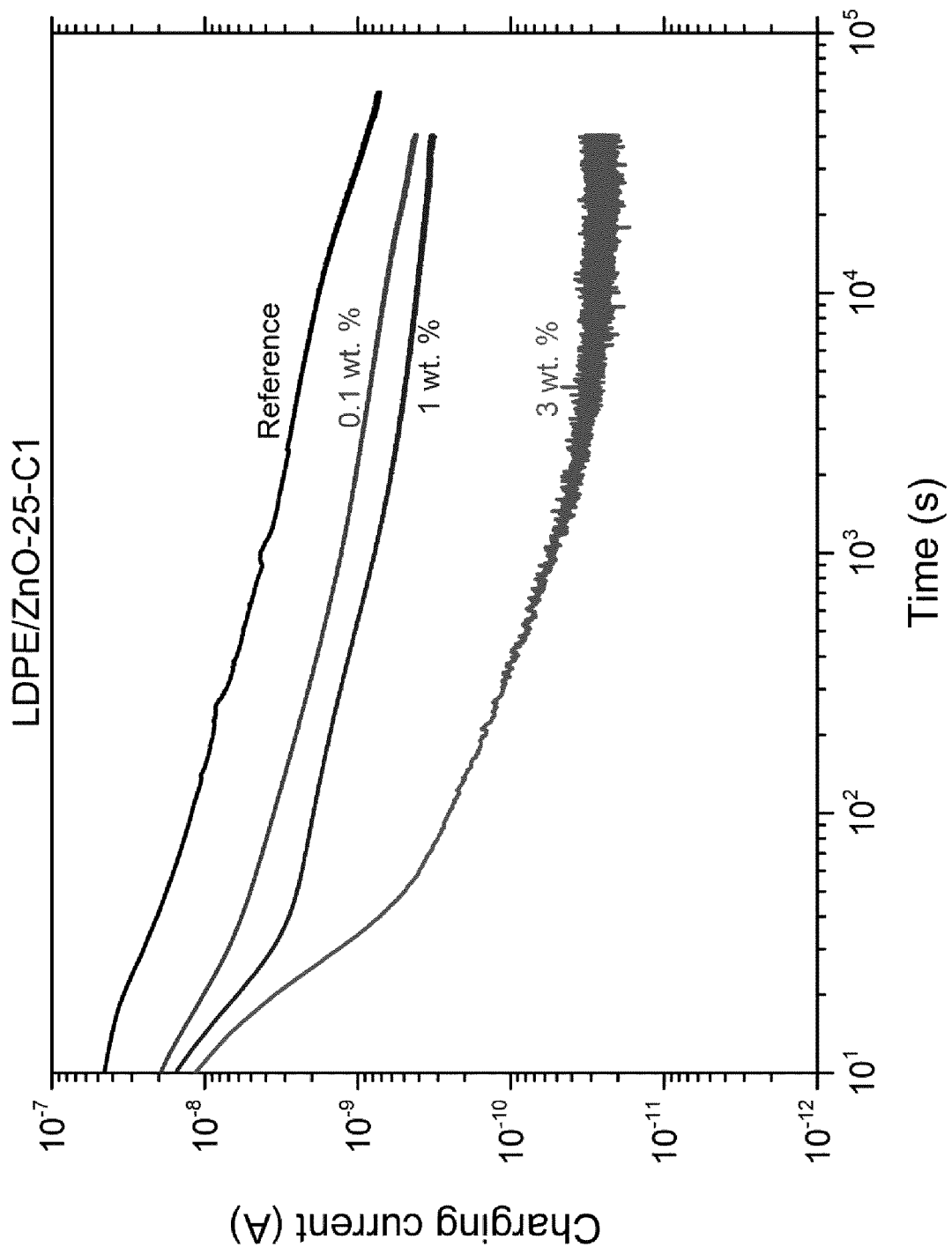
Figure 19B:
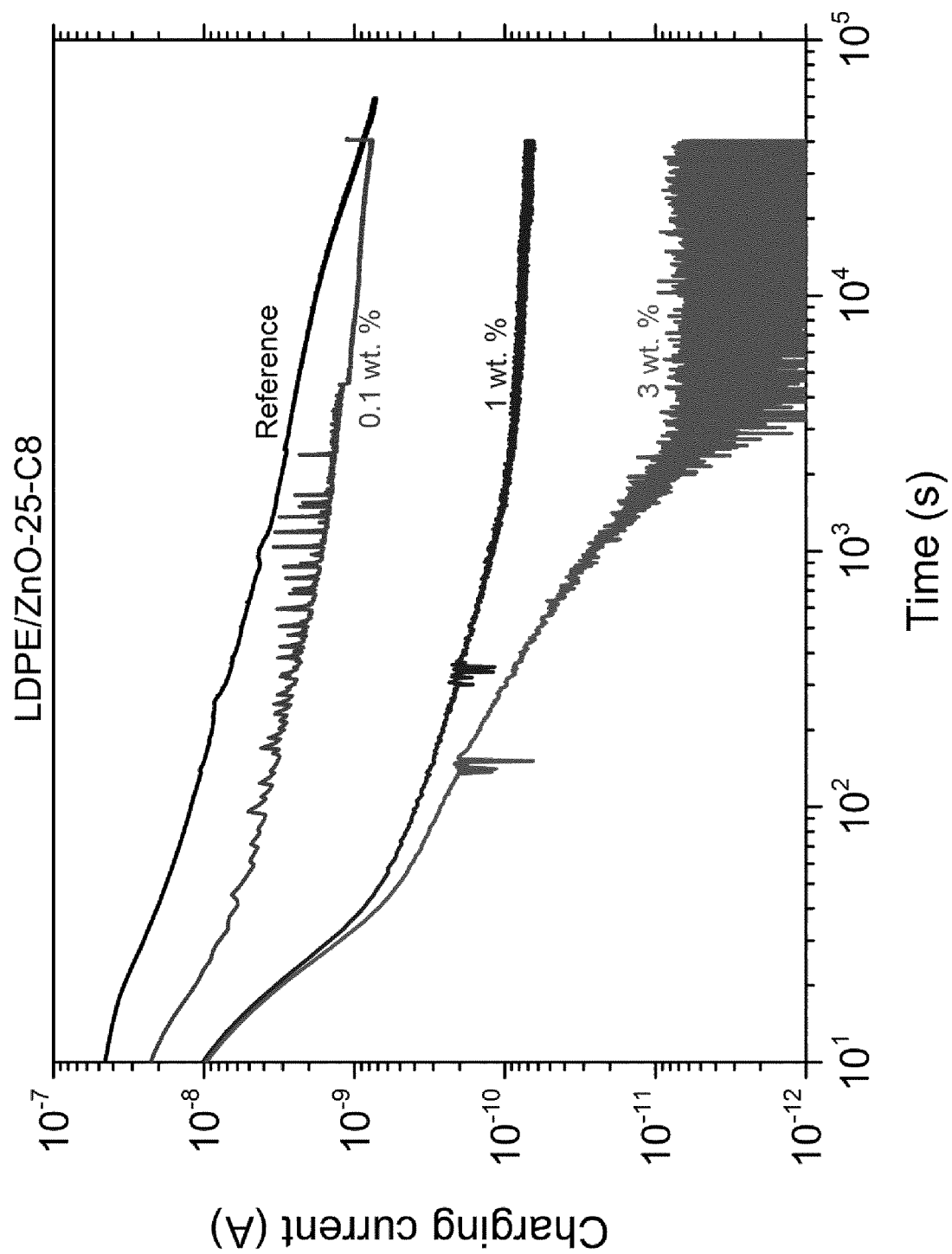
Figure 19C:
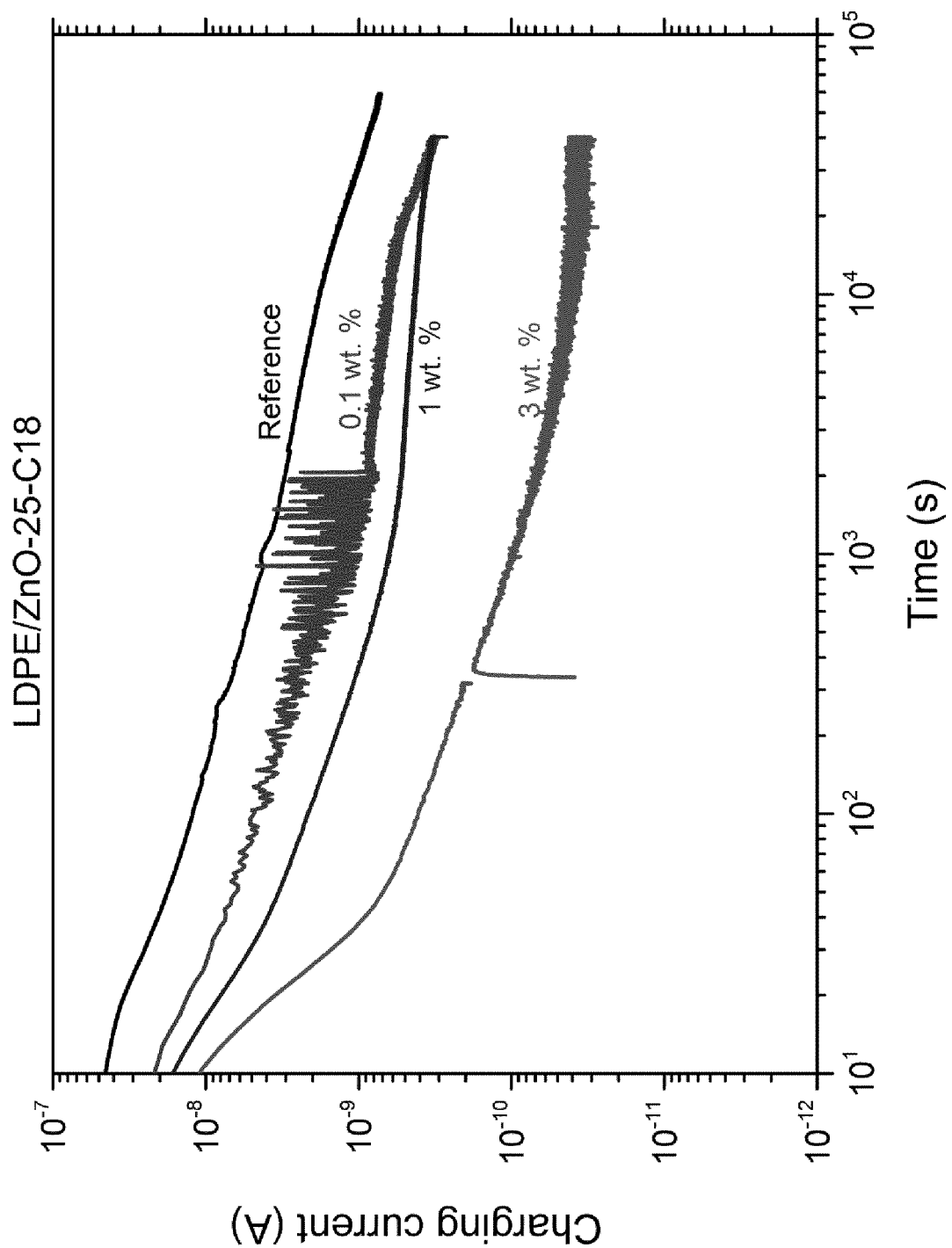

FIG. 19a-19c show charging current of pristine LDPE and its nanocomposites based on different weight fraction of ZnO nanoparticles (ZnO-25-U) with different surface coating obtained at 2.6 kV (E=32.5 kV mm-1) at 60° C.

FIG. 19a shows nanocomposites comprising 0.1, 1.0 and 3.0 wt. %, respectively, of LDPE/ZnO-25-C1, and unfilled LDPE (Reference).

FIG. 19b shows nanocomposites comprising 0.1, 1.0 and 3.0 wt. %, respectively, of LDPE/ZnO-25-C8, and unfilled LDPE (Reference).

FIG. 19c shows nanocomposites comprising 0.1, 1.0 and 3.0 wt. %, respectively, of LDPE/ZnO-25-C18, and unfilled LDPE (Reference).

Figure 20:
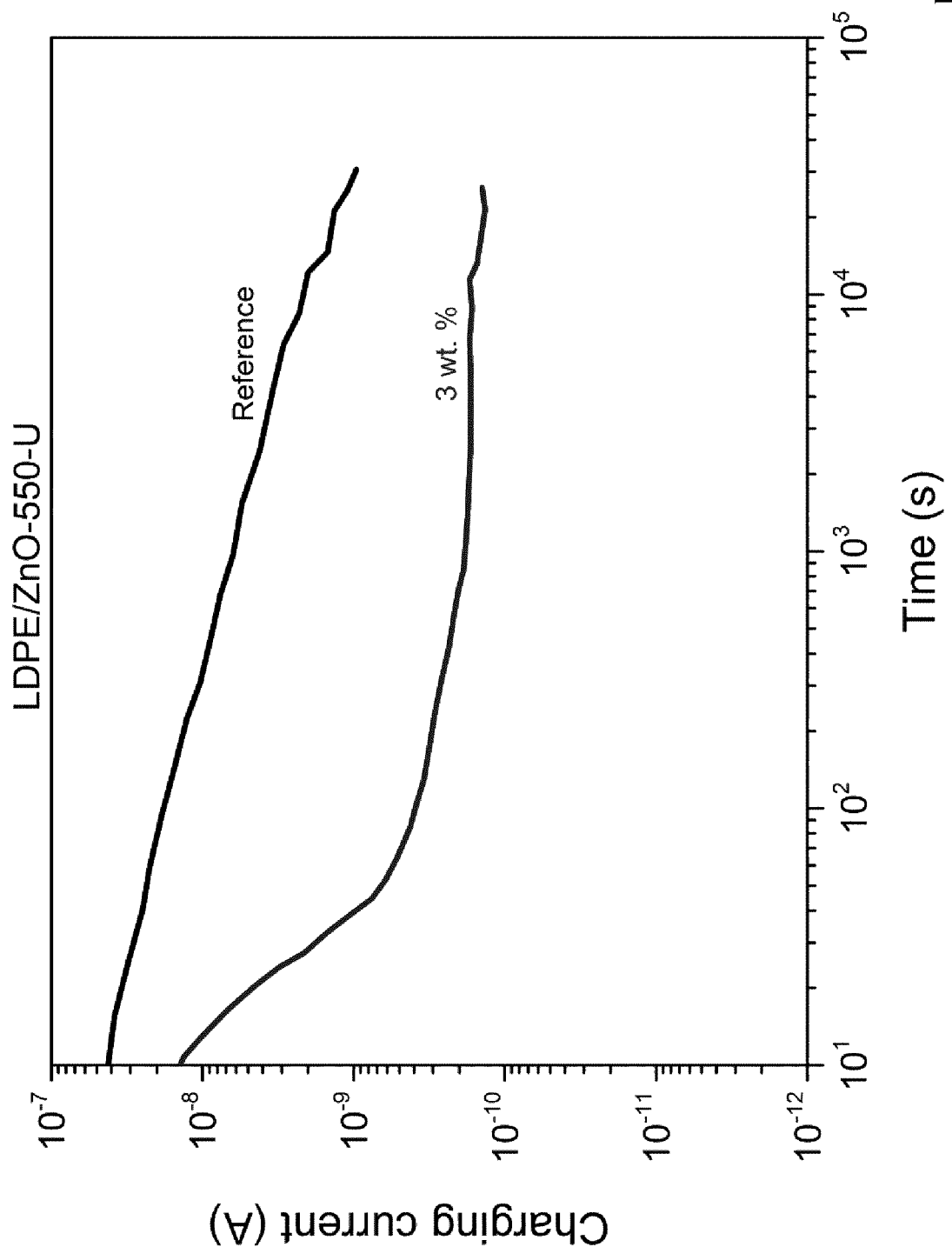

FIG. 20 shows charging current of pristine LDPE and its nanocomposites based on different weight fraction of ZnO submicron particles (ZnO-550-U) obtained at 2.6 kV (E=32.5 kV mm-1) at 60° C.

Figure 21:
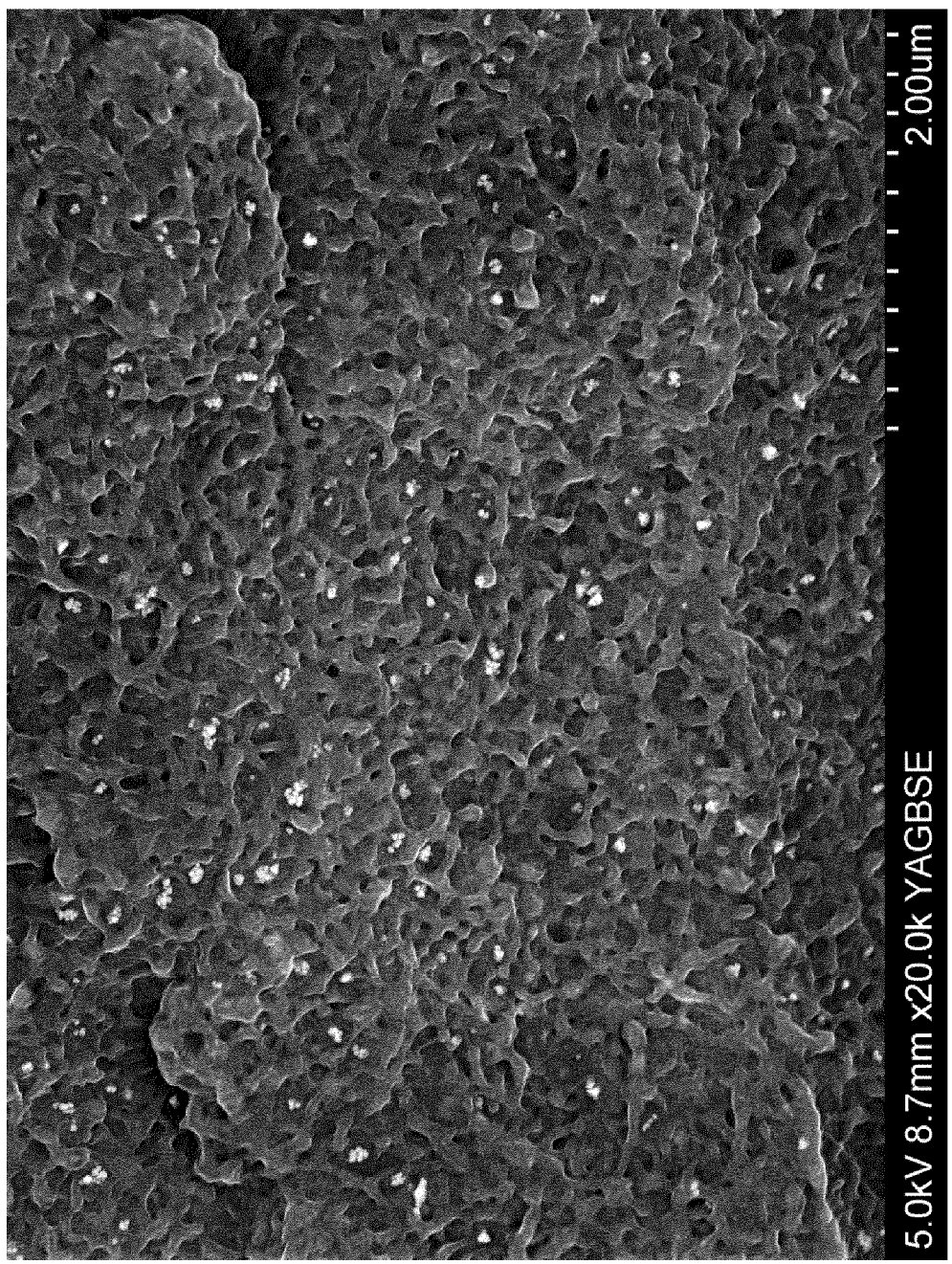

FIG. 21 shows scanning electron micrograph of nanocomposite of LDPE and ZnO-25-C1 with a nanoparticle content of 3 wt. % ZnO.

Figure 22:

FIG. 22 shows the corresponding bitmap of FIG. 21 with ZnO nanoparticles as the black phase.

Figure 23A:
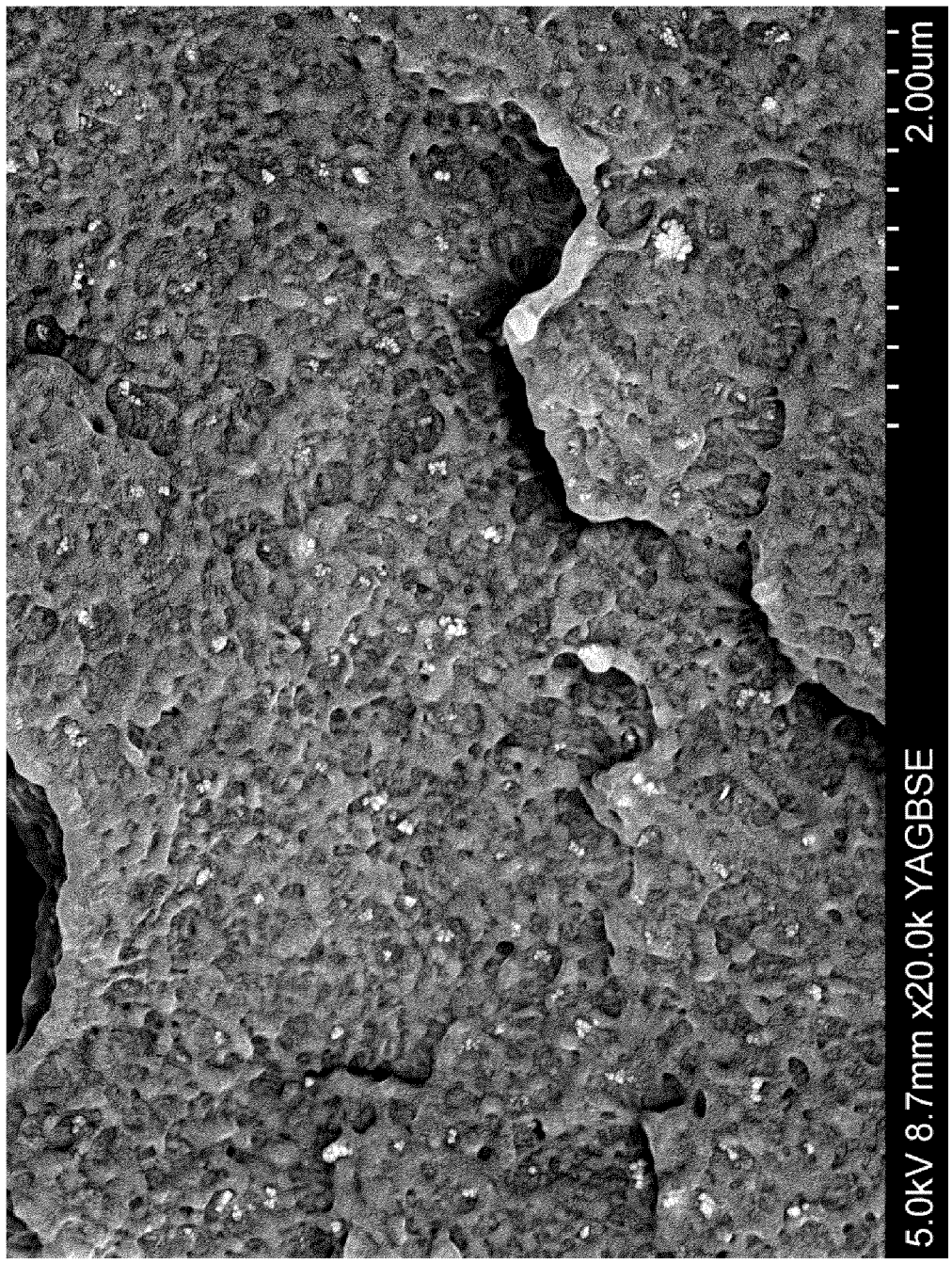

FIG. 23a shows scanning electron micrograph of nanocomposite of LDPE and ZnO-25-C8 with a nanoparticle content of 3 wt. % ZnO.

Figure 23B:
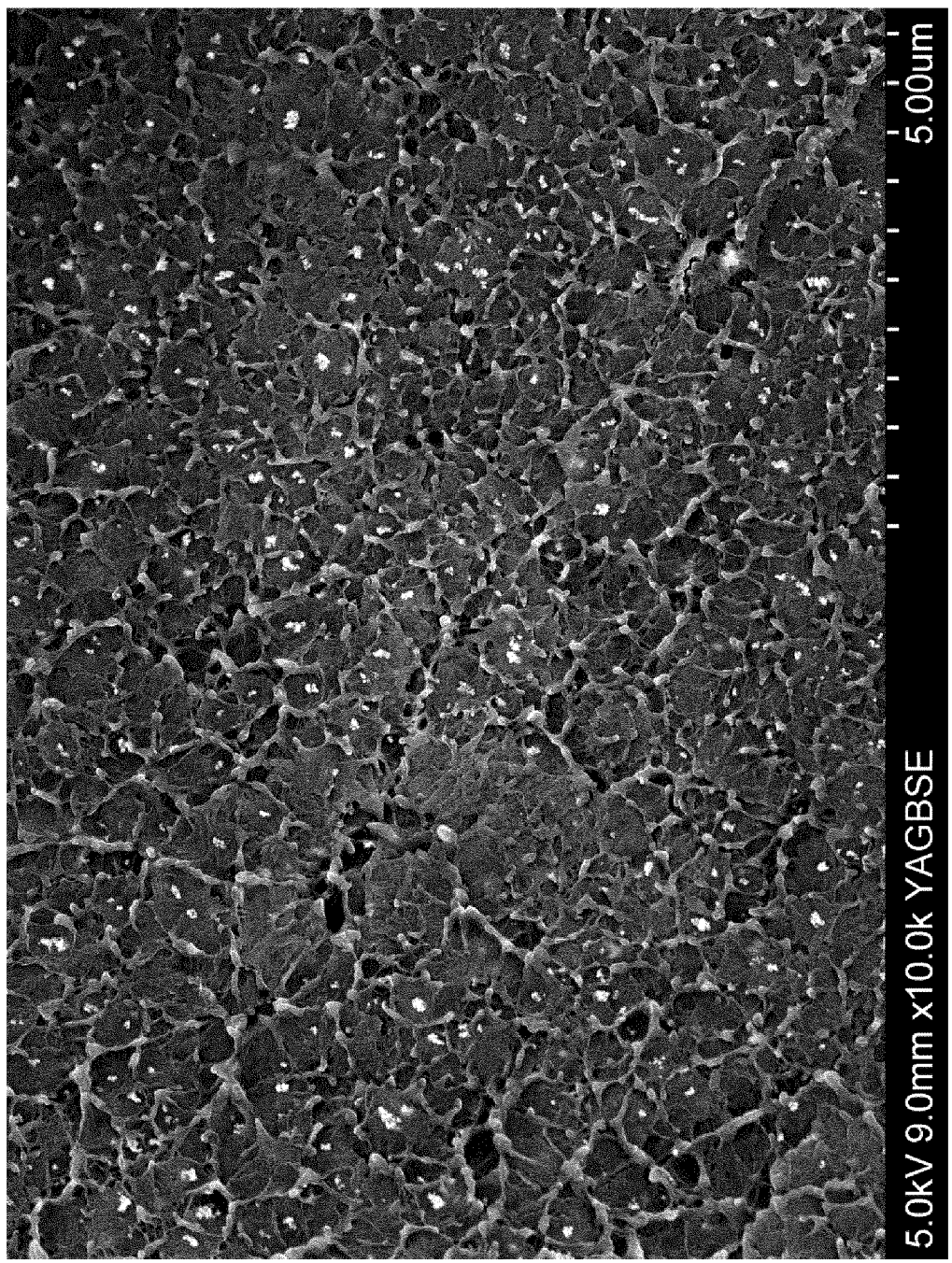

FIG. 23b shows scanning electron micrograph of nanocomposite of LDPE and ZnO-25-C18 with a nanoparticle content of 3 wt. % ZnO.

Figure 24:
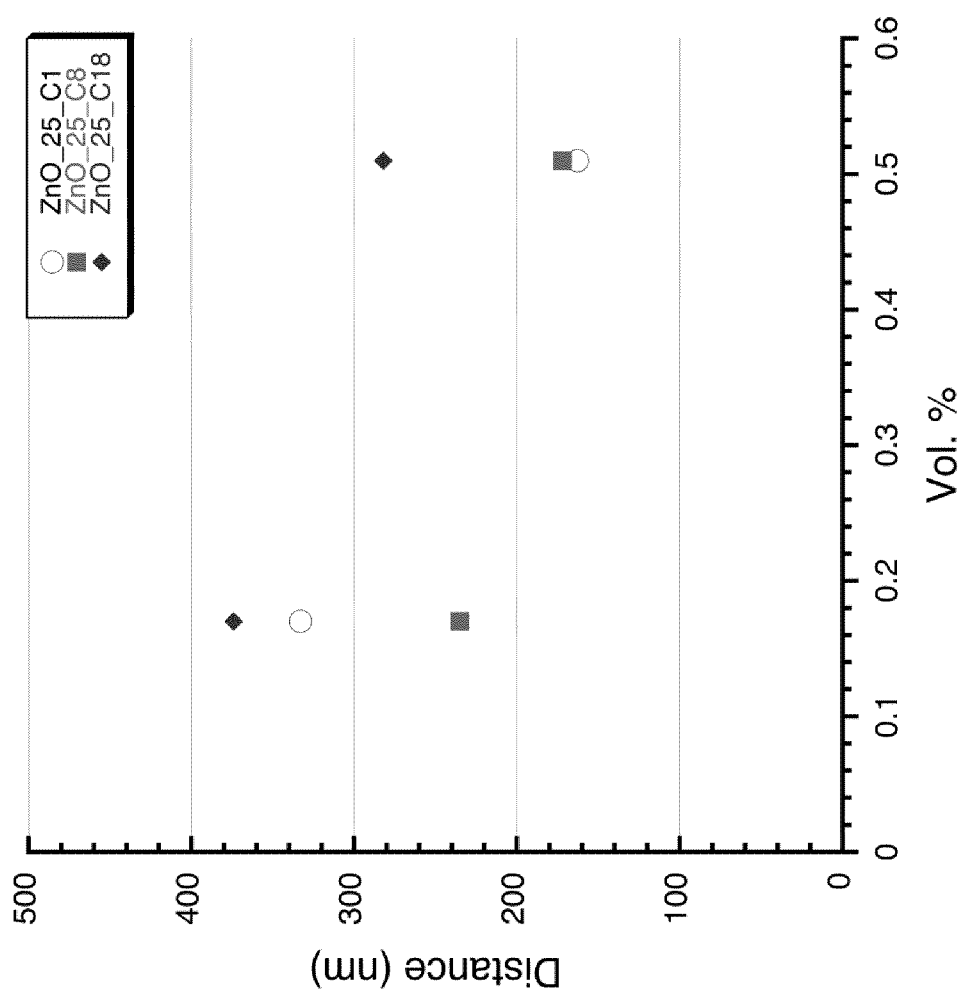
Figure 25:
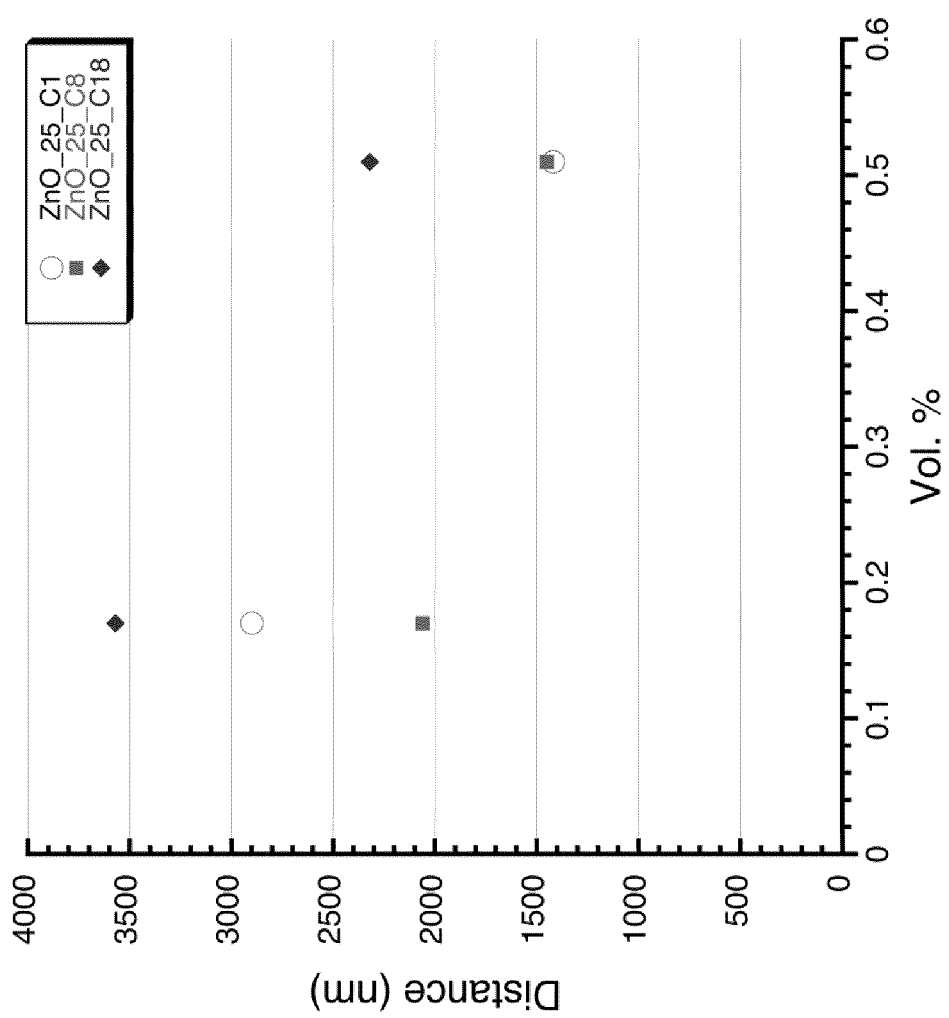

FIGS. 24 and 25 show the overall dispersion of the ZnO phase in the PE matrix for the nanocomposites with different weight fractions of nanoparticles, i.e. regarding the aggregated ZnO nanoparticles as discrete phases (in accordance with FIG. 22). Note that ZnO_25_C1, ZnO_25_C8 and ZnO_25_C18 in FIGS. 24 and 25 mean ZnO-25-C1, ZnO-25-C8 and ZnO-25-C18 as defined herein.

FIG. 24 shows centre-to-centre distance for the $1^{st}$ neighbour as a function of volume percentage of 25 nm ZnO nanoparticles surface modified with C1, C8 and C18 alkyl chain on the silane at 1 wt. % and 3 wt. %.

FIG. 25 shows centre-to-centre distance for the $51^{st}$ neighbour as a function of volume percentage of 25 nm ZnO nanoparticles surface modified with C1, C8 and C18 alkyl chain on the silane at 1 wt. % and 3 wt. %.

EXPERIMENTAL SECTION

Experimental

Synthesis of MgO Nanoparticles and Surface Modification (i.e. the Nanoparticle Filler (b) Preparation)

Aqueous precipitated $Mg(OH)_2$ was synthesized accordingly to Pallon et al, J. Mater. Chem. A, 2015, 3, 7523, by adding 1 L of a 0.75 M magnesium chloride solution (MgCl$_2$.6H$_2$O, ACS Reagent, Sigma-Aldrich) to a 1 L 1.5 M sodium hydroxide solution (NaOH, ≥98%, Sigma-Aldrich) in stoichiometric balance under rapid stirring (400 rpm). The precipitate was washed with milliQ-water in three cycles and Na$^+$, Cl$^-$ and other residual reagents were removed by centrifugation, using a Rotina 420 centrifuge (Hettich) and ultrasonic bath to break clusters (DTH 2510, Branson), see A. M. Pourrahimi, D. Liu, L. K. H. Pallon, R. L. Andersson, A. Martinez Abad, J.-M. Lagarón, M. S. Hedenqvist, V. Ström, U. W. Gedde and R. T. Olsson, RSC Adv., 2014, 4, 35568-35577. The precipitate was dried at 90° C. overnight and ground before calcination into MgO platelets for 1 h at 400° C. in a muffle furnace (ML Furnaces). The properties of the MgO nanoparticles formed during calcination from Mg(OH)$_2$ were carefully characterized by Pallon et al, J. Mater. Chem. A, 2015, 3, 7523, using X-ray powder diffractometry (XRD), BET (Brunauer, Emmett and Teller) (specific surface area 167 m$^2$/g), and scanning- and transmission microscopy (average size of a MgO nanoparticle was 66 nm) studies were performed to verify the applicability of the synthesised nanoparticles. Upon precipitation the Mg(OH)$_2$ formed rounded hexagonal platelets with a mean diameter of 43 nm and a thickness of 10 to 20 nm. During the calcination and phase transformation, MgO retained the shape of the Mg(OH)$_2$ particles, while the crystal lattice changed from hexagonal Mg(OH)$_2$ to cubic MgO (same crystal structure as NaCl) and several crystallites (ca 10 nm) were formed inside the retained particle shape. Due to the weak polycrystallite structure the MgO nanoparticles did not always maintain their structure during the processing with ultrasound and extrusion, but broke apart into individual crystallites (ca 10 nm).

Anhydrous silanzation was performed in n-heptane to avoid a phase transformation into Mg(OH)$_2$. The calcined MgO powder was dispersed in n-heptane (>99%, VWR) with an ultrasonic bath (DTH 2510, Branson) and then transferred to a ball reactor. 0.5 g MgO was dispersed in 0.165 L n-heptane, and under rapid stirring (400 rpm) 0.9 mL of octadecyl(trimethoxy)silane (OdTMS-C18) was added. For the octyl(triethoxy)silane (OTES-C8) 4.5 mL was used.

The smaller amount of OdTMS-C18 was used to compensate for the higher reactivity of the methoxygroups of OdTMS-C18, see E. P. Plueddemann, Silane Coupling Agents, 2$^{nd}$ ed., 1991, Springer, New York (ch3, pp 56). The reaction proceeded for 24 hours, after which the nanoparticles, i.e. the nanoparticle filler (b), were washed with heptane in three cycles to remove excess silanes (using the Rotina 420 centrifuge (Hettich) and that ultrasonic bath). The MgO nanoparticles will herein also be referred to as "UN-MgO" for the unmodified MgO, "C8-MgO" for the octyl(triethoxy)silane modified MgO and "C18-MgO" for the octadecyl(trimethoxy)silane modified particles.

Synthesis of ZnO Nanoparticles and Surface Modification (i.e. the Nanoparticle Filler (b) Preparation)

Zinc nitrate hexahydrate (Zn(NO$_3$)$_2$.6H$_2$O, ≥98 wt. %, Sigma Aldrich), zinc acetate dihydrate (Zn(CH$_3$COO)$_2$.2H$_2$O, ≥99%, Sigma Aldrich), sodium hydroxide (≥98 wt. %, Sigma Aldrich), methyltrimethoxysilane (CAS number 1185-55, referred to as C1, ≥98%, 178.3 Da, Sigma Aldrich), octyltriethoxysilane (CAS number 2943-75-1, referred to as C8, ≥98%, 276.5 Da, Sigma Aldrich) and octadecyltrimethoxysilane (CAS number 3069-42-9, C18, ≥90%, technical grade, 374.7 Da, Sigma Aldrich), ammonia hydroxide (25 wt. %, Sigma Aldrich), 2-propanol (≥99.5 wt. %, VWR), ethanol (≥96 wt. %, VWR), n-heptane (≥99 wt. %, VWR), Irganox 1076 (CAS number 2082-79-3, octadecyl-3-(3,5-di-tert-butyl-4-hydroxyphenyl)-propionate), Ciba Specialty Chemicals, Switzerland) and potassium bromide (KBr, ≥98 wt. %, FTIR grade, Sigma Aldrich) were used as received. High resistivity Milli-Q water (18.2 MΩ cm at 25° C.) was used in all the aqueous reactions.

ZnO nanoparticles were prepared by an aqueous precipitation method described by A. M. Pourrahimi et al., RSC Adv., 2014, 4, 35568-35577, and A. M. Pourrahimi et al., J. Mater. Chem. A, 2015, 3, 17190-17200. ZnO nanoparticles with an average size of 25 nm were prepared by adding a 0.5 M NaOH aqueous solution to a 0.2 M zinc acetate aqueous solution under vigorous stirring. ZnO particles with an average size of 550 nm were prepared by precipitation of a 0.5 M NaOH aqueous solution and a 0.2 M Zn(NO$_3$)$_2$ aqueous solution. ZnO particles ca. 2 µm in size were prepared by using half the concentrations of both the Zn(NO$_3$)$_2$ and NaOH precursors used in the synthesis of the 500 nm particle preparation. The ZnO particles were purified thrice in Milli-Q water under ultrasonication, dried at 80° C. and normal pressure, ground to a fine powder with a pestle and mortar and finally dried at 60° C. and 20 kPa for 2 h.

0.6 g ZnO nanoparticles (ZA-8 g) nanoparticles were dispersed in a solution of water (40.8 mL) and 2-propanol (188.4 mL), and then ultrasonicated for 15 min to obtain a homogeneous suspension. Ammonia (25 wt. %; volume=V$_{ammonia}$) was added to the suspension under vigorous stirring. The suspension was stirred for 15 min, and silane (volume=V$_{silane}$) was finally added and allowed to react for 3 h at room temperature. The quantities of the different compounds used for the different surface modifications are listed in Table 1. The coated particles were centrifuged and washed thrice with ethanol and dried overnight at 80° C. under reduced pressure (0.5 kPa).

TABLE 1

Reaction parameters in the silanization of ZnO nanoparticles (ZnO-25-U)

| | V$_{ammonia}$ (mL) | V$_{silane}$ (mL) |
|---|---|---|
| C1-coated | 1.28 | 5.40 |
| C8-coated | 5.10 | 5.40 |
| C18-coated | 1.28 | 0.41 |

The metal oxide particles used in this study were divided into three categories, zinc oxide particles (designated ZnO-25-U, ZnO-550-U, ZnO-25-C1, ZnO-25-C8 and ZnO-25-C18). The number in the middle of the names indicates the average size of the particles in nm. The surface functionality of the particles is indicated by the last part of the abbreviation: U=uncoated, C1=coated (or silanized) with methyltrimethoxysilane, C8=coated (or silanized) with octyltriethoxysilane and C18=coated (or silanized) with octadecyltrimethoxysilane.

Preparation of the Low-Density Polyethylene, i.e. the Polymer (a)

Ethylene with recycled CTA was compressed in a 5-stage precompressor and a 2-stage hypercompressor with intermediate cooling to reach initial reaction pressure of ca 2781 bar. The total compressor throughput was ca 30 tons/h. In the compressor area approximately 5.3 litres/hour of propionaldehyde (PA, CAS number 123-38-6) was added together with approximately 83 kg propylene/hour as chain transfer agents to maintain an MFR of 0.72 g/10 min. The compressed mixture was heated to 171° C. in the preheating section of the front feed three-zone tubular reactor with an inner diameter of ca 40 mm and a total length of 1200 meters. A mixture of commercially available peroxide radical initiators dissolved in isododecane was injected just after the preheater in an amount sufficient for the exothermal polymerisation reaction to reach peak temperatures of ca 283° C. after which it was cooled to approximately 203° C. The subsequent $2^{nd}$ and $3^{rd}$ peak reaction temperatures were 275° C. and 265° C. respectively with a cooling in between to 223° C. The reaction mixture was depressurised by a kick valve, cooled and the low-density polyethylene, i.e. the polymer (a), was separated from unreacted gas.

Base Resin Properties of the Low-Density Polyethylene, i.e. the Polymer (a):

MFR 2.16 kg, at 190° C. [g/10 min] 0.75
Density [kg/m$^3$] 922.5
Vinyl [C=C/1000 C] 0.27
Vinylidene [C=C/1000 C] 0.16
Trans-vinylene [C=C/1000 C] 0.04
Crystallinity [%] 53.9
Melting point, Tm [° C.] 110

Preparation of LDPE/MgO Nanocomposites (i.e. Preparation of the Polymer Composition of the Present Invention and Comparative Examples)

C8-MgO, C18-MgO and UN-MgO nanoparticles were separately mixed with ground the low-density polyethylene (*Borealis*) powder containing 200 ppm antioxidant Irganox 1076 in n-heptane solution, followed by shaking for 60 min using a Vortex Genie 2 shaker (G560E, Scientific Industries). The heptane facilitated the simultaneous dispersion of the antioxidant and the MgO. The mixture was dried overnight at 80° C. at 20 kPa to achieve complete removal of n-heptane.

Preparation of Film Samples

The dried LDPE/MgO nanocomposites, i.e. the polymer composition of the present invention and comparative examples, were extruded at 150° C. for 6 minutes at 100 rpm using a Micro 5 cc Twin Screw Compounder (DSM Xplore). Compression moulding was performed at ambient atmosphere in a LabPro 400 (Fontijne Grotnes) at 130° C. for 10 min under contact pressure and for 10 min at 200 kN, this pressure being maintained during cooling to 30° C. A 75-µm stainless steel mould was used to form the film samples, i.e. film samples of the polymer composition of the present invention and of comparative examples. Before compression moulding, the nanocomposites were degassed at 100° C. under reduced pressure (20 kPa) overnight in a Fisher Scientific Vacucell (MMM Group). A further reference sample (i.e. a further comparative example) of unfilled LDPE with the same concentration of antioxidant, for conductivity measurement, was extruded at 150° C. and hot-pressed under the same conditions as the nanocomposites. Three series of MgO-nanoparticles with different weight percentages (0.1, 1, 3, 6, 9 wt. %) were added to the LDPE (see Table 2).

TABLE 2 displays the series of MgO-nanoparticles added to the LDPE

| Sample | Unmodified MgO-nanoparticles | OTES - C8 - modified (i.e. OTES - C8-silanized) MgO-nanoparticles | OdTMS - C18 - modified (i.e. OdTMS - C18-silanized) MgO-nanoparticles |
|---|---|---|---|
| Wt. % (MgO) | 0.1, 1, 3, 6, 9 | 0.1, 1, 3, 6, 9 | 0.1, 1, 3, 6, 9 |

Preparation of LDPE/ZnO Nanocomposites (i.e. Preparation of the Polymer Composition of the Present Invention and Comparative Examples)

The low-density polyethylene pellets (*Borealis*) were cryo-ground to particles sized 0.5 mm. ZnO nanoparticles (different weight fractions; 0.1, 1 and 3 wt. % of the final formulation) and Irganox 1076 (0.02 wt. % of the final formulation) were added to n-heptane. The slurry was ultra-sonicated for 15 min at 23° C., after which cryo-ground LDPE powder was added and the slurry was mixed using a Vortex Genie 2 shaker (G560E, Scientific Industries) at 25° C. for 1 h. The mixtures were dried at 80° C. overnight, after which they were mixed by the shaker for 1 h.

Preparation of LDPE/ZnO Nanocomposites Film Samples

The dried LDPE/ZnO nanocomposites, i.e. the polymer composition of the present invention and comparative examples, were melt compounded in a Micro 5 cc Twin Screw Compounder (DSM Xplore) at 150° C. for 6 min with a screw speed of 100 rpm. The extruded nanocomposite rods were cut into pellets and compression-moulded under a load of 200 kN into 80 µm thick films using a TP400 laboratory press (Fontijne Grotnes B.V., the Netherlands) at 130° C. for 10 min. The samples were finally cooled to 25° C. at a rate of 20° C. min while maintaining the compressive load.

LDPE/MO Nanocomposites

Particle (Nanoparticle) Dispersion Analysis

A field emission scanning electron microscope (FE-SEM), Hitachi S-4800, was used to assess the nanoparticle dispersion and distribution in the low-density polyethylene. The samples were prepared by cracking a frozen notched sample in liquid nitrogen, which was further coated with Pt/Pd before insertion in the FE-SEM. The coating/sputtering time was 30 s, at an 80 mA operating current of the Cressington 208HR sputter.

A Field emission scanning electron microscopy (FE-SEM) image analysis of the LDPE/MgO nanocomposites, i.e. the polymer composition of the present invention and comparative examples, were performed on the surface of the freeze-cracked samples. The first step in the analysis was to identify the MgO nanoparticles in the LDPE manually using Adobe Photoshop CS4, due to the low contrast between the filler and matrix, the rough surface of the polymer, and the irregular shape of the MgO nanoparticles. Once the particles had been marked (100-560 MgO-particles/clusters per specimen) the image was converted into black and white and exported to Matlab to assess mean particle radius $<r>$ and the average center-to-center distance in two dimensions (2D) to the Nth nearest neighbour $<R_N>$ using a free radius of the highlighted particle/cluster. The images were also assessed by using a fixed radius (33 nm) of the MgO-nanoparticles, as determined by Pallon et al, J. Mater. Chem. A, 2015, 3, 7523, to compensate that clusters and aggregates are highlighted as one structure. Any single structure larger than corresponding two particles, as pre-determined from virgin particle diameters, was divided into X number of particles forming a cluster, in order to give a true picture of the dispersion. The particle dispersion and distribution was further quantified by using the deviation ratio $\Delta N$, where the assessed average center-to-center values $<RN>$ of the system of fixed radius are compared with the corresponding $<R0N>$ value of a completely random system with the volume percentage, see J. W. Leggoe, Scr. Mater., 2005, 53, pp. 1263-1268. A deviation ratio; $\Delta N<1$, indicated a system with less good distribution (areas of higher concentration of particles) than a completely random system with the same weight percentage of particles. A $\Delta N>1$ indicated a system that is better distributed than can be expected from a complete random system. In order to confirm that the average and mean values acquired were a good estimate Bootstrap statistics with 1000 bootstrap samples were used, see B. Efron, Ann. Stat., 1979, 7, pp 1-26. For more information, see M. Wahlander, F. Nilsson, E. Larsson, W.-C. Tsai, H. Hillborg, A. Carlmark, U. W. Gedde, E. Malmstrom, Polymer, 2014, 55, pp 2125-2138. Due to the small number of particles in the 0.1 wt. % group, these systems could not be analysed from the SEM-images.

To quantify the distance for particle interaction on the charge current at different weight percentages, the MgO-systems were reconstructed in three dimensions, see FIG. 1. The reconstructions were based on the size distribution of the MgO-phase as determined for all 1-9 wt. % MgO-systems. To reconstruct the 0.1 wt. % MgO-system, the data for the 1 wt. % system were used as this was consider to best represent the 0.1 wt. % system. Using this reconstruction, the conductivity was related to the interaction distance of the MgO-phase at different filling contents in the polyethylene matrix.

Evaluation of Surface Modification Protocols

Figure 2:
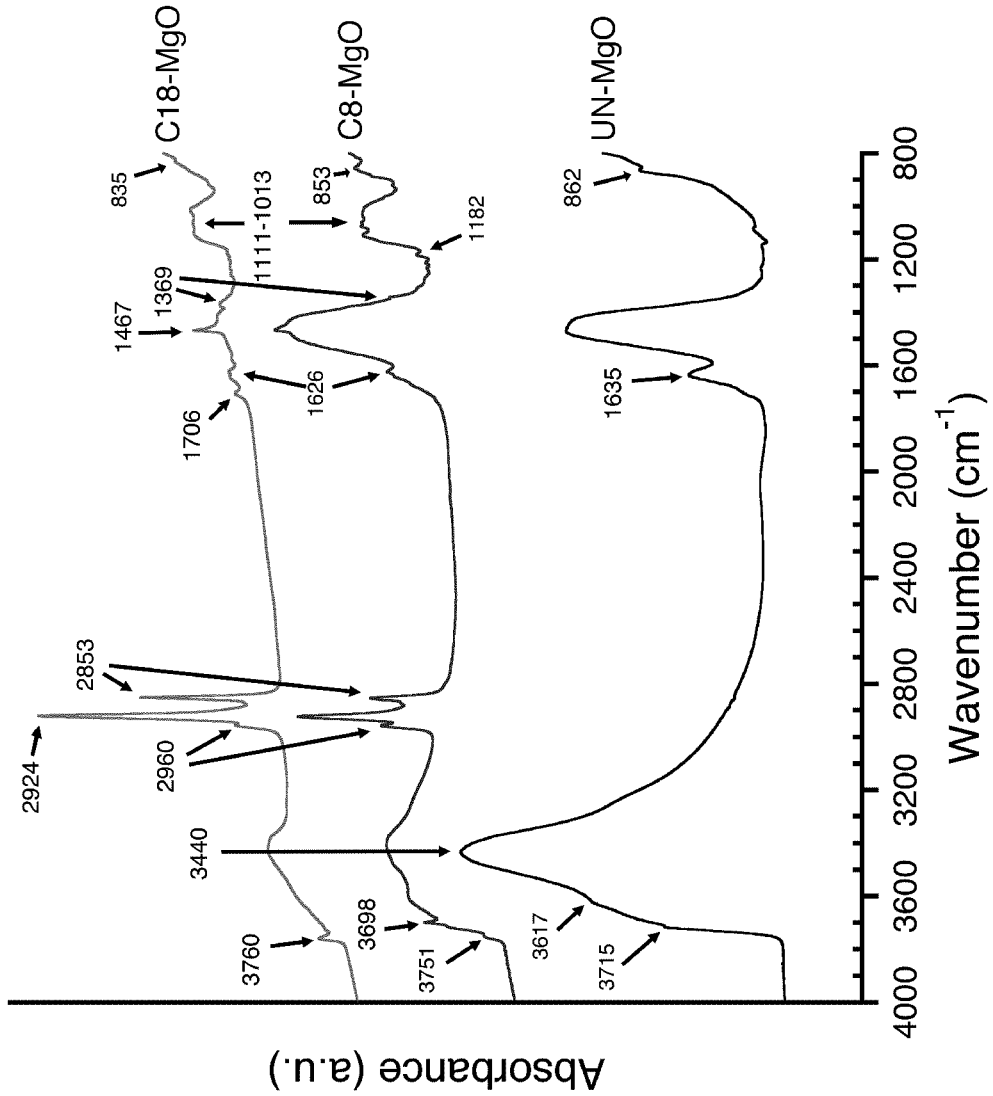
FIG. 2 shows IR spectra of unmodified (bottom curve), octa(triethoxy)-silane-modified MgO (middle curve) and octadecyl(trimethoxy)silane-modified (top curve) MgO by using FT-IR technique. The curves have been shifted along the y-axis for visibility.

The attachment of both C8- and C18-functional silicone oxide (silsesquioxane) coatings to the MgO nanoparticles, i.e. the preparation of OTES-C8-modified (i.e. OTES-C8-silanized) and OdTMS-C18-modified (i.e. OdTMS-C18-silanized) MgO-nanoparticles, was confirmed by infrared spectroscopy (using FT-IR), as shown in FIG. 2.

The triple peak of $CH_2$ stretching band at 2924 $cm^{-1}$ and the two $CH_3$-stretching bands at 2960 and 2850 $cm^{-1}$ showed the presence of alkyl substituents in the silsesquioxane coatings, and the broad peak between 1110 and 1010 $cm^{-1}$ confirmed the formation of Si—O—Si bonds or alternatively of Si—O—R with R being an alkyl unit, see P. Larkin, In Infrared and Raman Spectroscopy, edited by P. Larkin, Elsevier, Oxford, 2011. The condensed silanes contributed to a lower broad peak at 3750-3200 $cm^{-1}$, which was attributed to the coordinated surface-OH groups acting as proton donors in surface hydrogen bonds. The more distinct peaks at 3760 (C18-MgO), 3698 (C8-MgO) and the shoulders at 3751 (C8), 3715 $cm^{-1}$ (UN-MgO) were related to the stretching of isolated (1-coordination) and multiple coordinated surface-OH groups, where the possible coordination has been reported to depend on the exposed crystal facet, see E. Knizinger, K. H. Jacob, S. Singh, P. Hofmann, Surf. Sci., 1993, 290, pp 380-402. The shifts in the peaks for the silanized MgO were indicating that certain facets are more favourable for silane condensation. The C8-MgO-spectrum, i.e. the spectrum of C8-modified (i.e. OTES-C8-silanized) MgO-nanoparticles, was more similar to the unmodified MgO (UN-MgO) than the C18-MgO-spectrum, i.e. the spectrum of C18-modified (i.e. OdTMS-C18-silanized) MgO-nanoparticles, with a residual broad peak at about 1467 $cm^{-1}$ and a more distinct peak at about 1630 $cm^{-1}$. On the slope up to the MgO-bulk absorption (800 $cm^{-1}$), see D. Cornu, H. Guesmi, J. M. Krafft, H. Lauron-Pernot, J. Phys. Chem. C, 2012, 116, pp 6645-6654, the small peaks at 835 (C18-MgO) and 850 $cm^{-1}$ (C8-MgO) have been attributed to Si—O stretching in the SiOH, see P. Larkin, In Infrared and Raman Spectroscopy, edited by P. Larkin, Elsevier, Oxford, 2011, while the peak at 862 $cm^{-1}$ for unmodified MgO (UN-MgO) was assigned to OH from the adsorbed $H_2O$, see H. A. Prescott, Z. J. Li, E. Kemnitz, J. Deutsch and H. Lieske, J. Mater. Chem., 2005, 15, 4616-4628. The sharp silane peak at 1467 $cm^{-1}$, visible in both the C18-MgO and C8-MgO spectra was attributed to —CH bending, and is known to be sharper for longer alkyl chains.

The broad peak centered at 1467 $cm^{-1}$ (1600-1300 $cm^{-1}$) was attributed to chemisorbed $CO_2$ in the form of unidentate carbonate (O—C—O) with one or two bridging bonds, covering a band of wavelengths (1710-1270 $cm^{-1}$), see D. Cornu, H. Guesmi, J. M. Krafft, H. Lauron-Pernot, J. Phys. Chem. C, 2012, 116, pp 6645-6654, and H. A. Prescott, Z. J. Li, E. Kemnitz, J. Deutsch and H. Lieske, J. Mater. Chem., 2005, 15, 4616-4628. This sort of $CO_2$ chemisorbed on MgO was previously also reported with a similar relative intensity for adsorbed carbon dioxide from polluted air, see Y. Y. Li, K. K. Han, W. G. Lin, M. M. Wan, Y. Wang, J. H. Zhu, J. Mater. Chem. A, 2013, 1, pp. 12919-12925. The suppressed $CO_2$ and $H_2O$ adsorption signals (1460 and 1635 $cm^{-1}$, respectively) from the C18-modified MgO-nanoparticles indicated a better steric hindrance towards the adsorption of these species than the C8-modified MgO-nanoparticles, and the former also displayed a more intense signal at 2950-2850 $cm^{-1}$ see again both D. Cornu, H. Guesmi, J. M. Krafft, H. Lauron-Pernot, J. Phys. Chem. C, 2012, 116, pp 6645-6654, and H. A. Prescott, Z. J. Li, E. Kemnitz, J. Deutsch and H. Lieske, J. Mater. Chem., 2005, 15, 4616-4628. This was in contrast to spectrum of the unmodified MgO nanoparticles that showed the presence of surface water (3600-3200 and 1635 $cm^{-1}$). This surface water was expected to facilitate the hydrolysis of the silanes on the particle surfaces during the surface modification reactions.

Figure 3:
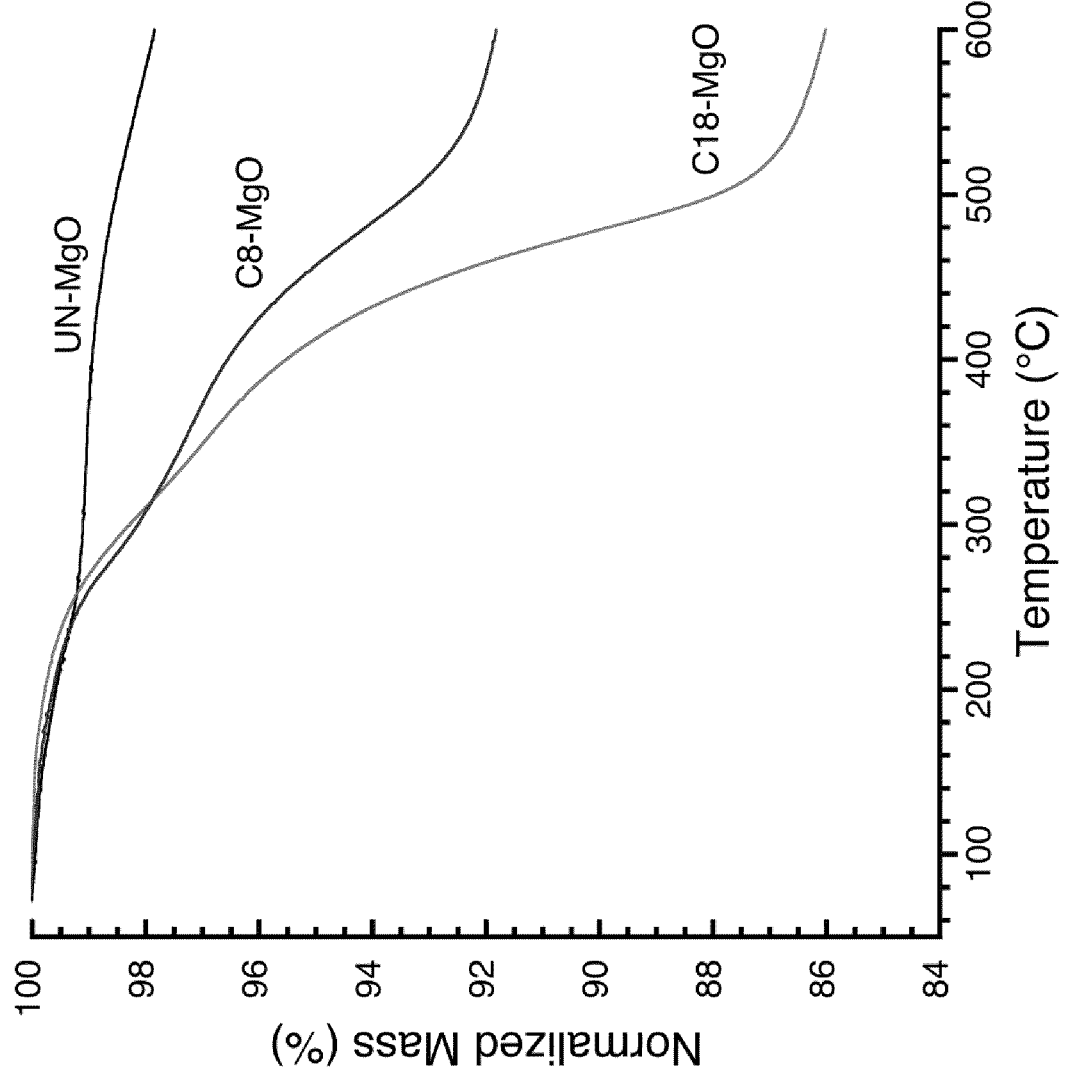
FIG. 3 shows thermogravimetric data of unmodified, octa(triethoxy)silane-modified MgO and octadecyl (trimethoxy)silane-modified MgO heated at 10° C./min under nitrogen flow.

FIG. 3 shows the thermogravimetrical (TG) data of unmodified, C8- and C18-modified MgO nanoparticles heated under nitrogen to a temperature of 600° C.

Up to 230° C. the mass losses were almost identical and could be attributed to the evaporation of crystal water and carbonates species formed from adsorbed $CO_2$, which has been reported to desorb at 200° C., see V. K. Diez, C. R. Apesteguia, J. I. Di Cosimo, J. Catal, 2006, 240, 235-244. The total mass loss of the unmodified MgO was 2.2% up to 600° C., which was attributed to surface adsorbed water and possibly residual $Mg(OH)_2$ that remained after the calcination of the $Mg(OH)_2$. The C8-modified MgO-nanoparticles and C18-modified MgO-nanoparticles showed a mass loss of 8.2% and 14.0%, respectively. After normalization with respect to the mass loss of the unmodified MgO, the mass losses of 6.2% for C8-modified MgO-nanoparticles and 12.1% C18-modified MgO-nanoparticles could be related to the loss of the organic material, since the relative ratio corresponded to the ratio of the masses of the alkyl chains on the two silanes. The condensation of the silane molecules to form a condensed Si—O—Si network was therefore confirmed to have occurred in a similar manner for both silanes.

The silicone oxide network density ($\rho_{silane}$ [silane per $nm^{-2}$]) was calculated as in equation (1):

$$\rho_{silane} = \frac{(w_{unmod} - w_{mod})N_A}{M_{volatile} \, w_{unmod} SSA} \qquad (1)$$

where $W_{unmod}$-$w_{mod}$ where $W_{unmod}$ and $w_{mod}$ are respectively the mass losses of the unmodified (UN-MgO) and modified MgO (C8-MgO and C18-MgO), $N_A$ is the Avogrado number, $M_w$ (volatile part) is the molar mass of the volatile part of the silane and SSA is the specific surface area. The calculation resulted in a "condensed" silane molecule coverage of 1.97 silanes/$nm^2$ for the C8-coating and 1.72 silanes/$nm^2$ for the C18-coating on the MgO nanoparticles, assuming that the silane molecules grafted as a monolayer with full access to the 167 $m^2/g$ surface area of the pristine MgO nanoparticles. The values were of the same order as those reported for $Fe_3O_4$ and $Al_2O_3$ nanoparticles, see D. Liu, A. M. Pourrahimi, L. K. H. Pallon, R. L. Andersson, M. S. Hedenqvist, U. W. Gedde and R. T. Olsson, RSC Adv., 2015, 5, 48094-48103, and also in agreement with the ca. 1.7-2.0 silanes/nm$^2$ surface coverage reported by McCarthy et al. for a 70% coverage of the available surface, assuming one silane molecule covers 0.4 nm$^2$, see S. A. McCarthy, G. L. Davies and Y. K. Gun'ko, Nature Protocols, 2012, 7, 1677-1693.

Figure 4:
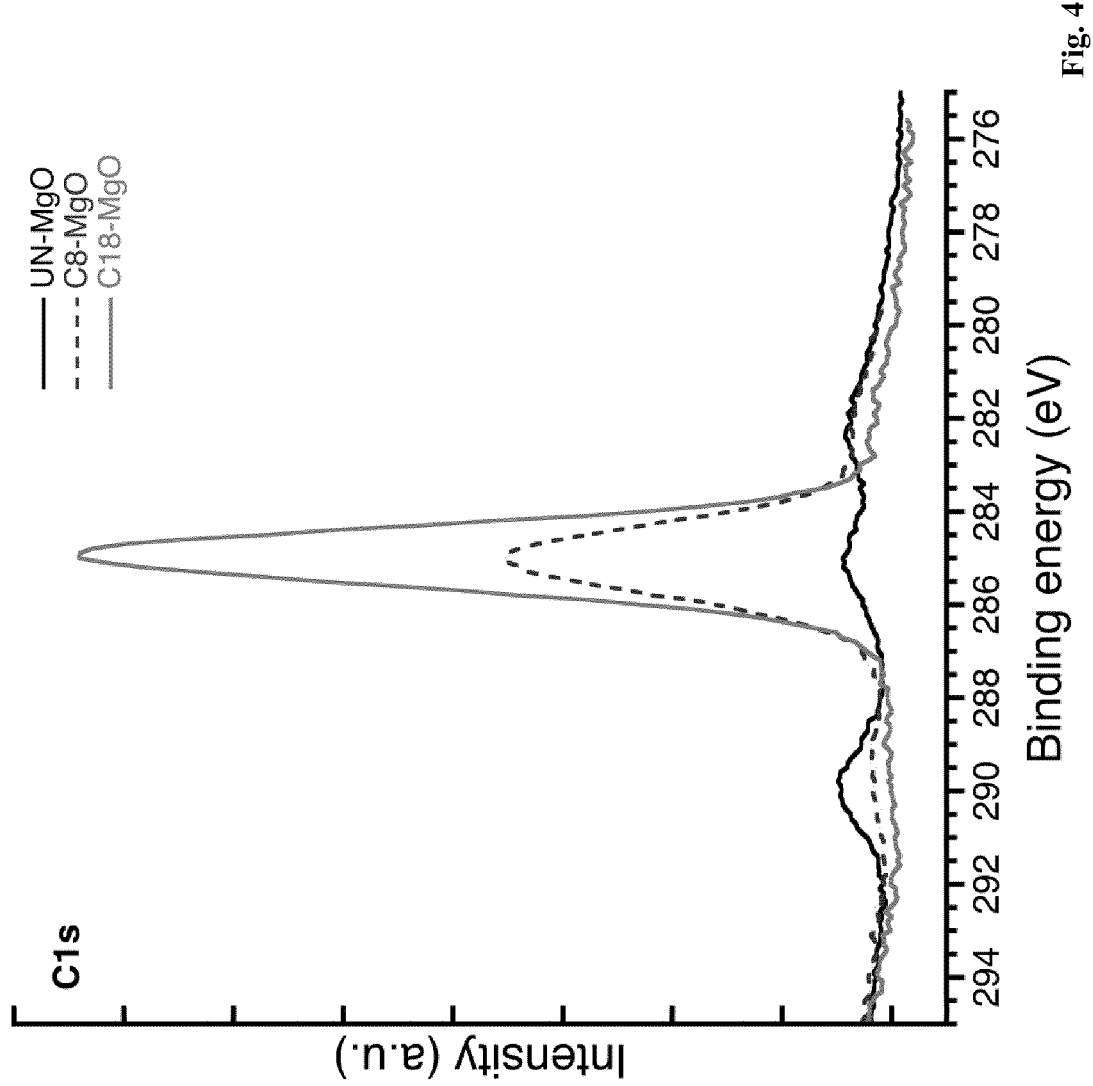
FIG. 4 shows X-ray photospectroscopy (XPS) data of the C1s signal from unmodified, C8-modified MgO and C18-modified MgO. A reduction in carbonated species at 289.9 eV, formed by adsorption of ambient $CO_2$, can be seen for the unmodified MgO.

X-ray photospectroscopy (XPS) of the three MgO nanoparticle samples, i.e. samples of unmodified, C8-modified and C18-modified MgO-nanoparticles, confirmed the attachment of silanes by displaying a Si 2p peak and an increase in the C 1s intensity (FIG. 4) for the C8-MgO (i.e. C8-modified MgO-nanoparticles) and C18-MgO (i.e. C18-modified MgO-nanoparticles), compared to the unmodified MgO. The atomic percentage of carbon, identified as C 1s at 285.0 eV, was 16.98 at. % for C8-MgO and 33.51 at. % for the C18-MgO. The C 1s carbon ratio (0.507) correlated well with the carbon related TG mass losses for the different silanes, considering surface coverages associated with the different silanes and their respective molecular masses. As seen in FIG. 4, a small amount of carbon species (2 at. %) was also found for the unmodified MgO at 289.9 eV, while only traces of carbonates were seen for the C8-modified MgO and no carbonates at all for the C18-modified MgO, see W. K. Istone, Surface Analysis of Paper, ed. T. E. Conners, S. Banerjee, pp 247, 1995, CRC, New York. The steric protection provided by the alkyl chains against the adsorption of carbon dioxide ($CO_2$), suggested by the disappearance of the broad FT-IR peak around 1460 cm$^{-1}$ for the C18-MgO in FIG. 2 was thus supported by the XPS results. When $CO_2$ is adsorbed onto the surface, different carbon-oxygen species are formed depending on the coordination to the surface, see D. Cornu, H. Guesmi, J. M. Krafft, H. Lauron-Pemot, J. Phys. Chem. C, 2012, 116, pp 6645-6654. The XPS data also revealed that all the samples showed a relatively large amount of surface-located oxygen (O 1s-531.4 eV and 532.6 eV) compared to the lattice-embedded oxygen at 529.4 eV (FIGS. 5a, 5b and 5c). In the case of the unmodified particles, these energy bands arise from oxygen that exists in the form of terminating MgO, $Mg(OH)_2$, Mg—OH, crystal-$H_2O$ and carbonated species adsorbed on the surface, see W. K. Istone, Surface Analysis of Paper, ed. T. E. Conners, S. Banerjee, pp 247, 1995, CRC, New York, J. F. Moulder, Handbook of X-ray Photoelectron Spectroscopy, ed. Chastain, pp. 45, and D. Cornu, H. Guesmi, J. M. Krafft, H. Lauron-Pernot, J. Phys. Chem. C, 2012, 116, pp 6645-6654. For the C8-MgO and C18-MgO samples a reduction in relative intensity of the shifted O 1s at 531.4 eV (surface oxygen) compared to the O 1s peak at 529.4 eV (lattice oxygen) was observed after the silanization, probably due to a reduction in the presence of $Mg(OH)_2$ and Mg—OH, which is in agreement with the condensation of silanol groups (Si—OH) that occurs during the condensation of the silsesquioxane coatings onto the surface of the MgO nanoparticles. An additional observation was that the surface modification by silanization resulted in the removal of 0.5 atomic percentage of chloride ions ($Cl^-$), which were detected on the unmodified MgO. These $Cl^-$ ions are known to remain adsorbed on the surface of the nanoparticles and to originate from the salt used to precipitate the nanoparticles, see A. M. Pourrahimi, D. Liu, L. K. H. Pallon, R. L. Andersson, A. Martinez Abad, J.-M. Lagarón, M. S. Hedenqvist, V. Ström, U. W. Gedde and R. T. Olsson, RSC Adv., 2014, 4, 35568-35577.

Conductivity Measurement Method

The volume electrical conductivity measurements were performed following the "Conductivity Measurement Method", i.e. standard procedure according to IEC, in Methods of Test for Volume Resistivity and Surface Resistivity of Solid Electrical Insulating Materials, Standard 60093, 1980, applying a direct current (DC) voltage (Glassman FJ60R2) over the film sample, i.e. the polymer composition of the present invention and comparative examples, and measuring the charging current with an electrometer (Keithley 6517A), see FIG. 6. The current signal was recorded by LabVIEW software incorporated in a personal computer and stored for further analysis. An oven was used to control temperature, whereas an overvoltage protection secured the electrometer from damaging due to possible overshoots and a low-pass filter removed high frequency disturbances. A stainless steel three-electrode system was used, in which the high voltage electrode was a cylinder with a diameter of 45 mm, the current measuring electrode was 30 mm in diameter, and the guard ring eliminated surface currents. Good contact between the high-voltage electrode and the film sample was achieved by placing an Elastosil R570/70 (Wacker) layer between them (see L. K. H. Pallon, R. T. Olsson, D. Liu, A. M. Pourrahimi, M. S. Hedenqvist, A. T. Hoang, S. Gubanski and U. W. Gedde, J. Mater. Chem. A, 2015, 3, 7523-7534). The experiments were conducted on LDPE/MgO nanocomposites and unfilled LDPE as reference sample at 60° C. for ~4×10$^4$ s (11.1 h). The applied voltage was 2.6 kV corresponding to an electric field of 32.5 kV/mm, giving conditions (40-90° C.) in temperature and electric field resembling the stress conditions in the insulation of a real HVDC cable, see C. C. Reddy and T. S. Ramu, IEEE Trans. Dielectr. Electr. Insul., 2006, 13, 1236-1244. The test was repeated twice for each material to assess the reproducibility.

Effect of Particle Loading on DC-Conductivity

FIG. 7a to 7c show the charging current as a function of time at 32.5 kV/mm and at 60° C. for the unmodified MgO nanoparticles, see FIG. 7a, and the surface modified MgO nanoparticles (C8-coated, see FIG. 7b, and C18-coated, see FIG. 7c) extruded into polyethylene at particle contents from 0.1 wt. % to 9 wt. %. All measurements were carried out on ca. 80 m thick films, i.e. samples of the polymer composition of the present invention and of the comparative examples, which samples were prepared by hot pressing of the extruded polymer composition. Good repeatability was shown.

From the obtained data (see FIG. 7a to 7c), it was apparent that a distinct drop in charging current occurred during the first 100 seconds for all nanocomposites with nanoparticle (i.e. MgO nanoparticle) content more or equal to 1 wt. % (see phase 1 in FIGS. 7a, 7b and 7c). The distinct initial drop in charge current was not present for the 0.1 wt. % sample with unmodified nanoparticles, while the 0.1 wt. % modified particles showed an initial drop, but not as pronounced as at ≥1 wt. % nanocomposites. After 100 s the charging current reached a transition and levelled out with a slower decay, much similar to that of the unfilled LDPE. The initial drop in charge current was not present for the 0.1 wt. % sample with UN-MgO, while the samples with 0.1 wt. % surface-modified particles (C8-MgO and C18-MgO) showed an initial drop, but not as pronounced as with the ≥1 wt. % nanocomposites. The initial drop has been attributed to a polarization effect, but could also be explained by a formation of charges in the vicinity of the electrodes due to the nanoparticles which leads to a higher charge injection barrier, and thus reduced charging current, see V. Adamec, J. H. Calderwood, J. Phys. D. Appl. Phys., 1981, 14, 1487, and R. C. Smith, C. Liang, M. Landry, J. K. Nelson and L. S. Schadler, IEEE Trans. Dielectr. Electr. Insul., 2008, 15, 187-196). The lowest charging current was found for the 1-3 wt. % nanocomposites, with no essentially difference between different MgO-particles. All 1-3 wt. % nanocomposites displayed ca. 2 orders of magnitude lower charging current than the unfilled LDPE after 10 min, and 10-20 times lower charging current after 11 h compared to the unfilled LDPE (FIG. 7a-c).

The surface modification of the MgO nanoparticles had a clear effect on the ability of the 6-9 wt. % nanocomposites to maintain the lowest levels of charging current over the whole measurement time. The charging current for 6-9 wt. % C8-MgO and C18-MgO was reduced 30-50 times after the initial drop ($6 \times 10^2$ s), and was reduced more than 20 times over the entire measurement that lasted for 11 hours ($4 \times 10^4$ s). In comparison, the unmodified MgO nanoparticles showed at the same MgO contents significantly higher charging current, with the 9 wt. % samples performing equivalent with an unfilled LDPE after 11 hours ($4 \times 10^4$ s), see FIG. 7a.

The dashed red lines display the corresponding volume conductivity of the unfilled LDPE. A limited drop in volume conductivity can be seen for 0.1 wt. % for the C8-MgO and C18-MgO, which was most pronounced after 10 min. The minimum conductivity was acquired for nanocomposites with 1-3 wt. %, reaching conductivity values of $2-6 \times 10^{-15}$ S/m after 10 min.

This was followed by an almost constant or increased conductivity for the 6-9 wt. % MgO nanoparticle content after both 10 min and 11 h. The absence of surface modification clearly limited the nanoparticle fraction to a maximum of ca. 3 wt. %, with marked increase in volume conductivity at higher weight fractions. At the same time, a more reliable reduction in conductivity was present for the silsesquioxane modified C8-MgO and C18-MgO nanoparticle systems over the whole measurement time, which consistently showed ca. 1-2 orders of magnitude lower conductivity, independently of nanoparticle content. The difference in impact of the surface modification was most apparent for the highest (9 wt. %) nanoparticle content (see FIGS. 8a and 8b). FIGS. 8a and 8b show the measured conductivity values for the different LDPE/MgO nanocomposites after 10 min (FIG. 8a) and 11 hours (FIG. 8b) with an applied electrical field of 32 kV/mm.

Inter-Particle Distance and Correlation of 3-Dimensional Modelled Phase Distribution with DC Properties of LDPE/MgO Nanocomposites The dispersion of the nanoparticles was analysed to identify relations between nanoparticle dispersion state and conductivity values in the LDPE/MgO nanocomposites. FIGS. 9a and 9b show the SEM images of the cryo-fractured 6 wt. % LDPE/MgO nanocomposites, with unmodified MgO nanoparticles (FIG. 9a) as compared to the C8-modified MgO nanoparticles (FIG. 9b).

The unmodified nanoparticles were mostly present as nanoparticles inside up to ca. 1 m large aggregates, with occasionally intercalated polymer, visible in the aggregates (shown in the upper right corner of the micrograph, i.e. FIG. 9a). A 1 m aggregate contained ca. 8000 nanoparticles. In contrast, the surface-modified nanoparticles were evenly distributed over the entire cross-sectional fracture surface area, with only a few aggregates as large as ca. 200 nm, see the micrograph, i.e. FIG. 9b. The even distribution of the nanoparticles confirmed that the silanization reactions effectively had resulted in surface modification of solitary nanoparticles. Overall, both the C8- and the C18-coatings resulted in very good dispersion of the nanoparticles, in contrast to the unmodified nanoparticles.

For a more in-depth understanding of the dispersion of the nanoparticles, a dispersion analysis was carried out using Bootstrap statistics. The image was based on multiple micrographs, i.e. microscopy images, (>25 for different concentrations) including approx. 250 MgO discrete phase structures per sample (aggregated or non-aggregated nanoparticles). The results are presented herein as 2-dimensional (2D) analyses of the cryo-fractured surfaces with MgO nanoparticle inter-MgO phase distances (FIGS. 9a and 9b, and FIG. 10), and as 3-dimensional modelling of the discrete MgO phases, as determined from the size distribution of the MgO phases in the micrographs, see FIGS. 1a-1f, FIG. 12 and FIG. 13.

MgO phase distribution in the fractured surfaces 2-dimensions (2D) FIGS. 11a and 11b show the overall dispersion of the MgO phase in the PE matrix for the nanocomposites with different weight fractions of nanoparticles, i.e. regarding the aggregated MgO nanoparticles as discrete phases (in accordance with FIG. 10). FIG. 11a shows that the centre-to-centre MgO phase distance decreased from 900 to 350 nm when the amount of unmodified nanoparticles increased from 1 to 9 wt. %. The modified nanoparticles show a decrease from ca. 400 to 100 nm over the same range for the 1st discrete MgO phase neighbour. From FIG. 11b it is apparent that this pattern also was representative over longer ranges, considering the 51st neighbour. In FIG. 11c the fraction of particles tied up in aggregates are presented. An aggregate is here defined, in its smallest definition, as a discrete MgO-phase structure with a cross-section that was two times larger than the diameters of two solitary particles (>132 nm). Thus, this is the smallest threshold for classification of an aggregate herein, compare with the "first aggregate size" and the "second aggregate size" also as defined herein. Overall, the distance between MgO-structures was always greater for the unmodified MgO nanoparticle phase, which was present as smaller clusters and aggregates from 200 nm up to 10 µm. On the contrary, very rarely aggregates could be observed in the surface-modified systems where the particles were mostly present as solitary particles. The improved dispersion of the surface-modified nanoparticles was consistent with that the aggregated phase constituted only 20% of the entire MgO phase in FIG. 11c. On increasing the defined threshold for classification of an aggregate from 2 adjacent particles (i.e. >132 nm) to 3 particles resulted in completely aggregation free samples. In summary, the general trend was that unmodified nanoparticles were severely aggregated with an aggregated MgO fraction of ca. 90%, whereas both the systems of the C8- and C18-modified MgO always showed an aggregated content of ca. 15%. The aggregates were also substantially smaller when the nanoparticles had been coated with the C8- or C18-functional silsesquioxane coatings.

Modelling of Nanocomposites Structure in Relation to Measured Conductive Properties (3-Dimensional)

The 3-dimensional MgO phase distribution was modelled to determine an approximate value for the necessary radius of interaction of the MgO-phase to show an impact on the conductivity of the nanocomposites. FIG. 1 displays the 0.1 wt. % (a and d), 1 wt. % (b and e) and 9 wt. % (c and f) composite interiors based on the size distribution on the nanoparticles in the image analysis. Only the C8-modified MgO nanoparticle system was modelled due to the large similarity with the C18-modified nanoparticle system in dispersion. The smallest spheres represent individual MgO nanoparticles, whereas larger spheres represent the aggregated MgO nanoparticles. The semi-transparent large light gray spheres show the maximum radius of interaction of the MgO phase; see FIGS. 1a, b and d. The nanocomposite comprising 0.1 wt. % C8-modified MgO nanoparticles was used as a reference point since it represented the nanocomposite with the lowest nanoparticle content showing a distinct difference in the measured conductivity, compared to unfilled LDPE. The interaction radius was determined to 775 nm for the surface-modified MgO phase when the sum of all the spheres had reached an interaction volume equal to 95% of the total volume of the entire 0.1 wt. % nanocomposite (large light gray spheres in FIG. 1d). At this point, the large light gray spheres overlapped extensively and filled out the material with margin. The value for the total overlapping interaction volumes (see darker grey region between the large light gray spheres) in the entire 3-dimensional illustration reached 204% when all the spheres had been inserted in the model. For the same nominal radius of interaction (775 nm), it can be observed from FIG. 1a that the spheres no longer were overlapping, which was consistent with the aggregation of the unmodified 0.1 wt. % MgO nanoparticles. The total interaction volume of the spheres reached 40% of the entire sample. The modelled results were consistent with the micrograph observations that considerable portions of the material present as empty LDPE matrix, which in turn was synonymous with an electrical conductivity that corresponded to the pristine LDPE material (FIG. 8a). In contrast, a nanoparticle content above 1 wt. % always resulted in total interaction volumes reaching 100% (FIGS. 1b, 1c, 1e and 1f) for a radius of interaction equal to 775 nm, and overlapping spheres equal to 392% and >1000% for the 1 wt. % unmodified and C8-modified MgO nanoparticles, respectively.

FIG. 12 shows how the interaction radius of the spheres changes if the composite samples were to be filled with sufficient MgO phase to always cover the 95 vol. % interaction volume of the entire samples. The interaction radius was here plotted against the conductivity after 10 min, showing that ca. 800 nm was the minimal necessary radius of interaction of the MgO-phase to show a marked effect on the measured conductivity values, i.e. circa one order of magnitude decrease in conductivity. This distance was clearly also surpassed for the 1 wt. % unmodified MgO nanoparticles, which showed an interaction radius of 636 nm with a conductivity of $4 \times 10^{-15}$ S/m, even if the nanoparticles were aggregated (see FIG. 1b). The more severe aggregation within the unmodified nanoparticles system started showing an affect already at 3 wt. %, with progressively increasing values of conductivity, i.e. with a decreasing insulation capacity, for the unmodified nanoparticles up to 9 wt. % (FIG. 1c). From the diamond and square markers (FIG. 12), it is apparent that the surface-modified nanoparticles could retain a preserved insulation capacity below $10^{-14}$ S/m for nanoparticle contents up to 9 wt. %. The lowest conductivity values were observed for nanocomposites with the 3 wt. % C8-modified MgO nanoparticles and the 1 wt. % C18-modified MgO nanoparticles, respectively, reaching $2 \times 10^{-15}$ S/m at interaction radius from 200-350 nm.

On one hand, the data show that surface modifications effectively allow the MgO nanoparticle phase to act as an insulation promoter at high nanoparticle content, and that the nanoparticles phase functioned even down to interaction radius values as small as ca. 100 nm. At the same time it is apparent that the unmodified nanoparticles for equivalent interaction radius can be extrapolated to show no effect, i.e. if sufficient amounts of aggregated MgO nanoparticles would have been added to reach the 100 nm interaction volume radius. These observations allow us to conclude that one major effect of the nanoparticles presence is related to the created particle interface to polymer, which may act as surface for distribution and collection of charges within the multiphase nanocomposites. It was also apparent that the measured conductivity values are lower than what has been reported for pure MgO crystals: $1 \times 10^{-13}$ to $1 \times 10^{-12}$ S/m, see F. Freund, M. M. Freund and F. Batllo, J. geophys. Res., 1993, 98, 22209-22229. At the same time, the difference in the interaction radius between 1 wt. % unmodified MgO and 0.1 wt. % C8-modified MgO or, alternatively, and 0.1 wt. % C18-modified MgO was only 50-100 nm, with an unproportionate conductivity difference of one order of magnitude (FIG. 12). This observation indicates that not only the distribution of nanoparticles was essential for the conductivity reduction. The reduction in conductivity may also be related to the intrinsic characteristics of the nanoparticles, where a greater mass of MgO will provide a larger presence of inorganic lattice defects and uneven surfaces (edges, corners and vacancies), which may give rise to surface states with charge trapping capacity, see T. König, G. H. Simon, H. P. Rust, G. Pacchioni, M. Heyde and H. J. Freund, J. Am. Chem. Soc., 2009, 131, 17544-17545. At the same time, the increased conductivity for the nanocomposites with unmodified MgO (6 and 9 wt. %) was clearly related to the presence of aggregates, where mainly the adsorbed $H_2O$ (and $CO_2$) is suggested to have provided a conduction path through the aggregates, with locally higher conductivity. It was also apparent that the adhesion between the aggregates of unmodified MgO nanoparticles and polyethylene, see FIG. 13, was inadequate, with voids formed in the aggregate interface. Voids were considered to be undesired and have previously been shown to have negative effect on electrical insulating properties, see L. Testa, S. Serra and G. C. Montanari, J. Appl. Phys., 2012, 108, 034110.

It is demonstrated that the conductivity of low-density polyethylene (LDPE) can be reduced by circa 2 orders of magnitude to $2 \times 10^{-15}$ S/m by inclusion of magnesium oxide (MgO) nanoparticles as "space charge" collecting nanofiller material at 60° C. (32 kV/mm). These values are not only smaller than that of the traditional pristine LDPE polymer ($2 \times 10^{-13}$ S/m), but also smaller than that reported for pure MgO crystals: $1 \times 10^{-13}$ to $1 \times 10^{-12}$ S/m, see F. Freund, M. M. Freund and F. Batllo, J. Geophys. Res., 1993, 98, 22209-22229. The lowest observed conductivity was ca. $7 \times 10^{-16}$ S/m for 3 wt. % surface coated nanoparticles. A cornerstone in the development of the presented materials was to apply a thin and selectively condensed silsequioxane coating to the nanoparticles, which allowed for significantly improved nanoparticle dispersions resulting in repeatedly measured high insulation capacity of the nanocomposites. In absence of the silsesquioxane coatings, the nanoparticles aggregated severely and at fractions above 1-3 wt. % resulted in conductivity values approaching that of the pristine LDPE. It is suggested that the conductivity within these aggregated volumes show a different, and higher conductivity due to the presence of adsorbed humidity, e.g. the conductivity of high resistivity MilliQ water ($H_2O$) is approx. $10^{-7}$-$10^{-5}$ S/m after exposure to ambient conditions for ca 30 min. However, not only water but also $CO_2$ existed within the aggregates as clearly demonstrated from the C1s peak visible from the XPS data (290 eV). The octadecyl functional (C18) silsesquioxane coatings completely prevented the $CO_2$ and $H_2O$, and consequently showed the lowest conductivities repeatedly measured. It is therefore suggested that the coating techniques for inorganic nanofillers used within high voltage insulation must rely on the preparation of coatings sufficiently saturated with alkyl ($CH_2$) moieties to prevent adsorption of hygroscopic substances, which normally are associated with inorganic nanoparticles. Modelling allowed to conclude that the radius of interactions related to the functional MgO phase was required to show values below ca. 800 nm to effectively reduce the conductivity of the nanocomposites as compared to pristine LDPE. The most effective compositions showed a radius of interaction of ca. 200 nm. The interaction radius was defined as the distance of an arbitrary selected neighbouring MgO phase. The presented successful nanoparticle dispersion has also been confirmed by thermal characterization which revealed that the most evenly dispersed surface coated nanoparticles also functioned to delay the onset of thermal degradation of the nanocomposites with ca. 100° C.

LDPE/ZnO Nanocomposites

Characterization of Nanoparticles

Transmission infrared spectra, based on 32 scans per spectrum and with a resolution of 4 $cm^{-1}$, were taken on IR pellets using a Perkin-Elmer Spectrum IR Spectrometer 2000. The pellets (diameter=13 mm; thickness=0.85 mm) consisted of 3 mg nanoparticles and 300 mg KBr. Transmission electron micrographs were obtained using a Hitachi HT7700 microscope operated at 100 kV in the high contrast mode. An ultrasonicated suspension of the nanoparticles in ethanol was deposited onto a carbon-coated 400 mesh copper grid (Ted Pella, Inc., USA) and dried at 50° C. under reduced pressure (0.5 kPa). A Mettler-Toledo TG/DSC1 was used to determine the mass loss of the pristine and coated nanoparticles. All the samples were dried in an oven at reduced pressure (0.5 kPa) at 50° C. overnight before the thermogravimetry. The samples (mass=4.0±0.5 mg), placed in 70 µL aluminium oxide crucibles and heated from 30 to 800° C. at a rate of 10° C. $min^{-1}$ while being purged with dry nitrogen (flow rate=50 mL $min^{-1}$).

Particle (Nanoparticle) Dispersion Analysis

A field emission scanning electron microscope (FE-SEM), Hitachi S-4800, was used to assess the nanoparticle dispersion and distribution in the low-density polyethylene. The samples were prepared by cracking a frozen notched sample in liquid nitrogen, which was further coated with Pt/Pd before insertion in the FE-SEM. The coating/sputtering time was 30 s, at an 80 mA operating current of the Cressington 208HR sputter.

A Field emission scanning electron microscopy (FE-SEM) image analysis of the LDPE/ZnO nanocomposites, i.e. the polymer composition of the present invention and comparative examples, were performed on the surface of the freeze-cracked samples. The LDPE/ZnO nanocomposites may further be analysed in line with the corresponding analysis as described for the LDPE/MgO nanocomposites under "LDPE/MgO nanocomposites, Particle (nanoparticle) dispersion analysis" above.

Electrical Conductivity Measurements

The electrical conductivity measurements were performed by applying a 2.6 kV DC voltage from a power supply (Glassman FJ60R2) across the 80 µm thick film sample and measuring the current using a Keithley 6517A electrometer. The electric field across the film was 32.5 kV $mm^{-1}$. The detected current signal was recorded by LabVIEW software incorporated in a personal computer and stored for further analyses. An oven was used to control temperature, whereas an overvoltage protection secured the electrometer from damaging due to possible overshoots and a low-pass filter removed high frequency disturbance. A three-stainless steel electrode system was used, in which the high voltage electrode was a cylinder with a diameter of 45 mm; the current measuring electrode was 30 mm in diameter, whereas the guard ring allowed for eliminating surface currents. A good contact of the high voltage electrode and the film sample was obtained by placing an Elastosil R570/70 (Wacker) layer between them. The experiments were conducted at 60° C. for $4\times10^4$ s (11.1 h).

Characterisation of Functional Silane-Coated Particles

Three alkyl-containing silanes—methyltrimethoxysilane (C1 in FIG. 14), octyltriethoxysilane (C8 in FIG. 14) and octadecyltrimethoxysilane (C18 in FIG. 14)—were used to tailor the surface properties of ZnO nanoparticles (ZnO-25-U). FIG. 14 shows the infrared spectra of the pristine and silane-coated nanoparticles. The absorbance band at 450-600 $cm^{-1}$ is assigned to the Zn—O stretching and the absorbance band at 880 $cm^{-1}$ originates from the stretching vibration of Zn—OH, see A. M. Pourrahimi, D. Liu, V. Ström, M. S. Hedenqvist, R. T. Olsson and U. W. Gedde, J. Mater. Chem. A, 2015, 3, 17190-17200. The C—H stretching bands at 2800-3000 $cm^{-1}$ were present in the spectra of the silane-coated nanoparticles, but the spectrum of the pristine nanoparticles showed no such bands. The spectrum of the C1-coated nanoparticles showed absorption at 1270 $cm^{-1}$, which is assigned to the Si—$CH_3$ stretching vibration, see R. T. Olsson, M. S. Hedenqvist, V. Ström, J. Deng, S. J. Savage and U. W. Gedde, Polym. Eng. Sci., 2011, 51, 862-874. The spectrum of the C8 and C18-coated nanoparticles also showed the peak at 1470 $cm^{-1}$ assigned to the $CH_2$ unit not covalently bonded to silicon, due to terminal alkyl group of the silane, see A. Grill, Annu. Rev. Mater. Res., 2009, 39, 49-69. An absorption band at 1120 $cm^{-1}$ assigned to the Si—O—Si stretching vibration which indicated the formation of a cross-linked silicon oxide structure on the nanoparticle surfaces, see D. Liu, A. M. Pourrahimi, R. T. Olsson, M. S. Hedenqvist and U. W. Gedde, Eur. Polym. J., 2015, 66, 67-77. This peak was not visible in the spectra of the all silane coated nanoparticles (FIG. 14). Hence, most of the silanol groups of the hydrolysed silanes condensed with the hydroxyl groups on the nanoparticle surfaces, rather than reacting with other silanol groups to form a cross-linked coating layer around the particles. The absence of the Si—O—Si stretching band in the spectra of coated nanoparticles suggested that these coatings were monolayers, see D. Liu, A. M. Pourrahimi, R. T. Olsson, M. S. Hedenqvist and U. W. Gedde, Eur. Polym. J., 2015, 66, 67-77. The silane coatings of ZnO nanoparticles with the thickness ca. 2 nm were confirmed by high resolution TEM presented elsewhere, see D. Liu, A. M. Pourrahimi, L. K. H. Pallon, R. L. Andersson, M. S. Hedenqvist, U. W. Gedde and R. T. Olsson, RSC Adv., 2015, 5, 48094-48103.

FIG. 15 shows the normalized mass plotted as a function of temperature for pristine and silane-coated ZnO nanoparticles (ZnO-25-U) after normalization to the mass loss value at 140° C. Since all nanoparticles regardless of coating had showed a mass loss at 20-140° C. due to removal of loosely bound water, the curve values was normalized to the mass loss value at 140° C. The mass loss at 140-800° C. was attributed to removal of hydroxyl groups in the case of pristine nanoparticles. Since, the hydroxyl groups were dominantly condensed with the silanes during coating of the nanoparticles; the mass loss at 140-800° C. for coated nanoparticles was due to silane transformation into a silica layer. The silane coverage on the nanoparticle surfaces was calculated by normalizing the amount of silane molecules with respect to the surface area of the ZnO-25-U nanoparticles, 34 $m^2$ $g^{-1}$, (Table 3). The C1- and C8-coated nanoparticles respectively had the highest and lowest coverage of silane on the nanoparticle surface. These values were in accordance with the silane coverage of aluminium oxide with the specific surface area close to ZnO nanoparticle, see D. Liu, A. M. Pourrahimi, R. T. Olsson, M. S. Hedenqvist and U. W. Gedde, Eur. Polym. J., 2015, 66, 67-77.

TABLE 3

Coverage of silanes on ZnO nanoparticles (ZnO-25-U)

| Sample | Mass loss at 800° C. (%) [a] | Silane coverage (μmol m$^{-2}$) | Silane coverage (molecules (nm)$^{-2}$) |
|---|---|---|---|
| Pristine | 1.87 | — | — |
| C1-coated | 2.30 | 5.2 [b] (11.1 [c]) | 8.6 [b] (18.4 [c]) |
| C8-coated | 2.79 | 1.5 [b] (1.6 [c]) | 2.5 [b] (2.6 [c]) |
| C18-coated | 6.64 | 3.4 [b] (3.5 [c]) | 5.6 [b] (5.8 [c]) |

[a] The mass loss normalized to the value at 140° C. in order to remove the effect of loosely bound water.
[b] The calculation was based on the mass loss between uncoated and silane coated nanoparticles were due to only the degradation of hydrocarbon moieties (R group in RSiO$_{1.5}$ coatings)
[c] The calculation was based on assuming that the inorganic part of the silane SiO$_{1.5}$ was oxidized to silica (SiO$_2$)

Characterisation of the LDPE/ZnO Nanocomposites

FIGS. 16a-d show scanning electron micrographs of ZnO particles with different size and their LDPE nanocomposites based on the 3 wt. % particles. The zinc acetate precursor yielded separate and mono-domain nanoparticles (ZnO-25-U), neither of which showed any intra-particle porosity (FIG. 16a). The zinc nitrate yielded submicron (ZnO-550-U) star-shaped particles with a symmetrical habit (FIG. 16c), see A. M. Pourrahimi, et al., RSC Adv., 2014, 4, 35568-35577 and A. M. Pourrahimi, et al., J. Mater. Chem. A, 2015, 3, 17190-17200. These star-shaped particles consisted of c-axis oriented primary nanoparticles along each petal (spike) director. ZnO-550-U contained pores placed among the primary nanoparticles with an average size of 3.5 nm. The nanocomposite based on the C8-coated ZnO nanoparticles (ZnO-25-C8) showed very uniform particle dispersion in the crystalline LDPE lamellae; the agglomerates were always smaller than 100 nm (FIG. 16b). The cryo-fractured of all nanocomposites based on coated nanoparticles (C1, C8 and C18) showed no sign of big aggregation; whereas the nanocomposites which contained uncoated ZnO (ZnO-25-U) nanoparticles showed big aggregates sized 1-50 m (FIGS. 16a and 17). The applied shear force during extrusion (150° C.) was not sufficient to break uncoated ZnO nanoparticles hard aggregates into solitary particles, but the compatibility between LDPE and hydrophobic surface of coated ZnO nanoparticles resulted in no major aggregation. The submicron and micron sized star-shaped ZnO particles showed good dispersion without any aggregation, while no coating applied on their hydrophilic surfaces'. Assuming a perfect dispersion, for a face-centred cubic lattice arrangement of particles in the polymer, the theoretical IPD (centre to centre distance) is given by (equations (2) and (3)), see A. M. Pourrahimi, et al., J. Polym. Sci., Part B: Polym. Phys., 2011, 49, 327-332:

$$IPD = \left(\frac{\sqrt{2}\pi}{6V_f}\right)^{1/3} \times d \quad (2)$$

$$V_f = \frac{w_f \rho_m}{w_f \rho_m + (1 - w_f)\rho_f} \quad (3)$$

where $V_f$ is the volume fraction of nanoparticles in the nanocomposite, d is the diameter of the nanoparticles, $w_f$ is the mass fraction of nanoparticles in the nanocomposite (3% in all nanocomposites), pr is the density of the nanoparticles (5610 kg m$^{-3}$) and $\rho_m$ is the density of the LDPE (920 kg m$^{-3}$). The theoretical IPDs for the nanocomposites based on 3 wt. % ZnO were ca. 90, 2000 and 7500 nm respectively, for particles sizes of 25, 550 and 2000 nm. The much lower IPD for the nanoparticle nanocomposite systems indicated their high interfacial surface area with LDPE matrix.

In order to gain more information about the interfacial adhesion between nanoparticles and LDPE matrix, tensile testing was performed (FIG. 18). The strain-at-break (%) of the nanocomposites based on the C8 and C18-coated nanoparticles (610-660) was higher than that of the pristine LDPE and nanocomposites based on C1-coated nanoparticles (420-460). The nanocomposites based on uncoated nanoparticles showed much lower strain-at-break with reference to pristine LDPE, indicating their poor interfacial adhesion due to presence of big aggregates and voids. All samples showed a stress drop in stress-strain curve after the first yield point. Liu et al., Eur. Polym. J., 2015, 66, 67-77 observed the cavitation around particles in the LDPE/Al$_2$O$_3$ nanocomposites at the strain of the second yield point. Here, the higher strain for cavitation was observed for LDPE nanocomposites based on C8- and C18-coated nanoparticles, which suggested the strongest interfacial adhesion occurred between nanoparticles and LDPE matrix in these nanocomposite samples. The long chain of these silanes on the surface of the nanoparticles increased the surface hydrophobicity, which enhanced their compatibility with the LDPE matrix.

DC Conductivity of the LDPE/ZnO Nanocomposites

The electrical insulation capacity of the LDPE nanocomposites based on coated ZnO nanoparticles was compared to unfilled LDPE: FIG. 19a shows nanocomposites comprising 0.1, 1.0 and 3.0 wt. %, respectively, of LDPE/ZnO-25-C1, and unfilled LDPE (Reference), FIG. 19b shows nanocomposites comprising 0.1, 1.0 and 3.0 wt. %, respectively, of LDPE/ZnO-25-C8, and unfilled LDPE (Reference), and FIG. 19c shows nanocomposites comprising 0.1, 1.0 and 3.0 wt. %, respectively, of LDPE/ZnO-25-C18, and unfilled LDPE (Reference). The charging current was always lower for all nanocomposite systems during the entire measurement, as compared with unfilled LDPE. The level of conductivity decreased by addition of coated ZnO nanoparticles from 0.1 to 3 wt. %. The addition of 3 wt. % C8-coated ZnO nanoparticles decreased the conductivity of the LDPE by 2-3 orders of magnitude (11 h value), which is much larger effect than obtained by adding a similar amount of C1 and C18-coated nanoparticles. It was reported that the LDPE with different crystallisation behaviour show different conductivity due to contrasting conductive crystallites and resistive amorphous regions, see T. J. Lewis, IEEE Trans. Dielectr. Electr. Insul., 2014, 21, 497-502. DSC was used to study the crystallisation and melting of the nanocomposites. No significant changes in crystallinity (0.4-0.45) or melting peak temperature (111° C.) were observed on addition of the nanoparticles to the LDPE matrix. The addition of nanoparticles thus had no significant effect on the crystallization of the polymer. However, the ZnO nanoparticles with their large surface areas act as additional electron traps, and reduce the average hopping distance for the charge carriers with reference to that of the LDPE matrix see K. Y. Lau et al., J. Phys.: Conf. Ser., 2013, 472, 012003 and T. J. Lewis, IEEE Trans. Dielectr. Electr. Insul., 2014, 21, 497-502. The conductivity suppression level was decreased by decreasing the specific surface area of ZnO particles from 34 to 13 m$^{-2}$ g$^{-1}$, A. M. Pourrahimi, et al., Mater. Chem. A, 2015, 3, 17190-17200 (FIGS. 19a-c and 20). The charge transport on the nanoparticles with large surface activity was facilitated due to the presence of surface defects, see T. Konig et al., J. Am. Chem. Soc., 2009, 131, 17544-17545. Here, these defects became inactive while the nanoparticles were covered by large amount of silane (C1 and C18, See Table 3). The C8-coated nanoparticles showed greatest reduction in conductivity due to the low amount of silane coverage, which resulted in accessible defects for the charge transport. Another important characteristic of the C8-coating is their high porosity compared to other silane coating which provided new trap sites for charge carriers.

The dispersion of the nanoparticles was analysed to identify relations between nanoparticle dispersion state and conductivity values in the LDPE/ZnO nanocomposites.

FIG. 21 shows scanning electron micrograph of nanocomposite of LDPE and ZnO-25-C1 with a nanoparticle content of 3 wt. % ZnO.

FIG. 22 shows the corresponding bitmap of FIG. 21 with ZnO nanoparticles as the black phase.

FIG. 23a shows scanning electron micrograph of nanocomposite of LDPE and ZnO-25-C8 with a nanoparticle content of 3 wt. % ZnO.

FIG. 23b shows scanning electron micrograph of nanocomposite of LDPE and ZnO-25-C18 with a nanoparticle content of 3 wt. % ZnO.

ZnO Phase Distribution in the Fractured Surfaces 2-Dimensions (2D) (See Above the Corresponding Paragraph for LDPE/MgO Nanocomposites for Details)

FIGS. 24 and 25 show the overall dispersion of the ZnO phase in the PE matrix for the nanocomposites with different weight fractions of nanoparticles, i.e. regarding the aggregated ZnO nanoparticles as discrete phases (in accordance with FIG. 22).

FIG. 24 shows centre-to-centre distance for the $1^{st}$ neighbour as a function of volume percentage of 25 nm ZnO nanoparticles surface modified with C1, C8 and C18 alkyl chain on the silane at 1 wt. % and 3 wt. %.

FIG. 25 shows centre-to-centre distance for the $51^{st}$ neighbour as a function of volume percentage of 25 nm ZnO nanoparticles surface modified with C1, C8 and C18 alkyl chain on the silane at 1 wt. % and 3 wt. %.

The invention claimed is:

1. A polymer composition comprising a low-density polyethylene (LDPE) polymer (a) and a nanoparticle filler (b),
   wherein the nanoparticle filler (b) comprises a plurality of surface modified nanoparticles, the plurality of surface modified nanoparticles comprising a plurality of nanoparticles silanized with octadecyl(trimethoxy)silane (OdTMS-C18), octyl(triethoxy)silane (OTES-C8), methyltrimethoxysilane, or a combination thereof, and the plurality of nanoparticles comprising MgO or ZnO,
   wherein the polymer composition comprises a volume percentage (vol. %) of the nanoparticle filler (b) which is Dvol vol. %,
   wherein each nanoparticle in the nanoparticle filler within the polymer composition is separated from its nearest nanoparticle neighbor by a center-to-center average distance, in nanometer (nm), in two dimensions (2D), of R1st nm,
   and wherein the polymer composition shows a dependency between said center-to-center average distance to nearest neighbor, R1st, and said volume percentage, Dvol vol. %, which is $R1st = E/(Dvol + 0.3) + F,$ wherein
   $Dvol_1 \leq Dvol \leq Dvol_2,$
   $E_1 \leq E \leq E_2,$
   $F_1 \leq F \leq F_2,$ and
   $Dvol_1$ is 0.010 and $Dvol_2$ is 4.4, $E_1$ is 100, $E_2$ is 280, $F_1$ is 50, and $F_2$ is 140.

2. The polymer composition according to claim 1, wherein $Dvol_1$ is 0.20 and $Dvol_2$ is 2.5.

3. The polymer composition according to claim 1, wherein $E_2$ is 275.

4. The polymer composition according to claim 1, wherein $F_2$ is 135.

5. The polymer composition according to claim 1, wherein $E_2$ is 270 and $F_2$ is 130.

6. The polymer composition according to claim 1, wherein the polymer composition has a level of charging currents of $1 \times 10^{-9}$ ampere (A) or less after applying a direct current (DC) voltage of 2.6 kV to a ca. 80 μm thick sample of the polymer composition at 32 kV/mm and at 60° C. for $10^3$ seconds.

7. The polymer composition according to claim 1, wherein the amount of LDPE polymer (a) in the polymer composition is at least 35 wt. % of the total weight of polymer component(s) present in the polymer composition.

8. The polymer composition according to claim 1, wherein the LDPE polymer (a) is a saturated LDPE homopolymer or a saturated LDPE copolymer of ethylene with one or more comonomer(s).

9. The polymer composition according to claim 1, wherein the LDPE polymer (a) is an unsaturated LDPE copolymer of ethylene with at least one polyunsaturated comonomer and optionally with one or more other comonomer(s).

10. The polymer composition according to claim 1, wherein the polymer composition is extruded.

11. An electrical device comprising the polymer composition of claim 1, wherein the electrical device is a power cable; a capacitor film; or a photovoltaic (PV) module.

12. A direct current (DC) power cable comprising a conductor which is surrounded at least by an inner semiconductive layer, an insulation layer, and an outer semiconductive layer, in that order, wherein at least the insulation layer comprises the polymer composition according to claim 1.

13. A process for producing an electrical device, wherein the process comprises a step of dry processing the polymer composition according to claim 1.

14. The polymer composition according to claim 9, wherein the polyunsaturated comonomer comprises a straight carbon chain with at least 8 carbon atoms and at least two non-conjugated carbon-carbon double bonds, wherein the polyunsaturated comonomer comprises at least 4 carbons between the at least two non-conjugated carbon-carbon double bonds, and wherein at least one of the non-conjugated carbon-carbon double bonds is terminal.

15. The polymer composition according to claim 9, wherein the polyunsaturated comonomer comprises a diene with at least eight carbon atoms and two non-conjugated carbon-carbon double bonds, wherein at least one of the non-conjugated carbon-carbon double bonds is terminal.

16. The polymer composition of claim 9, wherein the polyunsaturated comonomer is a $C_8$- to $C_{14}$-non-conjugated diene with at least one terminal double bond.

17. The polymer composition of claim 9, wherein the polyunsaturated comonomer comprises 1,7-octadiene; 1,9- decadiene; 1,11-dodecadiene; 1,13-tetradecadiene; 7-methyl-1,6-octadiene; 9-methyl-1,8-decadiene; or mixtures thereof.

18. The polymer composition of claim 9, wherein the polyunsaturated comonomer comprises 1,7-octadiene; 1,9-decadiene; 1,11-dodecadiene; 1,13-tetradecadiene; or any mixture thereof.

19. The electrical device of claim 11, wherein the electrical device is a high voltage (HV) power cable or an ultra high voltage (UHV) power cable.

20. The polymer composition according to claim 1, wherein the LDPE polymer (a) is an unsaturated LDPE homopolymer or an unsaturated LDPE copolymer of ethylene with one or more comonomer(s).

* * * * *